(12) United States Patent
Tsuda

(10) Patent No.: US 9,426,722 B2
(45) Date of Patent: Aug. 23, 2016

(54) INFORMATION PROCESSING METHOD, INFORMATION PROCESSING DEVICE COMMUNICATION SYSTEM

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 625 days.

(21) Appl. No.: 13/367,628

(22) Filed: Feb. 7, 2012

(65) Prior Publication Data

US 2012/0207023 A1 Aug. 16, 2012

(30) Foreign Application Priority Data

Feb. 14, 2011 (JP) ................................ 2011-028564

(51) Int. Cl.
*H04W 48/06* (2009.01)

(52) U.S. Cl.
CPC .................................... *H04W 48/06* (2013.01)

(58) Field of Classification Search
CPC .................................................... H04W 48/06
USPC .................... 370/235, 329; 455/450
See application file for complete search history.

(56) References Cited

U.S. PATENT DOCUMENTS

| 2004/0029587 | A1* | 2/2004 | Hulkkonen | ....... H04W 36/0066 455/436 |
| 2010/0284367 | A1* | 11/2010 | Koo et al. | ..................... 370/331 |
| 2011/0149912 | A1* | 6/2011 | Jung et al. | ..................... 370/331 |

FOREIGN PATENT DOCUMENTS

| CN | 1510947 A | 7/2004 |
| CN | 1502177 A | 3/2005 |
| JP | 2002-78020 | 3/2002 |
| JP | 2004-207839 A | 7/2004 |
| JP | 2006-129493 A | 5/2006 |
| JP | 2009-118015 A | 5/2009 |
| JP | 2009-246874 A | 10/2009 |

OTHER PUBLICATIONS

Japanese Office Action issued on Sep. 15, 2015 in patent application No. 2011283074.
Office Action Recieved for Chinese Patent Application No. 201210025602 mailed on Dec. 2, 2015.

* cited by examiner

*Primary Examiner* — Pao Sinkantarakorn
*Assistant Examiner* — Richard Chang
(74) *Attorney, Agent, or Firm* — Chip Law Group

(57) ABSTRACT

An information processing method includes determining, when a connection request for connecting, via a base station relating to a first communication carrier, a first wireless communication device to a base station relating to a second communication carrier is received from the first wireless communication device, permission or non-permission for the connection request based on connection information on the number of wireless communication devices connected to a base station relating to the connection request, and setting a connection right to be connected to the base station relating to the connection request to the first wireless communication device when permission is determined in the determining.

20 Claims, 32 Drawing Sheets

| | FIRST COMMUNICATION CARRIER | | | SECOND COMMUNICATION CARRIER | | | |
|---|---|---|---|---|---|---|---|
| 221 | 222 | 223 | | 221 | 222 | 223 | |
| CELL ID | POSITIONAL INFORMATION | CONGESTION DEGREE INFORMATION | | CELL ID | POSITIONAL INFORMATION | CONGESTION DEGREE INFORMATION | ... |
| c5c00a | LATITUDE: O° O° O′<br>LONGITUDE: O° O° O′ | 0.125 | | b2640d4 | LATITUDE: O° O° O′<br>LONGITUDE: O° O° O′ | 0.505 | ... |
| 611c047 | LATITUDE: O° O° O′<br>LONGITUDE: O° O° O′ | 0.447 | | b204066 | LATITUDE: O° O° O′<br>LONGITUDE: O° O° O′ | 0.111 | ... |
| ... | ... | ... | | ... | ... | ... | ... |

THIRD COMMUNICATION CARRIER

SECOND COMMUNICATION CARRIER

FIRST COMMUNICATION CARRIER

| CELL ID 231 | TIME INFORMATION 232 | CONGESTION DEGREE INFORMATION 233 | COMMUNICATION COST PER PACKET 234 |
|---|---|---|---|
| 0001 | 8:00 – 17:00 | 0.00 – 0.25 | \0.10 |
| | | 0.25 – 0.75 | \0.18 |
| | | 0.75 – 1.00 | \0.25 |
| | 17:00 – 1:00 | 0.00 – 0.25 | \0.18 |
| | | 0.25 – 0.50 | \0.23 |
| | | 0.50 – 0.75 | \0.28 |
| | | 0.75 – 1.00 | \0.35 |
| | 1:00 – 8:00 | 0.00 – 0.50 | \0.05 |
| | | 0.50 – 1.00 | \0.15 |
| ⋮ | ⋮ | ⋮ | ⋮ |
| 0077 | 8:00 – 17:00 | 0.00 – 0.25 | \0.15 |
| | | 0.25 – 0.75 | \0.20 |
| | | 0.75 – 1.00 | \0.28 |
| | ⋮ | ⋮ | ⋮ |
| ⋮ | ⋮ | ⋮ | ⋮ |
| 00AF | ⋮ | ⋮ | ⋮ |
| | 1:00 – 8:00 | 0.00 – 0.50 | \0.10 |
| | | 0.50 – 1.00 | \0.25 |

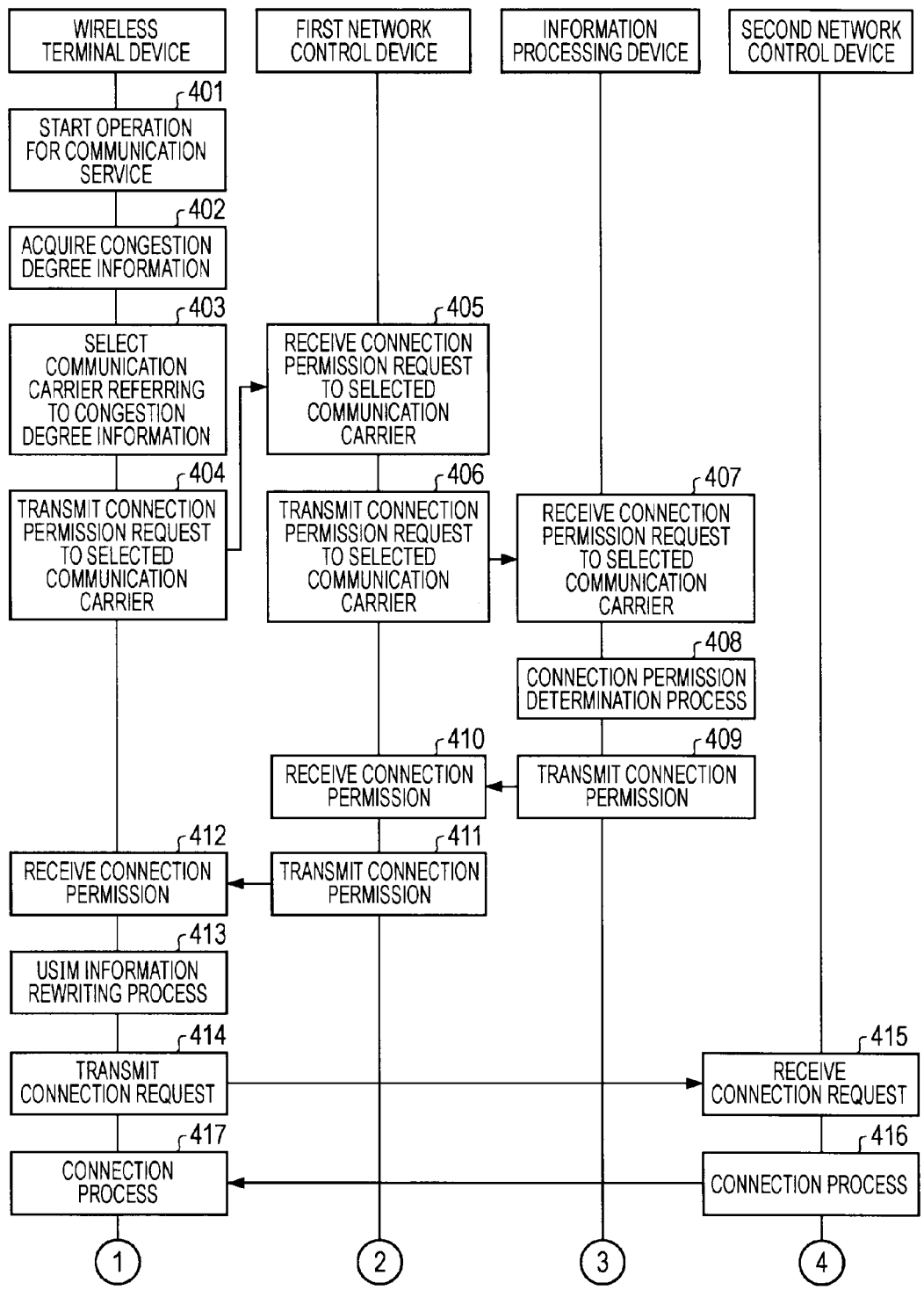

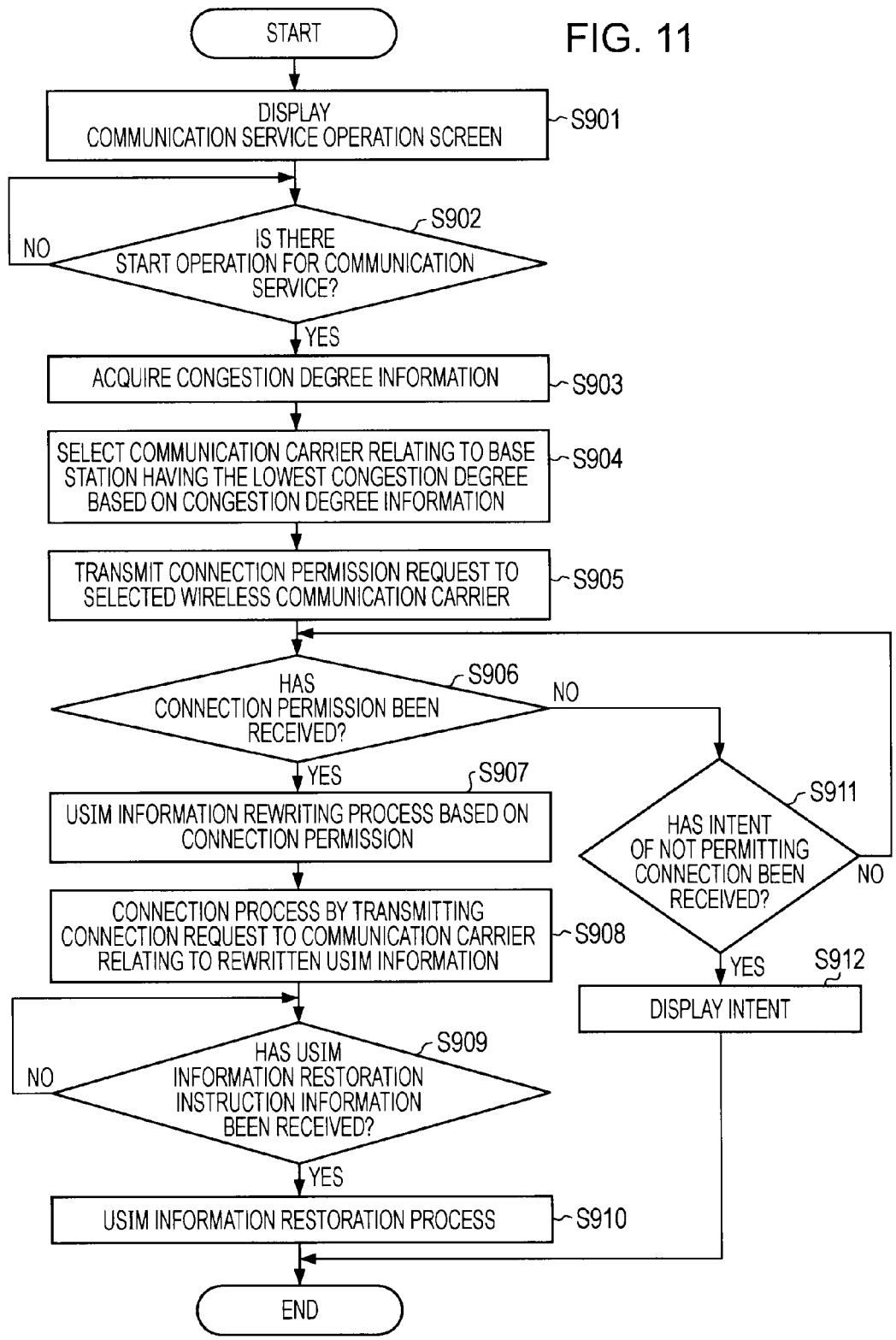

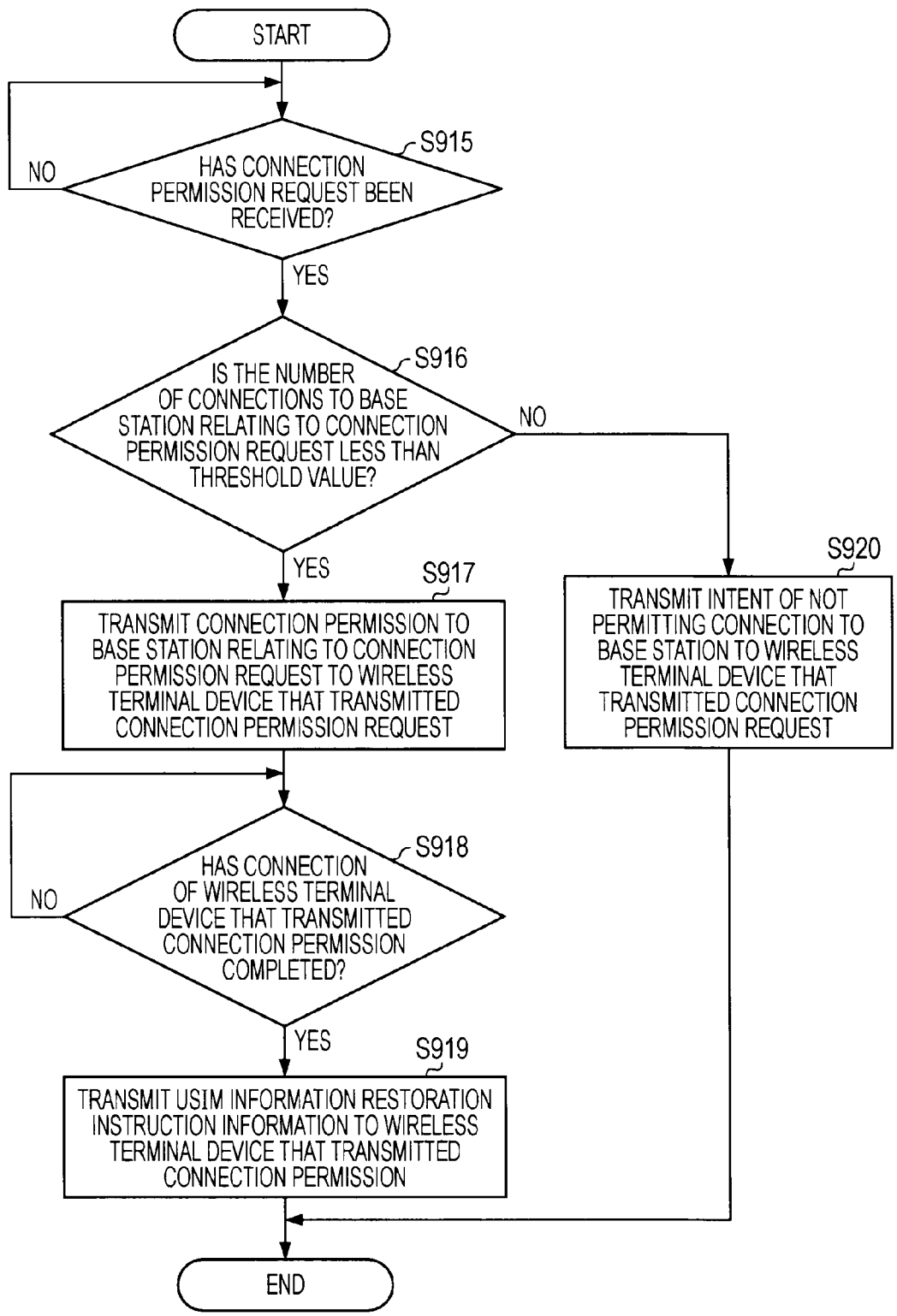

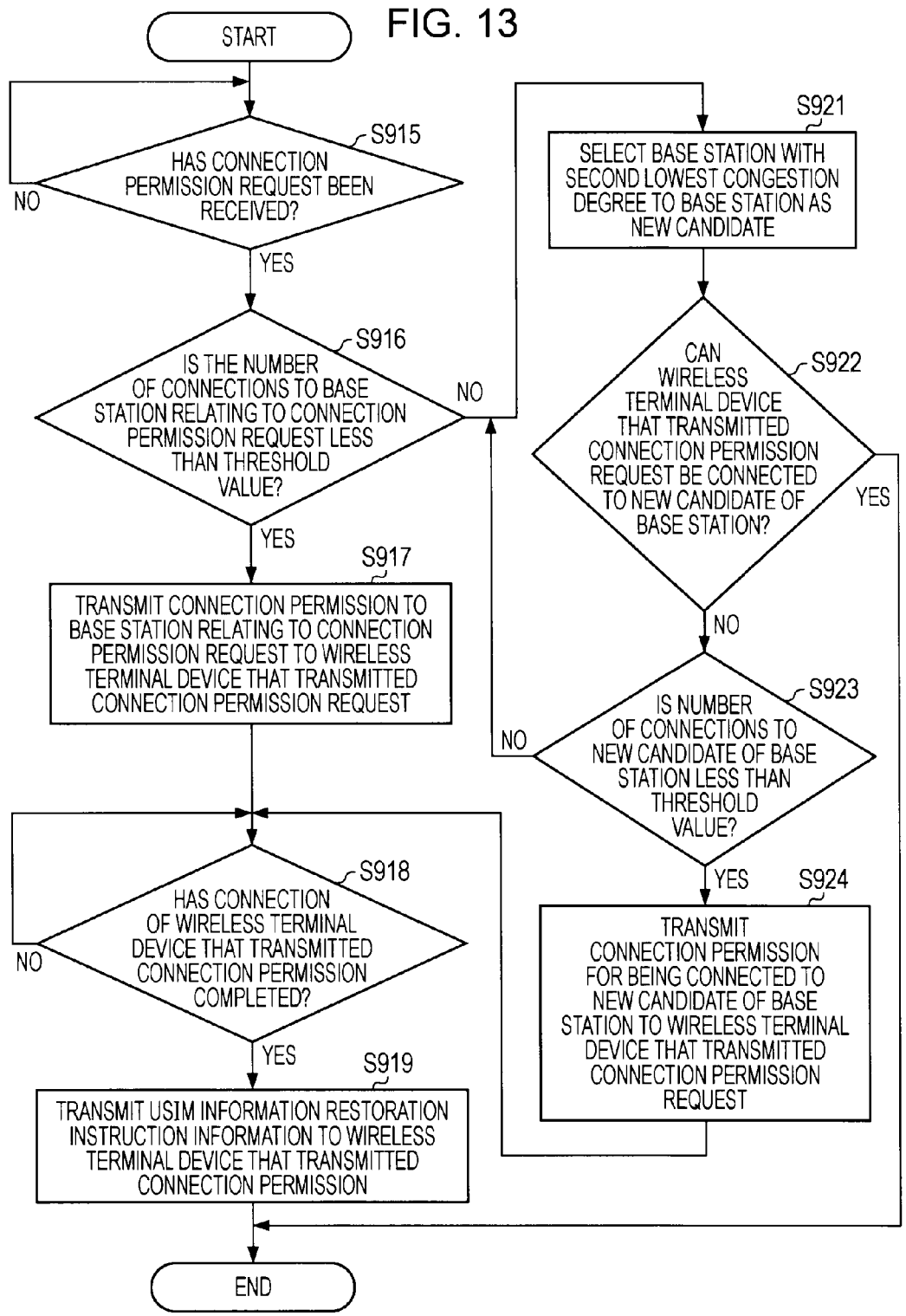

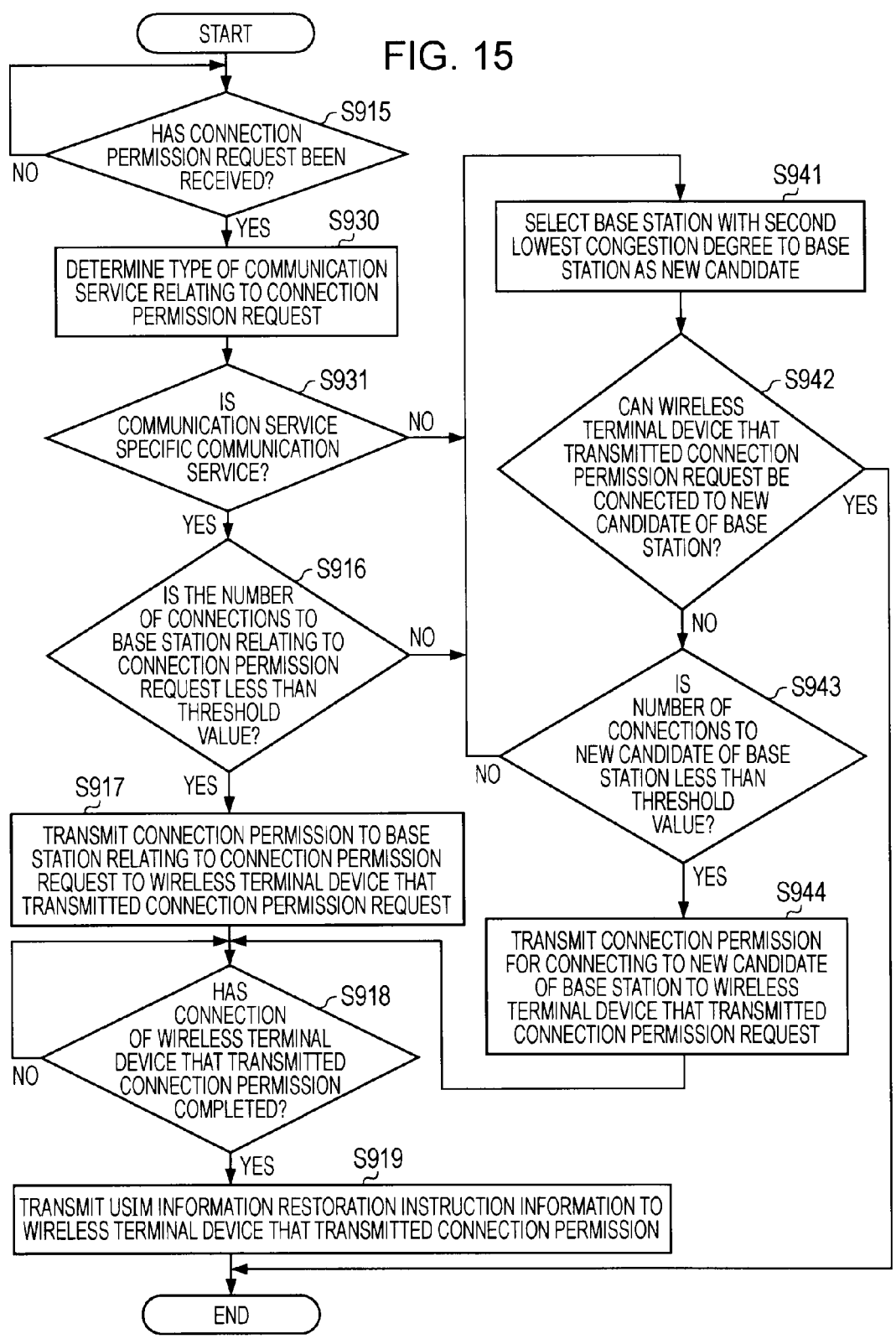

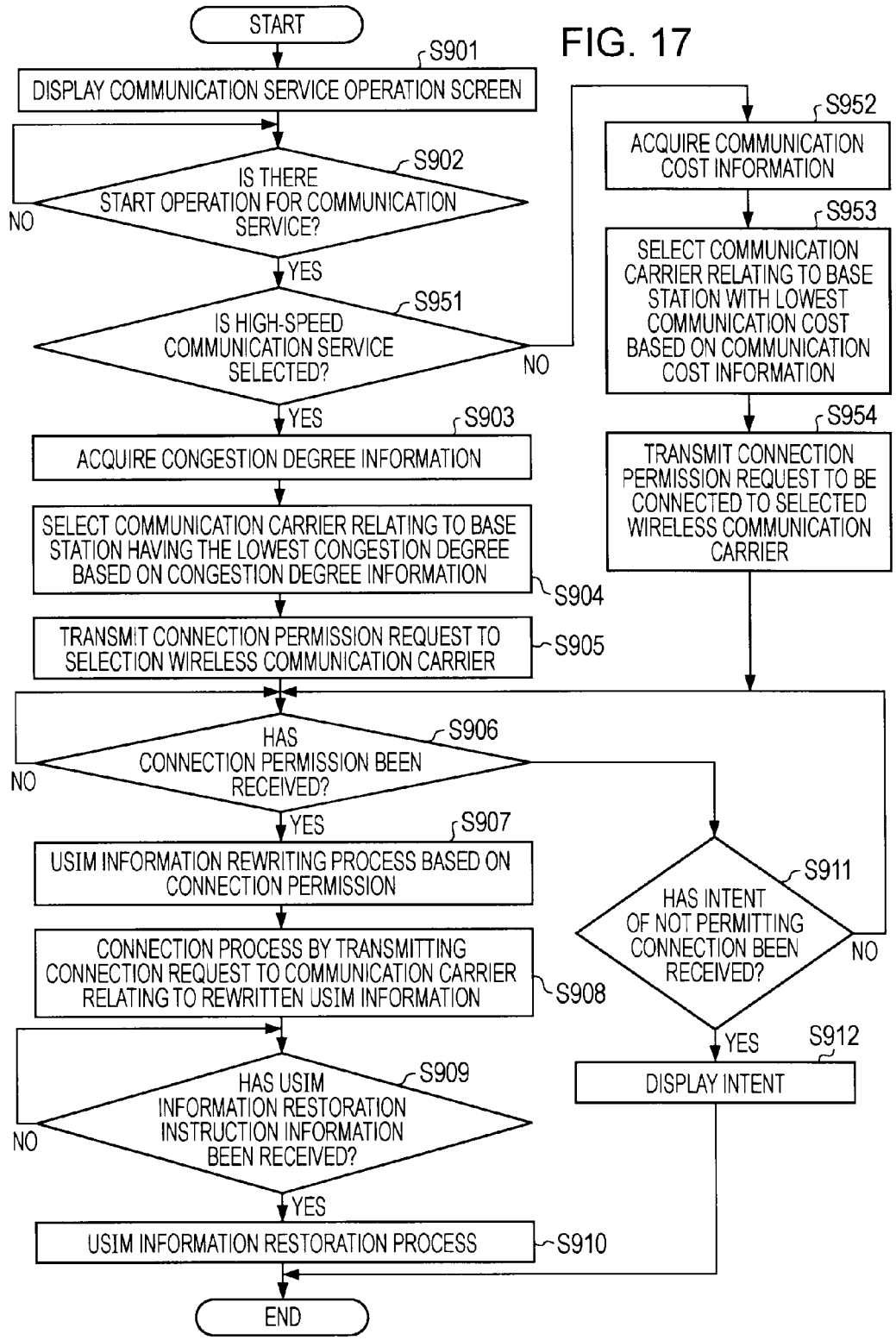

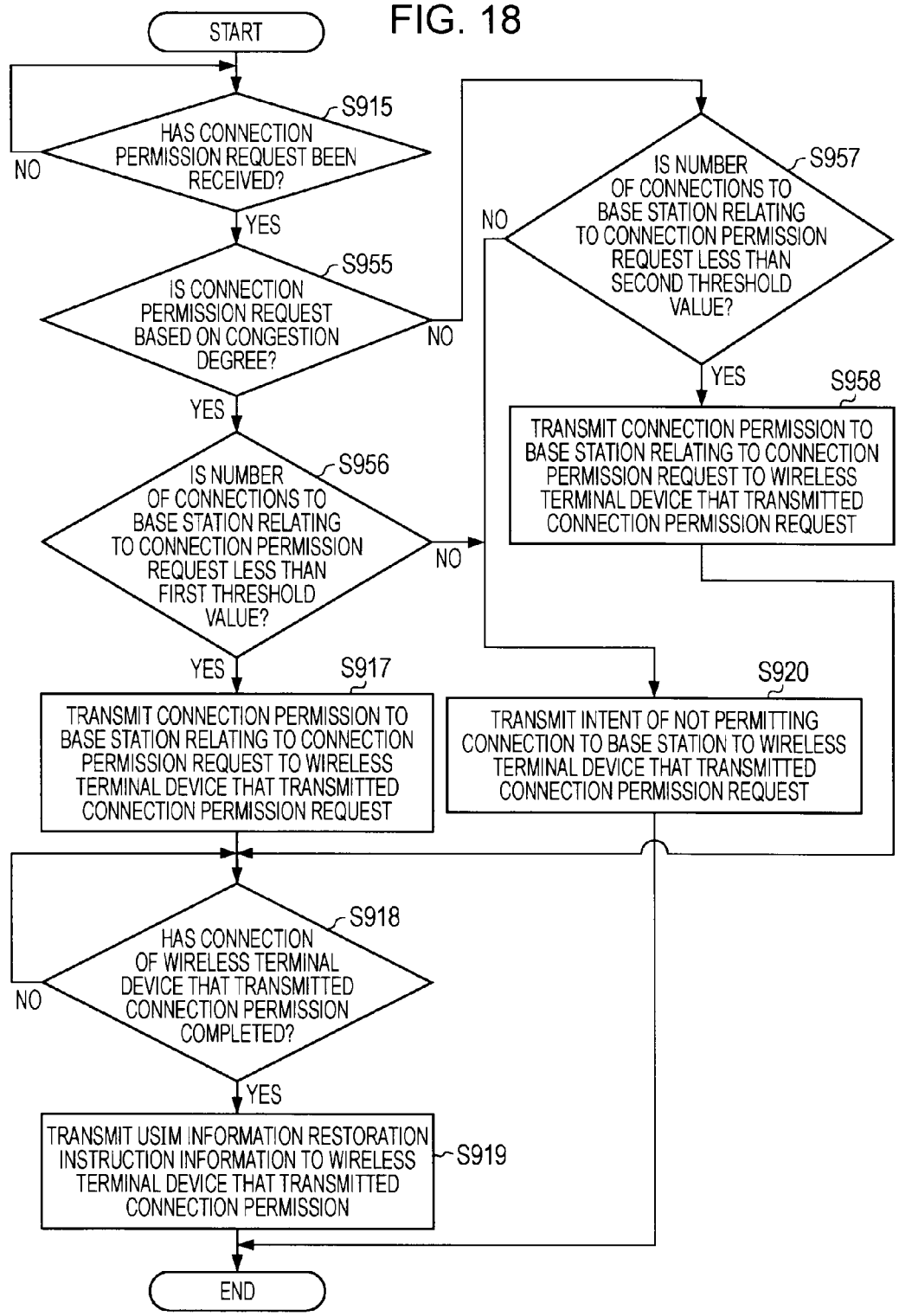

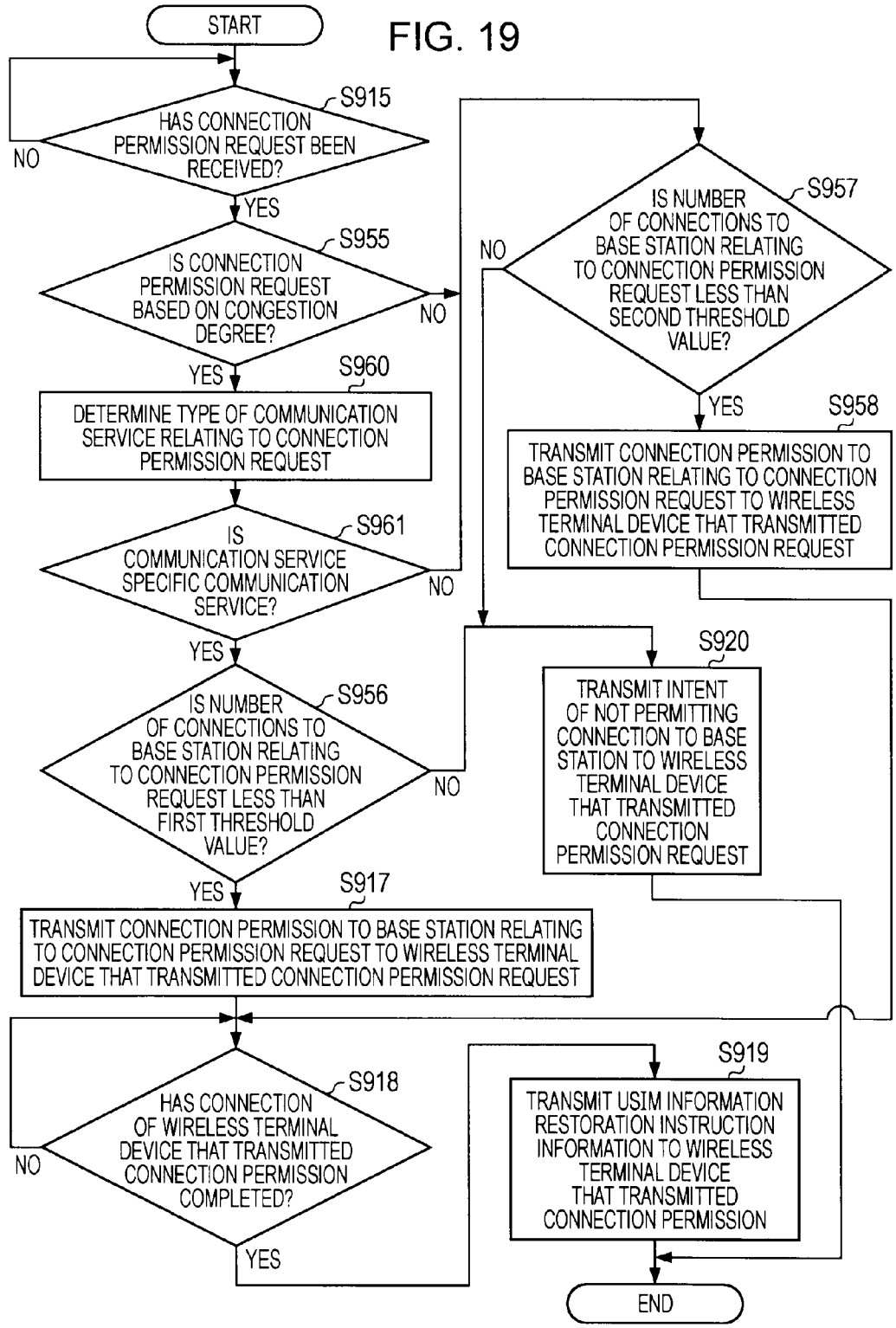

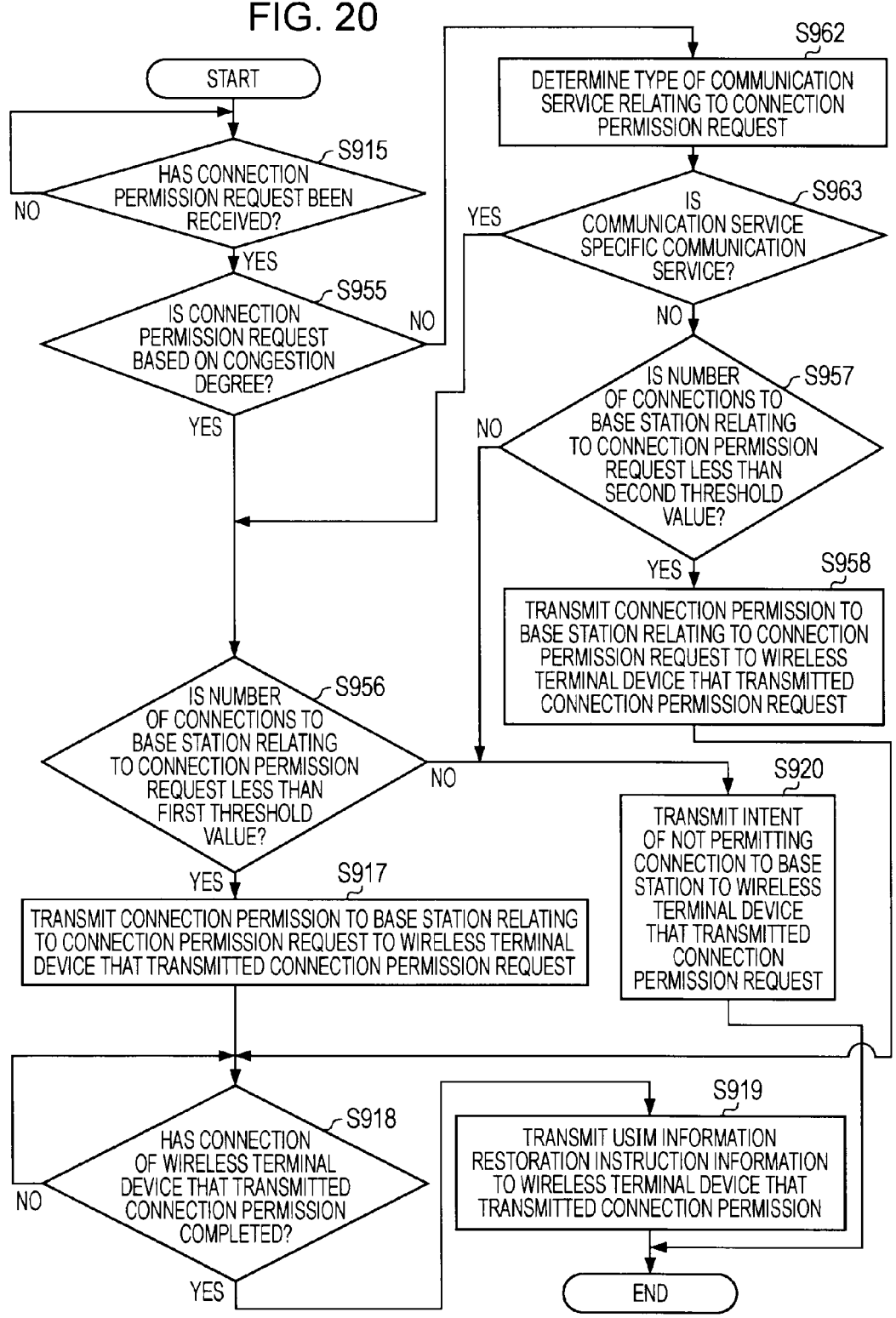

FIG. 21A

| 551 | 552 | 553 |
|---|---|---|
| APPLICATION LEVEL | TYPE OF COMMUNICATION SERVICE (TYPE OF APPLICATION) | LIMITED PROTOCOL/PORT |
| L1 | E-MAIL TRANSMISSION AND RECEPTION<br>VIEWING TEXT ON THE INTERNET<br>VoIP | POP3 TCP/995<br>HTTPS TCP/443 |
| L2 | VIEWING STILL IMAGE ON THE INTERNET<br>DOWNLOADING IMAGE FILE | HTTPS TCP/443 |
| L3 | FLASH MOVING IMAGE<br>VIEWING THE INTERNET INCLUDING MOVING IMAGE<br>DOWNLOADING MOVING IMAGE FILE | HTTPS TCP/443<br>TELNET TCP/23<br>FTPS TCP/989, 990 |

FIG. 21B

| 561 | 562 |
|---|---|
| CONGESTION DEGREE $k_{cong}$ | PERMITTED APPLICATION LEVEL |
| $0.9 < k_{cong} \leq 1.0$ | L1 |
| $0.8 < k_{cong} \leq 0.9$ | L1 |
| $0.7 < k_{cong} \leq 0.8$ | L1 |
| $0.6 < k_{cong} \leq 0.7$ | L1, L2 |
| $0.5 < k_{cong} \leq 0.6$ | L1, L2 |
| $0.4 < k_{cong} \leq 0.5$ | L1, L2 |
| $0.3 < k_{cong} \leq 0.4$ | L1, L2, L3 |
| $0.2 < k_{cong} \leq 0.3$ | L1, L2, L3 |
| $0.1 < k_{cong} \leq 0.2$ | L1, L2, L3 |
| $k_{cong} \leq 0.1$ | L1, L2, L3 |

| TERMINAL IDENTIFICATION INFORMATION 621 | CELL ID 622 | CONNECTION PERMITTING COMMUNICATION CARRIER 623 | SERVICE TYPE 624 | CONGESTION DEGREE FLAG 625 | COMMUNICATION COST FLAG 626 | WEIGHTED COEFFICIENT 627 | CONNECTION POINT CHANGE CANDIDATE 628 |
|---|---|---|---|---|---|---|---|
| 1111-0000-2222 | c5c00a | SECOND COMMUNICATION CARRIER | C1 | 1 | 0 | 1.25 | 1 |
| 1111-1234-5678 | b2640d4 | FIRST COMMUNICATION CARRIER | C1 | 1 | 0 | 0.85 | 0 |
| ... | ... | ... | ... | ... | ... | ... | ... |
| 1234-2222-4321 | 5f2407d | THIRD COMMUNICATION CARRIER | I1 | 0 | 1 | 0.77 | 1 |

INFORMATION PROCESSING METHOD, INFORMATION PROCESSING DEVICE COMMUNICATION SYSTEM

BACKGROUND

The present disclosure relates to an information processing method, and particularly to an information processing method, an information processing device, and a communication system pertaining to wireless communication.

In the related art, wireless communication devices have been widely distributed which connect to a network including a public wireless network, or the like. In addition, the 3G type mobile telephone service (which is called the third generation in Japan) was started in 2002. In the mobile telephone service, services including voice, email, and the like having a less number of packets were the main applications. With the adoption of HSDPA (High Speed Downlink Packet Access), or the like, however, the user's utilization behavior has been changing to downloading packets of a relatively large size such as downloading music files, viewing videos, and the like.

In addition, it is assumed that users are concentrated on a specific area (base station), and accordingly, traffic is concentrated regionally due to downloading large capacity packets. In this case, a problem occurs in that a sufficient communication rate is not obtained, or the like.

Thus, when a request for distributing content is made from a wireless communication device, for example, a distribution system has been proposed in which the possibility of the distribution is determined according to the reception environment in a wireless communication device (for example, refer to Japanese Unexamined Patent Application Publication No. 2002-78020).

SUMMARY

In the related art described above, when the reception environment is not favorable for a wireless communication device, distribution of content is not performed in the wireless communication device. In this case, for example, the distribution itself is stopped, or the reception environment is judged after a predetermined time passes and then the possibility of the distribution is determined again according to the reception environment.

However, when the reception environment is not favorable for the wireless communication device, there is a possibility of getting a proper wireless connection service in a way that the wireless communication device uses another wireless communication network.

It is desirable for the present disclosure to provide a proper wireless connection service.

The present disclosure is implemented in order to solve the above problem, and according to an embodiment of the present disclosure, there are provided an information processing method and a program that causes a computer to execute the method, which includes determining, when a connection request for connecting, via a base station relating to a first communication carrier, a first wireless communication device to a base station relating to a second communication carrier is received from the first wireless communication device, permission or non-permission for the connection request based on connection information on the number of wireless communication devices connected to the base station relating to the connection request, and setting a connection right to be connected to the base station relating to the connection request to the first wireless communication device when permission is determined in the determining. Accordingly, when the connection request is received from the first wireless communication device, permission or non-permission for the connection request is determined based on the connection information on the number of wireless communication devices connected to the base station relating to the connection request, and when permission is determined, an effect is exhibited such that the connection right to be connected to the base station relating to the connection request is set to the first wireless communication device is brought.

In the determining, the connection information may be compared to a threshold value, and permission or non-permission for the connection request may be determined based on the comparison result. Accordingly, an effect is exhibited such that the connection information and the threshold value are compared and permission or non-permission for the connection request is determined based on the comparison result is brought.

In addition, according to the embodiment, the connection request may be a connection request for being connected to the base station with the lowest congestion degree among a plurality of base stations to which the first wireless communication device can be connected, in the determining, when the number of wireless communication devices connected to the base station relating to the connection request is great based on the threshold value as a standard, a base station with the next lowest congestion degree to the base station relating to the connection request among the plurality of base stations to which the first wireless communication device can be connected may be set to a target base station, and when the number of wireless communication devices connected to the target base station is less based on the threshold value as a standard, permission for connection to the target base station may be determined, and when the number is great based on the threshold value as a standard, such determination may be performed for the target base station by setting a base station with the further next lowest congestion degree to the target base station among the plurality of base stations to which the first wireless communication device can be connected as a new target base station, and, in the setting, a connection right to be connected to the target base station for which permission is determined in the determining may be set to the first wireless communication device. Furthermore, herein, the case where the number is great based on the threshold value as a standard includes both meanings of when the number is equal to or greater than the threshold value and when the number is greater than the threshold value. In addition, the case where the number is less based on the threshold value as a standard includes both meanings of when the number is equal to or less than the threshold value and when the number is less than the threshold value. However, when the case where the number is great based on the threshold value as a standard indicates being equal to or greater than the threshold, the case where the number is less based on the threshold value as a standard indicates being less than the threshold value. On the other hand, when the case where the number is great based on the threshold value as a standard indicates being greater than the threshold value, the case where the number is less based on the threshold value as a standard indicates being equal to or less than the threshold value. Accordingly, an effect is exhibited such that, when the number of wireless communication devices connected to the base station relating to the connection request is great based on the threshold value as a standard, a base station with the next lowest congestion degree to the base station relating to the connection request among the plurality of base stations to which the first wireless communication device can be connected is set to a target base station, and when the number of wireless communication devices connected to the target base station is less based on the threshold value as a standard, permission for connection to the target base station is determined, and when the number is great based on the threshold value as a standard, such determination is performed for the target base station by setting a base station with the further next lowest congestion degree to the target base station among the plurality of base stations to which the first wireless communication device can be connected as a new target base station, and a connection right to be connected to the target base station for which permission is determined in the determining is set to the first wireless communication device.

In addition, according to the embodiment, in the determining, when the number of wireless communication devices connected to the base station relating to the connection request is less based on the threshold value as a standard, permission for the connection request may be determined, and when the number is great based on the threshold value as a standard, non-permission for the connection request may be determined. Accordingly, an effect is exhibited such that, when the number of wireless communication devices connected to the base station relating to the connection request is less based on the threshold value as a standard, permission for the connection request is determined, and when the number is great based on the threshold value as a standard, non-permission for the connection request is determined.

In addition, according to the embodiment, displaying, when non-permission for the connection request is determined in the determining, the intent of non-permission in the first wireless communication device may be further included. Accordingly, an effect is exhibited such that, when non-permission for the connection request is determined, the intent of non-permission is displayed in the first wireless communication device.

In addition, according to the embodiment, when a communication service relating to the connection request is not a specific communication service, the determination may be performed after a fixed time passes after the reception of the connection request in the determining, and, when permission for the connection request is determined after the fixed time passes, the connection right may be set to the first wireless communication device in the setting. Accordingly, an effect is exhibited such that, when a communication service relating to the connection request is not a specific communication service, the determination is performed after a fixed time passes after the reception of the connection request, and, when permission for the connection request is determined after the fixed time passes, the connection right is set to the first wireless communication device in the setting.

In addition, according to the embodiment, in the determining, when the communication service relating to the connection request is not a specific communication service, a base station with the next lowest congestion degree to the base station relating to the connection request among a plurality of base stations to which the first wireless communication device can be connected may be set as a target base station, when the number of wireless communication devices connected to the target base station is less based on the threshold value as a standard, permission for connection to the target base station may be determined, and when the number is great based on the threshold value as a standard, non-permission for connection to the target base station may be determined, and, in the setting, the connection right to be connected to the target base station for which permission is determined in the determining may be set for the first wireless communication device. Accordingly, an effect is exhibited that, when the communication service relating to the connection request is not a specific communication service, a base station with the next lowest congestion degree to the base station relating to the connection request among a plurality of base stations to which the first wireless communication device can be connected is set as a target base station, when the number of wireless communication devices connected to the target base station is less based on a threshold value as a standard, permission for connection to the target base station is determined, when the number is great based on the threshold value as a standard, non-permission for connection to the target base station is determined, and, the connection right to be connected to the target base station for which permission is determined is set for the first wireless communication device.

In addition, according to the embodiment, the connection request may be a first connection request for being connected to a base station that is selected based on the congestion degree relating to a plurality of base stations to which the first wireless communication device can be connected, or a second connection request for being connected to a base station that is selected based on a communication cost relating to the plurality of base stations to which the first wireless communication device can be connected, and in the determining, the determination may be performed using threshold values that are different depending on whether the connection request is the first connection request or the second connection request. Accordingly, an effect is exhibited such that determination is performed using threshold values that are different depending on whether the connection request is the first connection request or the second connection request.

In addition, according to the embodiment, in the determining, when the connection request is the first connection request, the determination may be performed using a first threshold value as the threshold value, and when the connection request is the second connection request, the determination may be performed using a second threshold value as the threshold value, in which conditions are further alleviated than in the first threshold value. Accordingly, an effect is exhibited such that, when the connection request is the first connection request, determination is performed using the first threshold value, and when the connection request is the second connection request, determination is performed using the second threshold value, in which conditions are further alleviated than in the first threshold value.

In addition, according to the embodiment, in the determining, when the type of the communication service relating to the connection request is a specific communication service regardless of whether the connection request is the first connection request or the second connection request, the determination may be performed using the first threshold value. Accordingly, an effect is exhibited such that, when the type of the communication service relating to the connection request is a specific communication service regardless of whether the connection request is the first connection request or the second connection request, the determination is performed using the first threshold value.

In addition, according to the embodiment, in the determining, a connection request to be permitted may be specified among the connection requests based on the congestion degree relating to a plurality of base stations to which the first wireless communication device can be connected and the type of a communication service relating to the connection request. Accordingly, an effect is exhibited such that a connection request to be permitted is specified among the connection requests based on the congestion degree relating to a plurality of base stations to which the first wireless communication device can be connected and the type of a communication service relating to the connection request.

In addition, according to the embodiment, the congestion degree of each base station may be transmitted to an information processing device that executes the determination after each wireless communication device detects the congestion degree, and frequency of transmitting congestion degrees detected by the wireless communication device to the information processing device may be increased as the distance between the wireless communication device and the base station is shortened, and frequency of transmitting congestion degrees detected by the wireless communication device to the information processing device may be reduced as the distance between the wireless communication device and the base station is lengthened. Accordingly, an effect is exhibited such that the frequency of transmitting congestion degrees detected by the wireless communication device to the information processing device is increased as the distance between the wireless communication device and the base station is shortened, and frequency of transmitting congestion degrees detected by the wireless communication device to the information processing device is reduced as the distance between the wireless communication device and the base station is lengthened.

In addition, according to the embodiment, extracting a wireless communication device is further included of which the type of a communication service relating to the connection request does not coincide with the type of a communication service communicated between the base station relating to the connection request after connection based on the set connection right, in the determining, when a wireless communication device, of which the types of the communication service do not coincide with each other, is extracted even if non-permission for the connection request is determined based on the comparison result, permission for the connection request may be determined, and in the setting, a connection right to be connected to a base station with the next lowest congestion degree to another base station relating to the connection right set in the extracted wireless communication device may be set in the wireless communication device. Accordingly, an effect is exhibited such that, when a wireless communication device, of which the type of the communication service relating to the connection request does not coincide with the type of a communication service performed between the base station relating to the connection request after connection based on the set connection right, is extracted even if non-permission for the connection request is determined based on the comparison result with the threshold value, permission for the connection request is determined, and a connection right to be connected to a base station with the next lowest congestion degree to another base station relating to the connection right set in the extracted wireless communication device is set in the extracted wireless communication device.

In addition, according to the embodiment, in the determining, the determination may be performed using a value, as the connection information, obtained by weighting the number of wireless communication devices connected to the base station relating to the connection request based on the distance between the base station and each of the wireless communication devices, or a value obtained by weighting the number of wireless communication devices based on a signal-power-to-interference-power ratio of a pilot signal received from the base station. Accordingly, an effect is exhibited such that determination is performed using a value obtained by weighting the number of wireless communication devices connected to the base station relating to the connection request based on the distance between the base station and each of the wireless communication devices, or a value obtained by weighting the number of wireless communication devices based on a signal-power-to-interference-power ratio of a pilot signal received from the base station.

In addition, according to the embodiment, the base station relating to the connection request may be selected based on the congestion degrees or a predicted communication rate of a plurality of base stations. Accordingly, an effect is exhibited such that the base station relating to the connection request is selected based on the congestion degrees or a predicted communication rate of a plurality of base stations.

In addition, according to the embodiment, determining a service type may be further included by determining whether a service is a continuously provided communication service or an intermittently provided communication service based on at least one of a connection point, a protocol, and a port number included in the connection request. Accordingly, an effect is exhibited of determining whether a service is a continuously provided communication service or an intermittently provided communication service.

In addition, according to the embodiment, in the determining, when the communication service relating to the connection request is a specific communication service, a base station corresponding to the orthogonal frequency division multiple access scheme among a plurality of base stations to which the first wireless communication device can be connected may be set as a target base station, when the communication service relating to the connection request is not a specific communication service, a base station corresponding to the code division multiplexing access scheme among the plurality of base stations to which the first wireless communication device can be connected may be set as a target base station, and when the number of wireless communication devices connected to the target base station is small based on a threshold value, permission for connection to the target base station may be determined, and when the number is great based on the threshold value, non-permission for connection to the target base station may be determined, and in the setting, the connection right to be connected to the target base station to which connection is determined to be permitted in the determining may be set in the first wireless communication device. Accordingly, an effect is exhibited such that, when the number of wireless communication devices connected to the target base station is small based on the threshold value, permission for connection to the target base station is determined, when the number is great based on the threshold value, non-permission for connection to the target base station is determined, and the connection right to be connected to the target base station to which connection is determined to be permitted in the determining may be set in the first wireless communication device.

In addition, according to the embodiment, in the determining, when the communication service relating to the connection request is a specific communication service, a base station corresponding to the orthogonal frequency division multiple access scheme among the plurality of base stations to which the first wireless communication device can be connected may be set as a target base station, when the number of wireless communication devices connected to the target base station is small based on a threshold value, permission for connection to the target base station may be determined, and when the number is great based on the threshold value, a base station corresponding to the code division multiplexing access scheme among the plurality of base stations to which the first wireless communication device can be connected may be set as a new target base station, when the number of wireless communication devices connected to the target base station is small based on a threshold value, permission for connection to the base station may be determined, and when the number is great based on the threshold value, non-permission for connection to the target base station may be determined, and in the setting, the connection right to be connected to the target base station to which connection is determined to be permitted in the determining may be set in the first wireless communication device. Accordingly, an effect is exhibited such that, when the number of wireless communication devices connected to the target base station is small based on the threshold value, permission for connection to the target base station is determined, when the number is great based on the threshold value, non-permission for connection to the target base station is determined, and the connection right to be connected to the target base station to which connection is determined to be permitted in the determining may be set in the first wireless communication device.

In addition, according to the embodiment, extracting a wireless communication device of which the type of a communication service relating to the connection request does not coincide with the type of a communication service communicated between the base station relating to the connection request after connection based on the set connection right is further included, in the determining, when a wireless communication device, of which the types of the communication services do not coincide with each other, is extracted even if non-permission is determined for the connection request based on the comparison result, permission for the connection request may be determined, and in the setting, the extracted wireless communication device may be set with the connection right to be connected to a base station corresponding to the code division multiplexing access scheme from a base station corresponding to the orthogonal frequency division multiple access scheme relating to a connection right set in the wireless communication device. Accordingly, an effect is exhibited such that, when a wireless communication device, of which the types of the communication services do not coincide with each other, is extracted even if non-permission for the connection request is determined based on the comparison result, permission for the connection request is determined, and the extracted wireless communication device is set with the connection right to be connected to the base station corresponding to the code division multiplexing access scheme from the base station corresponding to the orthogonal frequency division multiple access scheme relating to the connection right set in the wireless communication device.

In addition, according to another embodiment of the present disclosure, there are provided an information processing device, an information processing method thereof, and a program that causes a computer to execute the method, the device including a determination unit that determines, when a connection request for connecting, via a base station relating to a first communication carrier, a first wireless communication device to a base station relating to a second communication carrier is received from the first wireless communication device, permission or non-permission for the connection request based on connection information on the number of wireless communication devices connected to a base station relating to the connection request, and a control unit that controls to set a connection right to be connected to the base station relating to the connection request to the first wireless communication device when permission is determined by the determination unit. Accordingly, an effect is exhibited such that, when the connection request is received from the first wireless communication device, permission or non-permission for the connection request is determined based on connection information on the number of wireless communication devices connected to the base station relating to the connection request, and when permission is determined, the connection right to be connected to the base station relating to the connection request is set to the first wireless communication device.

In addition, according to still another embodiment of the present disclosure, there are provided a communication system including a first wireless communication device that can be connected to a base station relating to a first communication carrier, and an information processing device that includes a determination unit that determines, when a connection request for being connected to a base station relating to a second communication carrier is received from the first wireless communication device via the base station relating to the first communication carrier, permission or non-permission for the connection request is determined based on connection information on the number of wireless communication devices connected to a base station relating to the connection request, and a control unit that controls to set a connection right to be connected to the base station relating to the connection request to the first wireless communication device when permission is determined by the determination unit, an information processing method, and a program that causes a computer to execute the method. Accordingly, an effect is exhibited such that, when the connection request is received from the first wireless communication device, permission or non-permission for the connection request based on the connection information on the number of wireless communication devices connected to the base station relating to the connection request, and when permission is determined, the connection right to be connected to the base station relating to the connection request is set to the first wireless communication device.

According to the present disclosure, an excellent effect in that a proper wireless connection service can be provided is exhibited.

BRIEF DESCRIPTION OF THE DRAWINGS

FIG. 4 is a diagram schematically showing an example of stored content of a congestion degree information retaining unit according to the first embodiment of the present disclosure;

FIG. 5 is a diagram schematically showing an example of retained content of a communication cost information retaining unit according to the first embodiment of the present disclosure;

FIG. 8 is a sequence chart showing a communication processing example between each device constituting the communication system according to the first embodiment of the present disclosure;

FIG. 11 is a flowchart showing an example of a processing procedure of a communication service control process by the wireless communication device according to the first embodiment of the present disclosure;

FIG. 12 is a flowchart showing an example of a processing procedure of a USIM information rewriting control process by the information processing device according to the first embodiment of the present disclosure;

FIG. 13 is a flowchart showing an example of the processing procedure of the USIM information rewriting control process by the information processing device according to the first embodiment of the present disclosure;

FIG. 15 is a flowchart showing an example of a processing procedure of the USIM information rewriting control process by the information processing device according to the first embodiment of the present disclosure;

FIG. 17 is a flowchart showing an example of a processing procedure of a communication service control process by the wireless communication device according to the first embodiment of the present disclosure;

FIG. 18 is a flowchart showing an example of a processing procedure of the USIM information rewriting control process by the information processing device according to the first embodiment of the present disclosure;

FIG. 19 is a flowchart showing an example of a processing procedure of the USIM information rewriting control process by the information processing device according to the first embodiment of the present disclosure;

FIG. 20 is a flowchart showing an example of the processing procedure of the USIM information rewriting control process by the information processing device according to the first embodiment of the present disclosure;

FIGS. 21A and 21B are diagrams showing an example of criteria of determination used in a connection determination process by a connection permission determination unit according to the first embodiment of the present disclosure;

DETAILED DESCRIPTION OF EMBODIMENTS

Hereinafter, embodiments for implementing the present disclosure (hereinafter, referred to as embodiments) will be described. Description thereof will be provided in the following order.

1. First Embodiment (USIM (Universal Subscriber Identity Module) information rewriting control: An example in which a connection permission determination process is performed according to a request of connection permission from a wireless communication device and USIM information is rewritten based on the determination result)

2. Second Embodiment (USIM information rewriting control: An example in which a connection permission determination process is performed according to a request of connection permission from a wireless communication device and, when a predetermined condition is satisfied, USIM information of the wireless communication device and a connection point change candidate is rewritten)

1. First Embodiment

Configuration Example of Communication System

Figure 1:
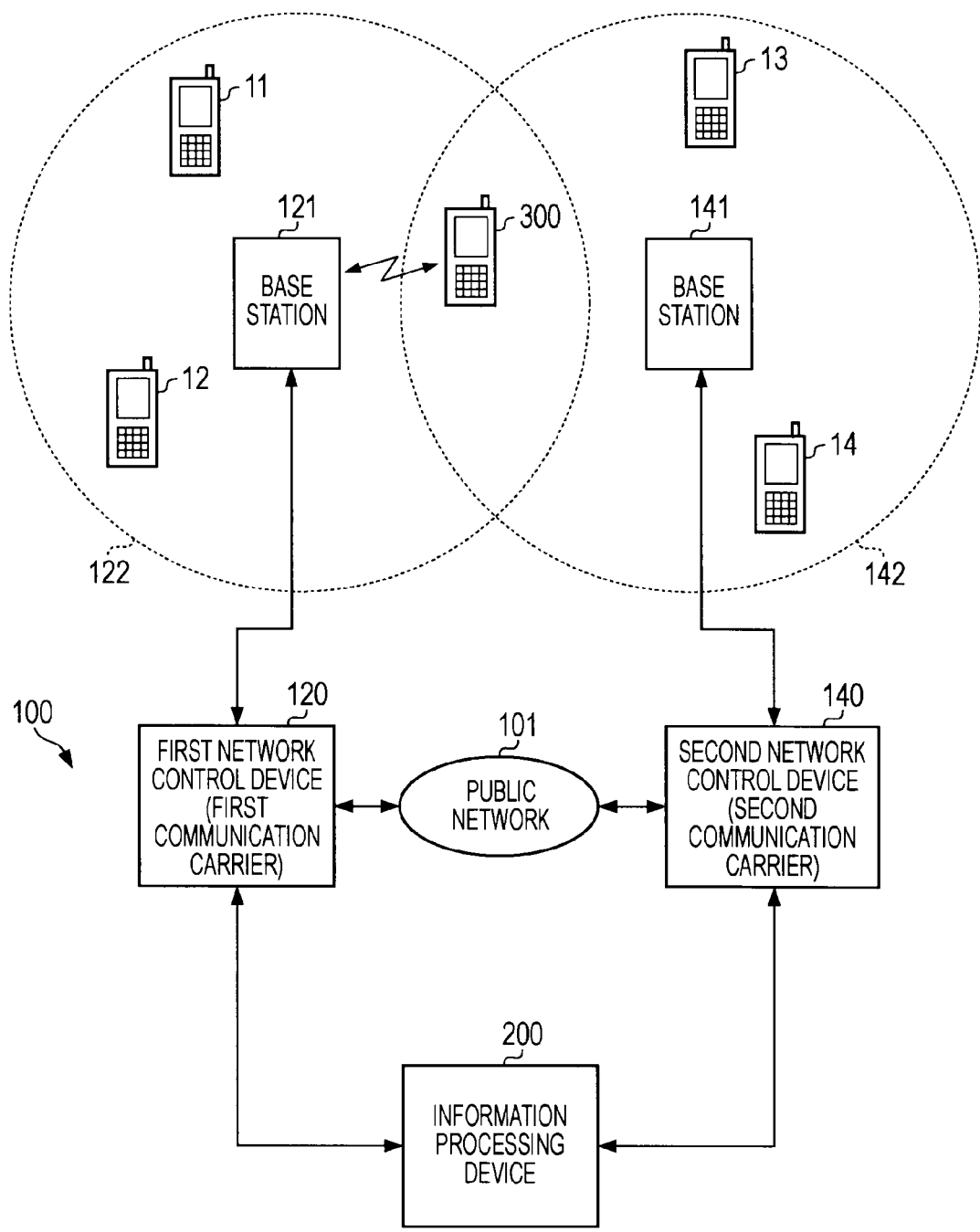
FIG. 1 is a block diagram showing a system configuration example of a communication system according to a first embodiment of the present disclosure.

FIG. 1 is a block diagram showing a system configuration example of a communication system 100 according to a first embodiment of the present disclosure.

The communication system 100 includes a public network 101, a first network control device 120, a second network control device 140, base stations 121 and 141, an information processing device 200, and a plurality of wireless communication devices (11 to 14, 300, and the like). Furthermore, the wireless communication device 300 is, for example, a mobile telephone device (for example, a mobile telephone device or a smartphone having a call function and a data communication function), a data communication device (for example, a personal computer) having a wireless communication function, or the like. In addition, each wireless communication device has an initial setting of the parameters necessary for being connected to wireless communication networks that are managed and operated by at least one communication carrier based on a contract with each communication carrier (or a contract with a carrier equivalent to the form of a virtual communication enterprise). The setting of the parameters is performed by, for example, rewriting USIM information necessary for connecting to a wireless communication network managed by a communication carrier.

The public network 101 is a public network such as a telephone network, the Internet, or the like. In addition, the public network 101 is connected to the first network control device 120 and the second network control device 140 through a gateway (not shown in the drawing).

The base station 121 is a base station managed by a first communication carrier, and is a mobile communication base station (NodeB) that connects a wireless communication device retaining USIM information of the first communication carrier and the first network control device 120 through a radio channel. Herein, the USIM information is an example of contract authentication information, and the contract authentication information is information including telephone subscriber information and authentication key information. In other words, a user who owns the wireless communication device 300 makes a contract with the first communication carrier in regard to a wireless connection service. In addition, the contract is also a contract that enables the user who owns the wireless communication device 300 to use the base station 121 that is operated by the first communication carrier.

The base station 141 is a base station that is operated by a second communication carrier, and is a mobile communication base station (NodeB) that connects a wireless communication device retaining USIM information of the second communication carrier and the second network control device 140 through a radio channel. Furthermore, the first communication carrier and the second communication carrier are mobile communication carriers that provide a wireless connection service.

In addition, FIG. 1 shows a range where radio waves of the base station 121 reach (wireless communication range) as a cell 122 and a range where radio waves of the base station 141 reach (wireless communication range) as a cell 142.

Furthermore, in the embodiments of the present disclosure, a base station is set to have both meanings of a base station itself and a cell specified by the base station. For example, in the embodiments of the present disclosure, a contract for using a base station also means a contract for using a cell specified by the base station.

In addition, FIG. 1 shows only the first and the second communication carriers as communication carriers, but a case where there are three or more communication carriers can be applied in the same manner. For the sake of description simplicity, FIG. 1 shows only the base stations 121 and 141 as base stations operated by each communication carriers, but a case where there are three or more base stations operated by each communication carriers can be applied in the same manner.

The first network control device 120 is a communication control device managed by the first communication carrier that provides a wireless connection service, and performs authentication control of a wireless communication device connected through the base station 121. In addition, the first network control device 120 connects the authenticated wireless communication device to the public network 101 via a gateway (not shown in the drawing).

The second network control device 140 is a communication control device managed by the second communication carrier that provides a wireless connection service, and performs authentication control of a wireless communication device connected through the base station 141. In addition, the second network control device 140 connects the authenticated wireless communication device to the public network 101 via a gateway (not shown in the drawing).

Herein, the first network control device 120 authenticates only a wireless communication device retaining USIM information (contract authentication information) pertaining to the first communication carrier among wireless communication devices connected through the base station 121 except for a specific case. In addition, in the same manner, the second network control device 140 authenticates only a wireless communication device retaining USIM information (contract authentication information) pertaining to the second communication carrier among wireless communication devices connected through the base station 141 except for a specific case. Furthermore, such a specific case is, for example, a case of calling out in an emergency (for example, a case of calling out police officers or firefighters).

The first and the second network control devices 120 and 140 output various items of information transmitted from respective wireless communication devices through respective base stations to the information processing device 200, and transmits various items of information output from the information processing device 200 to respective wireless communication device through respective base stations.

The information processing device 200 is an information processing device operated by a carrier providing various communication services. In addition, the information processing device 200 performs a rewriting process and a restoration process of USIM information of a wireless communication device based on information from the first and the second network control devices 120 and 140. Herein, a carrier providing various communication services includes a communication carrier providing a wireless connection service, an MVNO (Mobile Virtual Network Operator) (a carrier of business in the form of so-called virtual communication), or the like. Furthermore, the information processing device 200 will be described in detail with reference to FIG. 3.

Herein, when there are a number of other wireless communication devices that are connected to the base station 121 that the wireless communication device 300 can be connected, a case is assumed in which a user of the wireless communication device 300 uses a high-speed communication service with the wireless communication device 300. For example, when there are a small number of other wireless communication devices that are connected to the base station 141 that the wireless communication device 300 can be connected to, it is assumed that it is possible to use a high-speed communication service by connecting the wireless communication device 300 to the base station 141. However, for example, when there is a large number of other wireless communication device connected to the base station 141 that the wireless communication device 300 is connected, it is also considered that it is difficult to use a high-speed communication service even when the wireless communication device 300 is connected to the base station 141. Thus, the first embodiment of the present disclosure shows that an example in which a proper base station (communication carrier) for the wireless communication device 300 is selected so as to make use of a desired communication service through the base station (communication carrier). In this case, for example, a connection permission determination process is performed in regard to the number of wireless communication devices connected to the selected base station, and USIM information is rewritten based on the determination result.

[Configuration Example of Wireless Communication Device]

Figure 2:
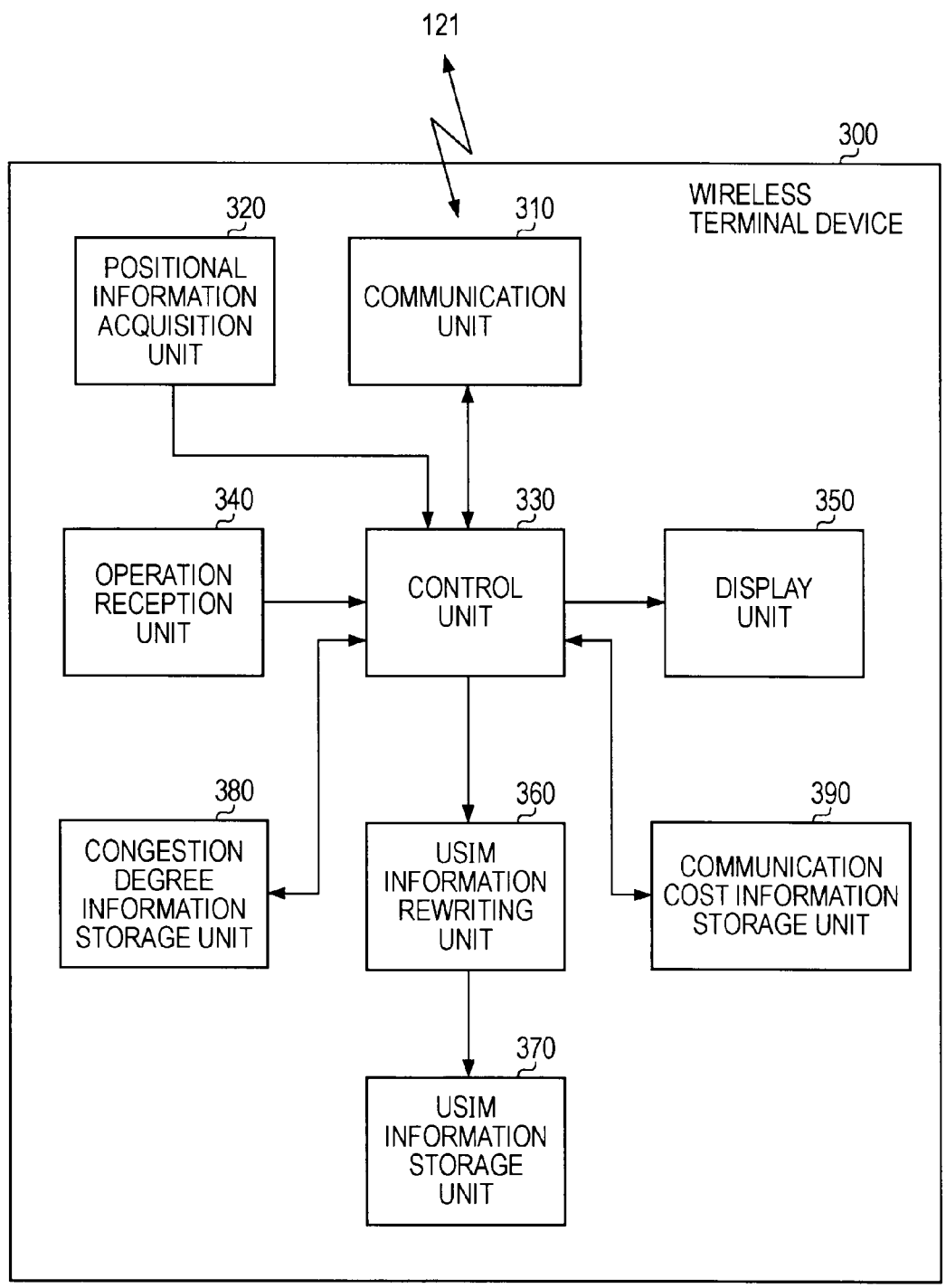
FIG. 2 is a block diagram showing a functional configuration example of a wireless communication device according to the first embodiment of the present disclosure.

FIG. 2 is a block diagram showing a functional configuration example of the wireless communication device 300 according to the first embodiment of the present disclosure.

The wireless communication device 300 includes a communication unit 310, a positional information acquisition unit 320, a control unit 330, an operation reception unit 340, a display unit 350, a USIM information rewriting unit 360, a USIM information storage unit 370, a congestion degree information storage unit 380, and a communication cost information storage unit 390. The wireless communication device 300 is realized by a mobile telephone device that can carry out, for example, phone calls and data communication. Furthermore, a microphone, a speaker, and the like are omitted from the drawing and description.

The communication unit 310 is a communication unit for a plurality of wireless communication services including a reception unit that receives radio signals transmitted from each base station and a transmission unit that transmits wireless signals to each base station. For example, the communication unit 310 can communicate according to CDMA (Code Division Multiple Access), or OFDMA (Orthogonal Frequency Division Multiple Access).

The positional information acquisition unit 320 acquires positional information indicating a position where the wireless communication device 300 is present, and outputs the acquired positional information to the control unit 330. The positional information acquisition unit 320 can be realized by a GPS unit that computes positional information based on GPS signals received by, for example, a GPS (Global Positioning System) signal reception antenna. The computed positional information includes various data pertaining to the position such as the latitude, the longitude, and the altitude at the time of receiving GPS signals. In addition, a positional information acquisition device may be used which acquires positional information by other positional information acquisition methods. A positional information acquisition device may be used, which acquires positional information by, for example, deriving the positional information using access point information that is linked to a wireless LAN (Local Area Network) present in the periphery thereof.

The control unit 330 is a unit that performs various control based on a control program saved in a memory (not shown in the drawing). The control unit 330 is constituted by, for example, a microprocessor. The control unit 330 is connected to, for example, the communication unit 310, and transmits and receives various data between the first and the second network control devices 120 and 140 connected through the base stations 121 and 141.

The operation reception unit 340 is an operation reception unit that receives an operation input operated by a user, and outputs signals according to the received operation input to the control unit 330. The operation reception unit 340 includes, for example, various keys including numeric keys, alphabet keys, and the like.

The display unit 350 is a display unit that displays various items of information (character information, time information, and the like) based on the control of the control unit 330. The display unit 350 displays, for example, information pertaining to before and after rewriting of USIM information (for example, a display screen shown in FIG. 10). Furthermore, as the display unit 350, it is possible to use a display panel, for example, an organic EL (Electro Luminescence) panel, an LCD (Liquid Crystal Display) panel, or the like. Furthermore, the operation reception unit 340 and the display unit 350 can be configured in an integrated manner using a touch panel that enables a user to perform an operation input by bringing a finger of the user into contact with or close to the display face thereof.

The USIM information rewriting unit 360 is to perform a rewriting process of USIM information (contract authentication information) retained in the USIM information storage unit 370 based on the control of the control unit 330. Herein, a state of retaining the USIM information pertaining to the first communication carrier can be understood as a state of having a connection right to connecting to the base station 121 pertaining to the first communication carrier. For example, it is possible to transfer the connection right through a validation process and invalidation process of the USIM information. In addition, it is possible to transfer the connection right through a forwarding process of the USIM information itself. In addition, the state of retaining the USIM information pertaining to the first communication carrier can be understood as a state in which parameters necessary for connecting to the base station 121 pertaining to the first communication carrier are set.

The USIM information storage unit 370 is a memory retaining the USIM information (contract authentication information). As the USIM information storage unit 370, for example, a UICC (Universal Integrated Circuit) card may be used, or a dedicated memory for securely keeping the USIM information may be used. Furthermore, when a UICC card is used as the USIM information storage unit 370, a card that enables a validation process and an invalidation process of the USIM information is used, not a card in which the USIM information is written in a fixed manner. In other words, an item that enables the USIM information rewriting unit 360 to perform a validation process and an invalidation process for the USIM information is used. Furthermore, the validation process and the invalidation process for the USIM information can be performed by a validation process and an invalidation process stipulated in 3GPP (Third Generation Partnership Project). These processes are performed in, for example, a shop for mobile telephone devices.

The congestion degree information storage unit 380 is a storage unit storing congestion degree information acquired from the information processing device 200. For example, congestion degree information pertaining to a plurality of base station that can be received at the position where the wireless communication device 300 is present is received through the communication unit 310 and recorded.

The communication cost information storage unit 390 is a storage unit storing communication cost information acquired from the information processing device 200. For example, communication cost information pertaining to a plurality of base station that can be received at the position where the wireless communication device 300 is present is received through the communication unit 310 and recorded. Furthermore, the congestion degree information and the communication cost information are periodically or non-periodically received by the communication unit 310 in a sequential manner, and the content of the congestion degree information storage unit 380 and the communication cost information storage unit 390 is sequentially updated.

Herein, a congestion degree detection method of a base station by the wireless communication device 300 will be described. As a method that the wireless communication device 300 detects the congestion degree of a base station, it is possible to use a correlation detection value obtained by a process of cell search and peripheral cell search performed in a standby time, or cell re-selection in a case of W-CDMA type. In addition, in a case of the OFDMA, it is possible to detect the congestion degree of a base station by detection information on a ratio of the number of subcarriers that is actually assigned to the total number of subcarriers per frame.

Furthermore, based on an SIR (Signal to Interference Ratio) when the wireless communication device 300 receives a pilot signal or a synchronization signal that a base station transmits, it is possible to compute a predicted maximum communication rate when the base station is used. Moreover, it is possible to obtain a predicted communication rate in addition to the congestion degree.

In addition, in a system after HSDPA type used in the third generation mobile telephone, a technique called AMC (Adaptive Modulation and Coding) has been adopted. A base station transmits a signal with a higher-level modulation system and higher code rate to a wireless communication device in a good reception state.

A case is assumed, for example, in which a service with the same communication rate is provided for a wireless communication device present at a position relatively close to a base station and a wireless communication device present at a position relatively far from a base station. In this case, the number of resources assigned to the wireless communication device present at the position relatively close to the base station may be smaller than the resources assigned to the wireless communication device present at the position relatively far from the base station. Thus, it is desirable to perform the selection of a base station (communication carrier (wireless communication network)) based on a value obtained by correcting the above-described predicted communication rate or the congestion degree with information relating to the distance from the base station. Accordingly, it is possible to further reduce a burden loaded on the base station in comparison to a case where a base station (communication carrier (wireless communication network)) is selected based on the congestion degree. This example will be shown in a second embodiment of the present disclosure.

Furthermore, a method of computing the distance between a base station from path-loss, a reception level of a pilot signal, an SIR of a synchronization signal, acquired positional information, or the like, as information relating to the distance from a base station is considered. In other words, the control unit 330 computes the distance between the wireless communication device 300 and a base station based on path-loss, a reception level of a pilot signal, an SIR of a synchronization signal, or acquired positional information. In addition, the wireless communication device 300 can predict communication cost expected based on the congestion degree of a base station.

[Configuration Example of Information Processing Device]

Figure 3:
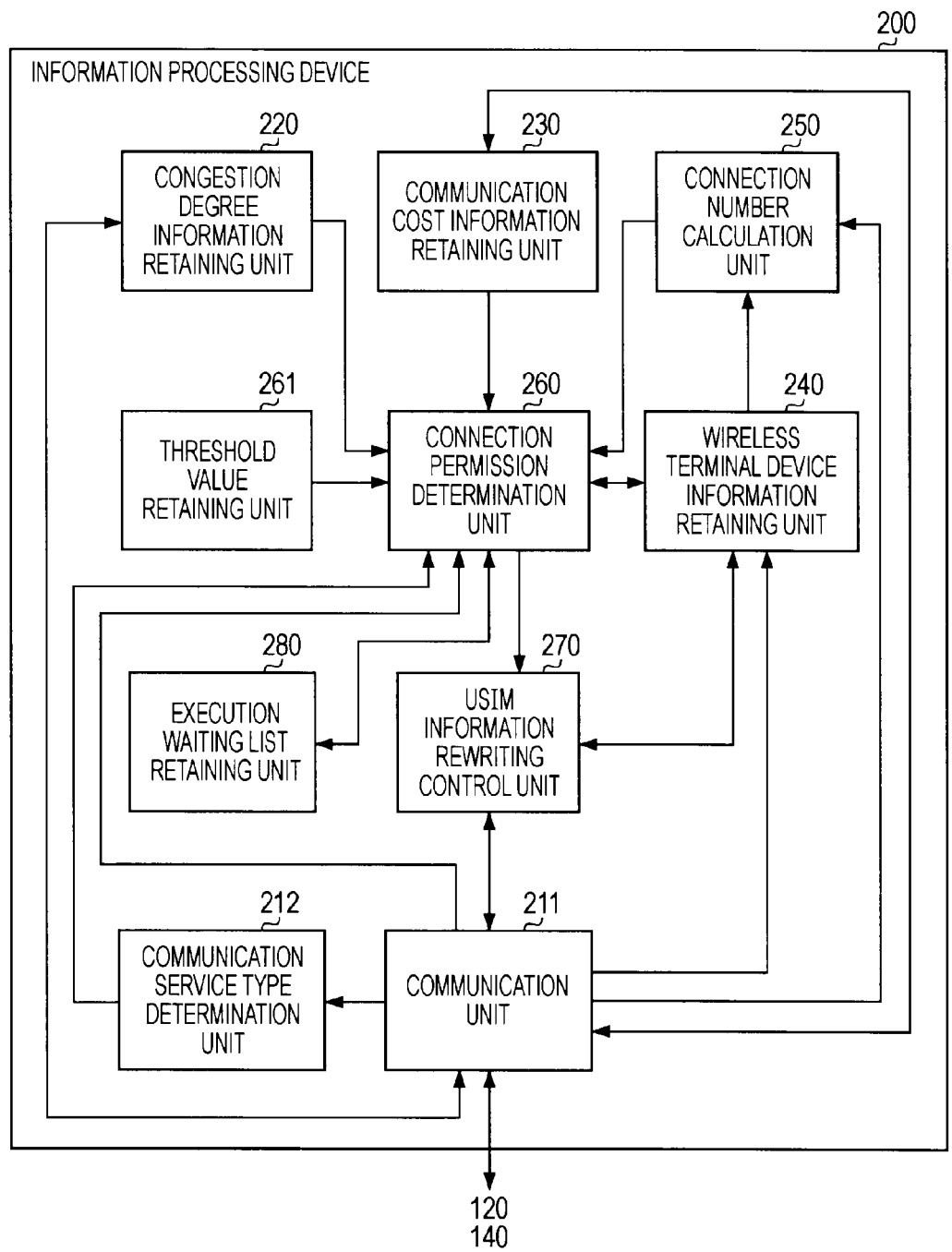
FIG. 3 is a block diagram showing a functional configuration example of an information processing device according to the first embodiment of the present disclosure.

FIG. 3 is a block diagram showing a functional configuration example of the information processing device 200 according to the first embodiment of the present disclosure.

The information processing device 200 includes a communication unit 211, a communication service type determination unit 212, a congestion degree information retaining unit 220, a communication cost information retaining unit 230, and a wireless communication device information retaining unit 240. In addition, the information processing device 200 includes a connection number calculation unit 250, a connection permission determination unit 260, a threshold value retaining unit 261, a USIM information rewriting control unit 270, and an execution waiting list retaining unit 280.

The communication unit 211 receives information transmitted from each wireless communication device (for example, a connection permission request, or the congestion degree) through the first and the second network control devices 120 and 140. Then, the communication unit 211 outputs the information to each unit. In addition, the communication unit 211 transmits information output from each unit of the information processing device 200 to each wireless communication device through the first and the second network control devices 120 and 140.

The communication service type determination unit 212 determines the type of a communication service in relation to a connection permission request using control information included in the connection permission request transmitted from each wireless communication device and outputs the determination result to the connection permission determination unit 260. A method of determining the type of a communication service will be described in detail with reference to FIGS. 7A and 7B.

The congestion degree information retaining unit 220 is a retaining unit that retains information on the congestion degree (congestion degree information). In addition, the congestion degree information retaining unit 220 supplies the retained information (congestion degree information) to each wireless communication device through each unit and the communication unit 211 of the information processing device 200. In addition, the congestion degree information retaining unit 220 may retain a predicted communication rate in addition to the congestion degree information. Herein, the information on the congestion degree may take a form of collecting information detected by each wireless communication device, or a form of acquiring information on the congestion degree of each base station from the first and the second network control devices 120 and 140. Furthermore, the retained content of the congestion degree information retaining unit 220 will be described in detail with reference to FIG. 4.

The communication cost information retaining unit 230 is a retaining unit that retains information on communication cost. In addition, the communication cost information retaining unit 230 supplies the retained information (information on communication cost) to each wireless communication device through each unit and the communication unit 211 of the information processing device 200. The retained content of the communication cost information retaining unit 230 will be described in detail with reference to FIG. 5.

Herein, the communication unit 211 acquires the congestion degree information from each wireless communication device through the first and the second network control devices 120 and 140, and causes the congestion degree information retaining unit 220 to retain the acquired information. In addition, the communication unit 211 acquires the information on communication cost from the first and the second network control devices 120 and 140, and causes the communication cost information retaining unit 230 to retain the acquired information. In addition, the communication unit 211 periodically or non-periodically acquires information on communication cost from the first and the second network control devices 120 and 140, and sequentially updates the information retained in the congestion degree information retaining unit 220 and the communication cost information retaining unit 230. As a method of dynamically retaining the congestion degree or the predicted communication rate, for example, the information processing device 200 can be configured to receive information from each base station. In addition, it may be configured that information of the congestion degree or the predicted communication rate that a plurality of wireless communication devices in a standby time detects is appropriately collected in relation to positional information or information on a base station (for example, a cell ID).

Herein, as the information of the congestion degree or the predicted communication rate, information acquired from the plurality of wireless communication devices and averaged can be used. In such a case, the frequency of transmitting the information of the congestion degree or the predicted communication rate from a wireless communication device can be changed according to the distance between the base station and the wireless communication device. For example, according to the shortening distance between each wireless communication device and each base station, it is possible to increase the frequency of transmitting the congestion degree detected by each of the plurality of wireless communication devices to the information processing device 200. On the other hand, according to the lengthening distance between each wireless communication device and each base station, it is possible to reduce the frequency of transmitting the congestion degree detected by each of the plurality of wireless communication devices to the information processing device 200.

For example, when the congestion degree is detected at a cell edge, or the like that is relatively far from a base station, a reception signal intensity from the base station is low, and therefore, the influence of an NF (Noise Figure) of a reception circuit is great, and accordingly, a greater value than the actual congestion degree (a value of relative congestion) is detected. For this reason, when the information on the congestion degree received from the plurality of wireless communication devices is averaged in the information processing device 200, the reliability of information on the congestion degree collected from a wireless communication device present at a position relatively close to a base station is determined to be high. On the other hand, the reliability of information on the congestion degree collected from a wireless communication device present at a position relatively far from a base station is determined to be low. In addition, when the averaged information is used as the information on the congestion degree or the predicted communication rate, a weighted coefficient according to the distance from a base station (weighting according to the determination result) is used. In addition, the weighting according to the determination result can be realized by changing the frequency of transmitting the information on the congestion degree from a wireless communication device.

In addition, it is possible to cut reception power by controlling the transmission frequency as above. For example, a wireless communication device at a position relatively far from a base station has to perform transmission with increased transmission power. For this reason, by lowering such transmission frequency from the wireless communication device, it is possible to cut power consumption of the wireless communication device.

In addition, the transmission frequency may be set to be controlled according to remaining charge amounts of a battery (a battery (not shown in the drawing) that is built or loaded in the wireless communication device 300) for driving the wireless communication device 300. For example, the control unit 330 of the wireless communication device 300 can control the transmission frequency according to the above-described distance between the wireless communication device and the base station and control the transmission frequency according to a remaining battery amount. When the battery has a large amount of remaining charged power, for example, the control unit 330 increases the transmission frequency, and when the battery has a little amount of remaining charged power, the control unit controls to lower the transmission frequency. Accordingly, it is possible to realize tradeoff by improving information collection efficiency of the information processing device 200 and using the battery of the wireless communication device 300 for a long period of time. As such, since the portable wireless communication device 300 performs operations mostly using the battery, it is important to reduce power consumption by efficiently using the battery.

The wireless communication device information retaining unit 240 is a retaining unit that retains information on each wireless communication device (wireless communication device information). In addition, the wireless communication device information retaining unit 240 supplies the retained information (wireless communication device information) to each unit of the information processing device 200. The retained content of the wireless communication device information retaining unit 240 will be described in detailed with reference to FIG. 6A.

The connection number calculation unit 250 calculates the number of wireless communication devices that are connected to a base station relating to a connection permission request transmitted from each wireless communication device based on the retained content of the wireless communication device information retaining unit 240. Then the connection number calculation unit 250 outputs the calculated number of wireless communication devices to the connection permission determination unit 260.

The connection permission determination unit 260 determines whether or not to permit the connection permission request when the connection permission request is transmitted from each wireless communication device, and outputs the determination result to the USIM information rewriting control unit 270. For example, the connection permission determination unit 260 determines whether or not to permit the connection permission request based on the number of wireless communication devices calculated by the connection number calculation unit 250 (connection information). Specifically, the connection permission determination unit 260 determines whether or not to permit the connection permission request based on a comparison result between the number of wireless communication devices calculated by the connection number calculation unit 250 and a threshold value retained in the threshold value retaining unit 261. For example, when the number of wireless communication devices is lower than the threshold value, it is determined to permit the connection permission request, and when the number of wireless communication devices is higher than the threshold value, it is determined not to permit the connection permission request. In addition, when it is determined not to permit the connection permission request, the connection permission determination unit 260 outputs the intent to the communication unit 211 so as to cause the wireless communication device to display the intent. Furthermore, the connection permission determination unit 260 is an example of the determination unit described in the claims.

The threshold value retaining unit 261 is a unit retaining a threshold value used in the determining process by the connection permission determination unit 260, and supplies the retained threshold value to the connection permission determination unit 260.

The USIM information rewriting control unit 270 controls to set a connection right (connection right based on USIM information) to be connected to the base station relating to the connection permission request in the wireless communication device that transmits the connection permission request when the connection permission determination unit 260 determines to permit the request. In addition, when a communication service through the base station relating to the connection permission request ends after setting the connection right, the USIM information rewriting control unit 270 controls to set the first connection right to the wireless communication device (restoration process). In other words, the USIM information rewriting control unit 270 performs a rewriting process and a restoration process of USIM information for the target wireless communication device. In addition, the USIM information rewriting control unit 270 causes the wireless communication device information retaining unit 240 to retain information on the wireless communication device that has undergone the rewriting process of the USIM information. In addition, after performing the restoration process, the USIM information rewriting control unit 270 deletes the information on the wireless communication device from the wireless communication device information retaining unit 240. Furthermore, the USIM information rewriting control unit 270 is an example of a control unit described in the claims.

The execution waiting list retaining unit 280 is a unit retaining the information on the wireless communication device that has transmitted the connection permission request when the determination process is performed by the connection permission determination unit 260 after a fixed period of time passes.

[Content Example of Congestion Degree Information Storage Unit]

FIG. 4 is a diagram schematically showing an example of stored content of the congestion degree information retaining unit 220 according to the first embodiment of the present disclosure.

The congestion degree information retaining unit 220 is a retaining unit that retains information on the congestion degree of each base station (congestion degree information). Specifically, a cell ID 221, positional information 222, and congestion degree information 223 are retained in the congestion degree information retaining unit 220 in relation to each communication carrier.

The cell ID 221 is identification information for identifying a base station (cell) that a communication carrier operates.

The positional information 222 is information on a position where a base station operated by a communication carrier is present. As the positional information 222, for example, the latitude and the longitude corresponding to the position where each base station is present are stored.

The congestion degree information 223 is information on the congestion degree of a base station operated by a communication carrier. As the congestion degree information 223, for example, a value of 0 to 1 is stored. In FIG. 4, the congestion degree of the value "1" is the highest (in other words, congested) and the congestion degree of the value "0" is the lowest (in other words, not congested) in the congestion degree information 223.

In addition, for the sake of simple description in FIG. 4, each piece of information on each base station of which the range of the cell overlaps among cells of base stations operated by each communication carrier is arranged and shown in the same row.

[Content Example of Communication Cost Information Retaining Unit]

FIG. 5 is a diagram schematically showing an example of the retained content of the communication cost information retaining unit 230 according to the first embodiment of the present disclosure.

A cell ID 231, time information 232, congestion degree information 233, and communication cost per packet 234 are retained in the communication cost information retaining unit 230 correspondingly.

The cell ID 231 is identification information for identifying a base station (cell) operated by a communication carrier. With the cell ID 231, a position where a base station operated by a communication carrier is present is specified.

The time information 232 is information indicating time zones with a predetermined interval.

The congestion degree information 233 is information on the congestion degree of a base station operated by a communication carrier. As the congestion degree information 233, for example, values of 0 to 1 are stored. In FIG. 5, the congestion degree of the value "1" is the highest (in other words, congested) and the congestion degree of the value "0" is the lowest (in other words, not congested) in the congestion degree information 233.

The communication cost per packet 234 is information on communication cost charged when a wireless communication device uses a wireless connection service through a communication carrier (communication cost information). In other words, communication cost information of a communication carrier relating to the USIM information (USIM information after rewriting) retained in a wireless communication device is stored. Furthermore, in regard to the communication cost information, it is possible to dynamically change a stage of the congestion degree at which the communication cost changes.

For example, it is assumed that, at the time of 11 o'clock, the congestion degree information 233 corresponding to the cell ID 231 "0001" is "0.30" and the congestion degree information corresponding to the cell ID 231 "0077" is "0.10". In this case, when the communication cost is to be acquired at each area at the time of 11 o'clock, the communication cost "0.18 Yen" is acquired in the cell ID 231 "0001" and the communication cost "0.15 Yen" is acquired in the cell ID 231 "0077".

In addition, such a charging process is performed based on the retained content of the communication cost information retaining unit 230 for a wireless communication device that has received the permission for the connection permission request through the determination by the connection permission determination unit 260 and has been set with the connection right by the USIM information rewriting control unit 270. In this case, the communication cost when the base station is used is sequentially updated according to the congestion degree and the predicted communication rate of the base station. Accordingly, it is possible to realize a charging method that changes the communication costs in accordance with the demand and the supply of communication resources.

[Content Example of Wireless Communication Device Information Retaining Unit]

Figure 6A:
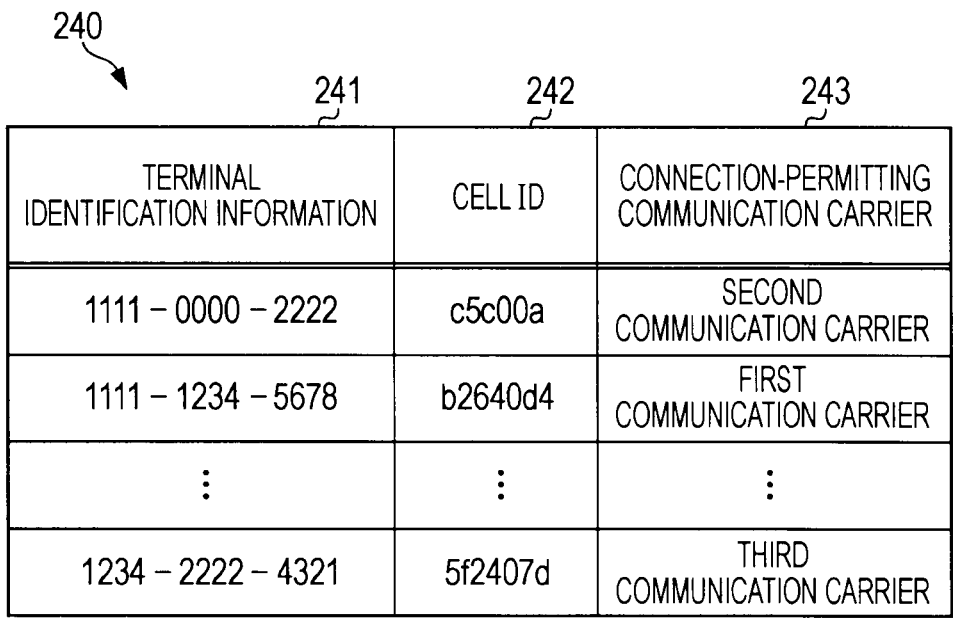
FIGS. 6A and 6B are diagrams schematically showing an example of retained content of wireless communication device information retaining units according to the first embodiment of the present disclosure.

FIG. 6A is a diagram schematically showing an example of the retained content of the wireless communication device information retaining unit 240 according to the first embodiment of the present disclosure.

The wireless communication device information retaining unit 240 is a retaining unit that retains information on each wireless communication device (wireless communication device information). Specifically, the wireless communication device information retaining unit 240 retains terminal identification information 241, a cell ID 242, and a connection-permitting communication carrier 243 in relation to each wireless communication device.

The terminal identification information 241 is identification information for identifying each wireless communication device.

The cell ID 242 is identification information for identifying a base station (cell) operated by a communication carrier.

The connection-permitting communication carrier 243 is information of a connection-permitting communication carrier for the wireless communication device that transmitted the connection permission request. For example identification information for identifying the communication carrier is stored therein. Furthermore, for the sake of simple description in FIG. 6A, only the names of the communication carriers are shown as the identification information for identifying the communication carriers.

Furthermore, in FIG. 6A, the wireless communication device information retaining unit 240 may retain information other than the information shown in FIG. 6A even though description and graphic display thereof are omitted. For example, the wireless communication device information retaining unit can retain information on the position in the zone where the wireless communication device is present, time-series information on the position in the zone where the wireless communication device is present (for example, movement history information), and information on the area code of the zone where the wireless communication device is present. In addition, the wireless communication device information retaining unit can retain information on the base station in the zone where the wireless communication device is present, and identification information assigned to individual access points in the zone where the wireless communication device is present. In addition, the wireless communication device information retaining unit can retain time-series information on the reception signal intensity and the pilot signal (or the reference signal) reception intensity (in other words, history information of each intensity) at the position in the zone where the wireless communication device is present. In addition, the wireless communication device information retaining unit can retain information on peripheral base stations detected by the wireless communication device, information on the congestion degree of the base station detected by the wireless communication device, and information on the battery of the wireless communication device. In addition, the wireless communication device information retaining unit can retain character information input by a user through an input device (for example, the operation reception unit 340) of the wireless communication device (for example, including log information relating to life-log). In addition, the wireless communication device information retaining unit can retain information including at least one out of the above. In addition, information to be retained (predetermined information) as above is sequentially transmitted from each wireless communication device, as described above.

Herein, the content of information (predetermined information) transmitted from the wireless communication device 300 to the information processing information 200 to make the wireless communication device information retaining unit 240 retain can be dynamically changed. In other words, the control unit 330 of the wireless communication device 300 can change the content included in the predetermined information. For example, in a period where the wireless communication device 300 uses the communication service based on the code division multiplexing access scheme, only the time-series information on the position in the zone where the wireless communication device is present can be transmitted among the above-described information. In addition, in a period where the wireless communication device 300 uses the communication service based on the orthogonal frequency division multiple access scheme, the information on the peripheral base stations of the wireless communication device 300 can be transmitted in addition to the time-series information on the position in the zone where the wireless communication device is present. Furthermore, such transmission control as above is an example, and information to be transmitted can be appropriately changed. As such, the control unit 330 can change the content included in the predetermined information based on the type of the communication system that the wireless communication device 300 uses. Herein, the type of the communication system includes, for example, the code division multiplexing access scheme or the orthogonal frequency division multiple access scheme.

In addition, the content of information (predetermined information) transmitted from the wireless communication device 300 to the information processing information 200 to make the wireless communication device information retaining unit 240 retain can be dynamically changed according to the remaining amount of battery power that drives the wireless communication device 300. In other words, the control unit 330 can change the content included in the predetermined information. In a state where the remaining amount of battery power is small, for example, it is possible to selectively transmit the content of the predetermined information as a transmission target so that the volume of the predetermined information as the transmission target is small. As such, the control unit 330 can change the content included in the predetermined information based on the remaining amount of battery power that drives the wireless communication device 300.

In addition, the information processing device 200 may periodically or non-periodically process information retained in the wireless communication device information retaining unit 240. For example, an index on interference computed based on the reception signal intensity, the pilot signal reception intensity or the reference signal reception intensity, and the information on the peripheral base stations may be saved in relation to a position corresponding to a grid obtained by dividing geographical features in lattice shapes. In this case, a wireless communication device information retaining unit 245 retains each piece of the information in relation to a position specified based on the predetermined information (positional information) including the above pieces of information. The retention example is shown in FIG. 6B.

Figure 6B:
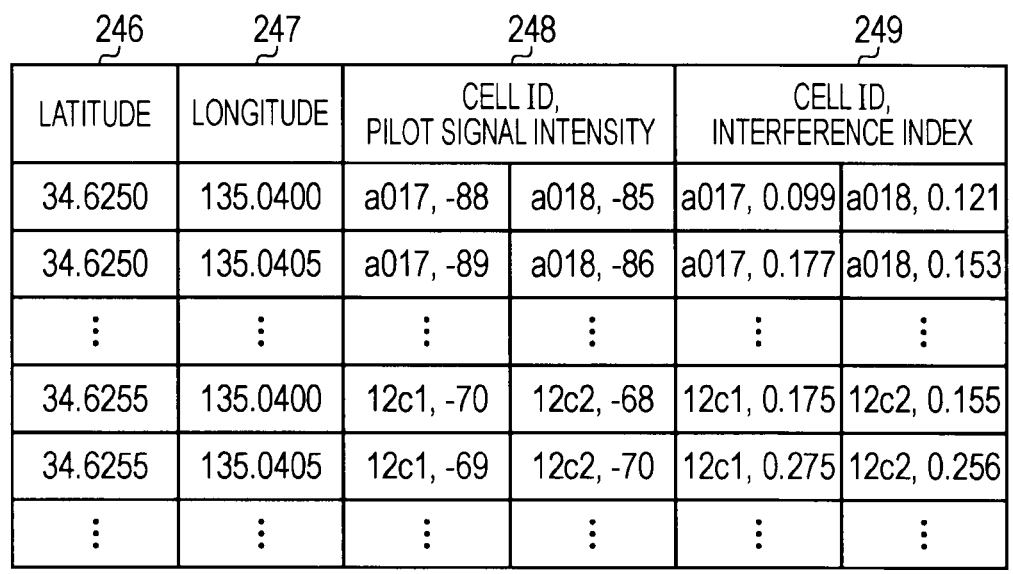

FIG. 6B is a diagram schematically showing an example of the retained content of the wireless communication device information retaining unit 245 according to the first embodiment of the present disclosure. Furthermore, the wireless communication device information retaining unit 245 is a modified example of the wireless communication device information retaining unit 240, and FIG. 6B shows content other than the retained content of the wireless communication device information retaining unit 240.

The wireless communication device information retaining unit 245 retains each piece of information in relation to positional information (latitude 246 and longitude 247). For example, time-series information 248 on the reception signal intensity at the position in the zone where each wireless communication device is present and the reception intensity of the pilot signal or the reference signal, and an index 249 relating to the interference computed based on the peripheral base stations detected by each wireless communication device are retained.

The positional information (latitude 246 and longitude 247) is information on a position corresponding to a grid obtained by dividing geographical features in lattice shapes.

In this way, the information processing device 200 can configure the wireless communication device information retaining unit 245 as a database serving as a type of reception quality map. Further, the information processing device 200 can provide the reception quality to each of the wireless communication device using the wireless communication device information retaining unit 245.

The wireless communication device 300 transmits, for example, an acquisition request on information regarding the reception quality (including information regarding the position in the zone where the wireless communication device 300 is present) to the information processing device 200. When the acquisition request is received, the communication unit 211 of the information processing device 200 transmits to the wireless communication device 300 each piece of the information of the wireless communication device information retaining unit 245 relating to the position in the zone where the wireless communication device 300 is present. In other words, the reception signal intensity of the position in the zone where the wireless communication device 300 is present, the reception intensity of the pilot signal or the reference signal, and the index relating to interference can be transmitted to the wireless communication device 300. Furthermore, the inquiry (acquisition request) can be made by the wireless communication device 300 using wireless communication via a base station. In addition, the inquiry (acquisition request) can be made by the wireless communication device 300 using wired communication. In addition, as a method of periodically processing the information on the reception quality (the reception signal intensity and the like) retained in the wireless communication device information retaining unit 245, it is possible to use a method of averaging the information, for example, on hourly, daily, weekly, or monthly basis, or the like. In addition, a method of averaging the information by increasing the weight of the latest information, or the like may be used.

[Determination Example of Communication Service Type]

Figure 7A:
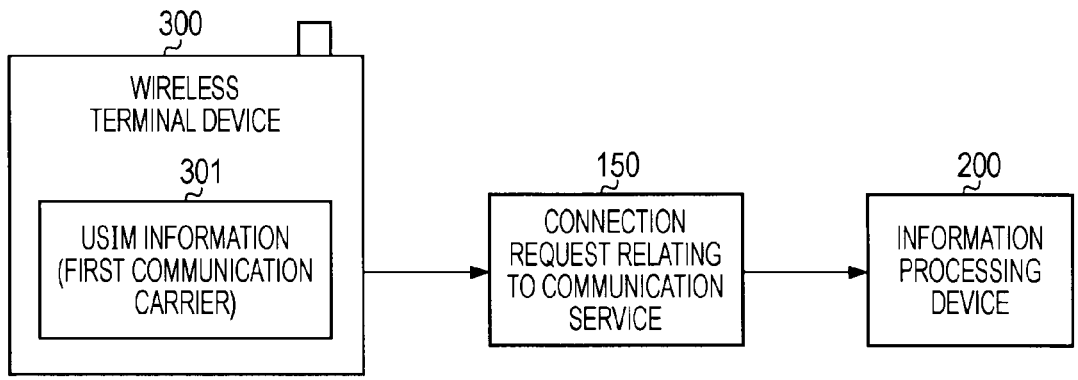
FIGS. 7A and 7B are diagrams schematically showing a determination example when a communication service type determination unit determines the type of a communication service according to the first embodiment of the present disclosure.
Figure 7B:
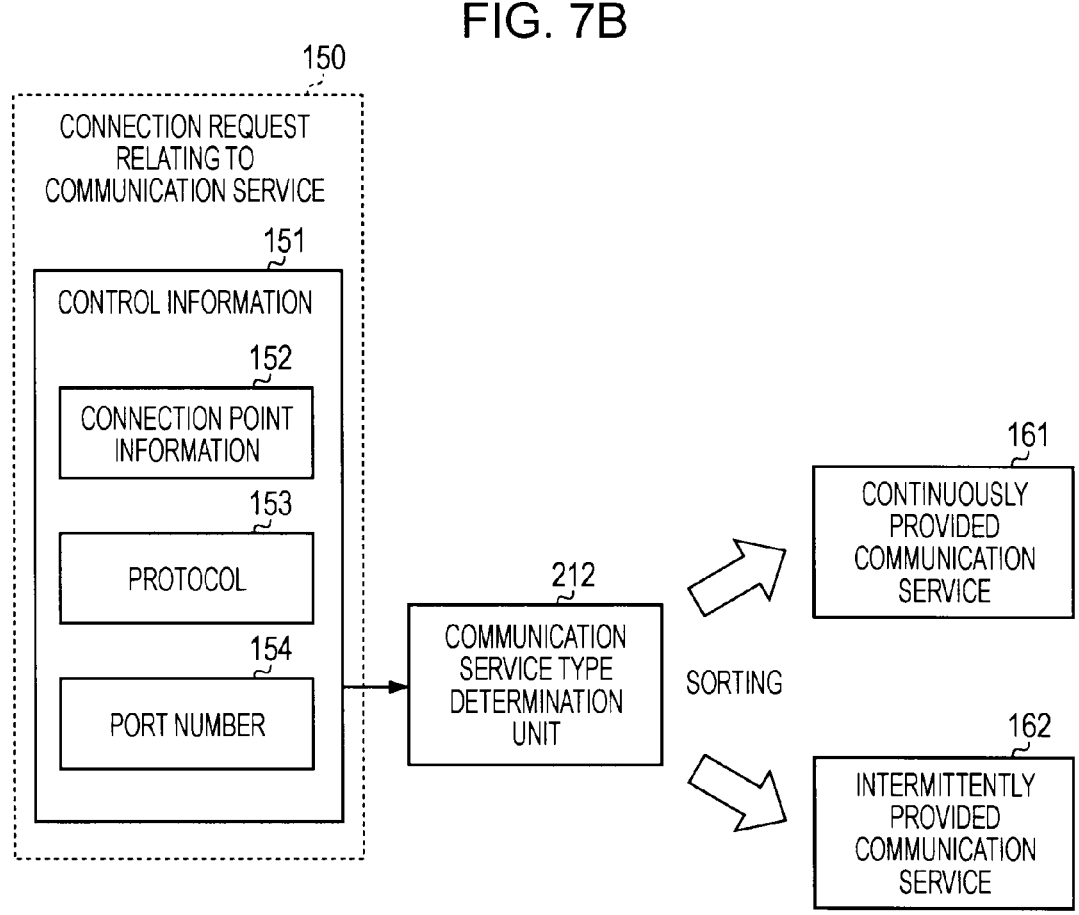

FIGS. 7A and 7B are diagrams schematically showing a determination example when the communication service type determination unit 212 determines the type of a communication service according to the first embodiment of the present disclosure.

FIG. 7A schematically shows the flow of a connection request 150 when the user of the wireless communication device 300 requests the desired communication service.

FIG. 7B schematically shows a case where the communication service type determination unit 212 determines the type of a communication service relating to the connection request 150, using control information 151 included in the connection request 150 shown in FIG. 7A.

The control information 151 includes, for example, connection point information 152, a protocol 153, and a port number 154. In addition, the communication service type determination unit 212 acquires the control information 151 included in the connection request 150 and sorts the type of a communication service relating to the connection request 150 based on at least one piece of the control information 151.

FIG. 7B shows an example in which determination is made by sorting the type of the communication service relating to the connection request 150 into two, which are a continuously provided communication service 161 and an intermittently provided communication service 162.

Herein, the continuously provided communication service 161 includes, for example, a streaming service, an Internet browsing service including moving images, and a downloading service of moving image files. In addition, the intermittently provided communication service 162 includes, for example, web browsing, e-mail transmission and reception, and a search service.

Furthermore, FIG. 7B shows the example in which the type of the communication service relating to the connection request 150 is sorted into two, but the continuously provided communication service 161 and the intermittently provided communication service 162 may be more finely sorted. For example, the continuously provided communication service 161 can be sorted into plural sub-types such as a further continuously provided service and a service close to the intermittently provided communication service 162. In addition, the intermittently provided communication service 162 can be sorted into plural sub-types such as a further intermittently provided communication service and a service close to the continuously provided communication service 161.

In addition, it may be possible to perform sorting into types other than the continuously provided communication service 161 and the intermittently provided communication service 162. For example, the sorting can be performed in plural types such as a communication service for immediate use and a communication service that is not necessary to be immediately used. In addition, it is possible to sort into plural types such as a communication service with high urgency and a communication service with low urgency.

Furthermore, as a determination method of determining the type of a communication service, other determination methods may be used. For example, a signal configuration is retained in advance between the wireless communication device 300 and the information processing device 200 so as to sort the type of a communication service. Then, when a connection permission request is transmitted from the wireless communication device 300, the connection permission request may be transmitted including a signal for sorting the type of the communication service, and then the type of the communication service may be informed to the information processing device 200 from the wireless communication device 300. Accordingly, the information processing device 200 can determine the type of the communication service.

[Example on Communication Between Each Device]

Figure 9:
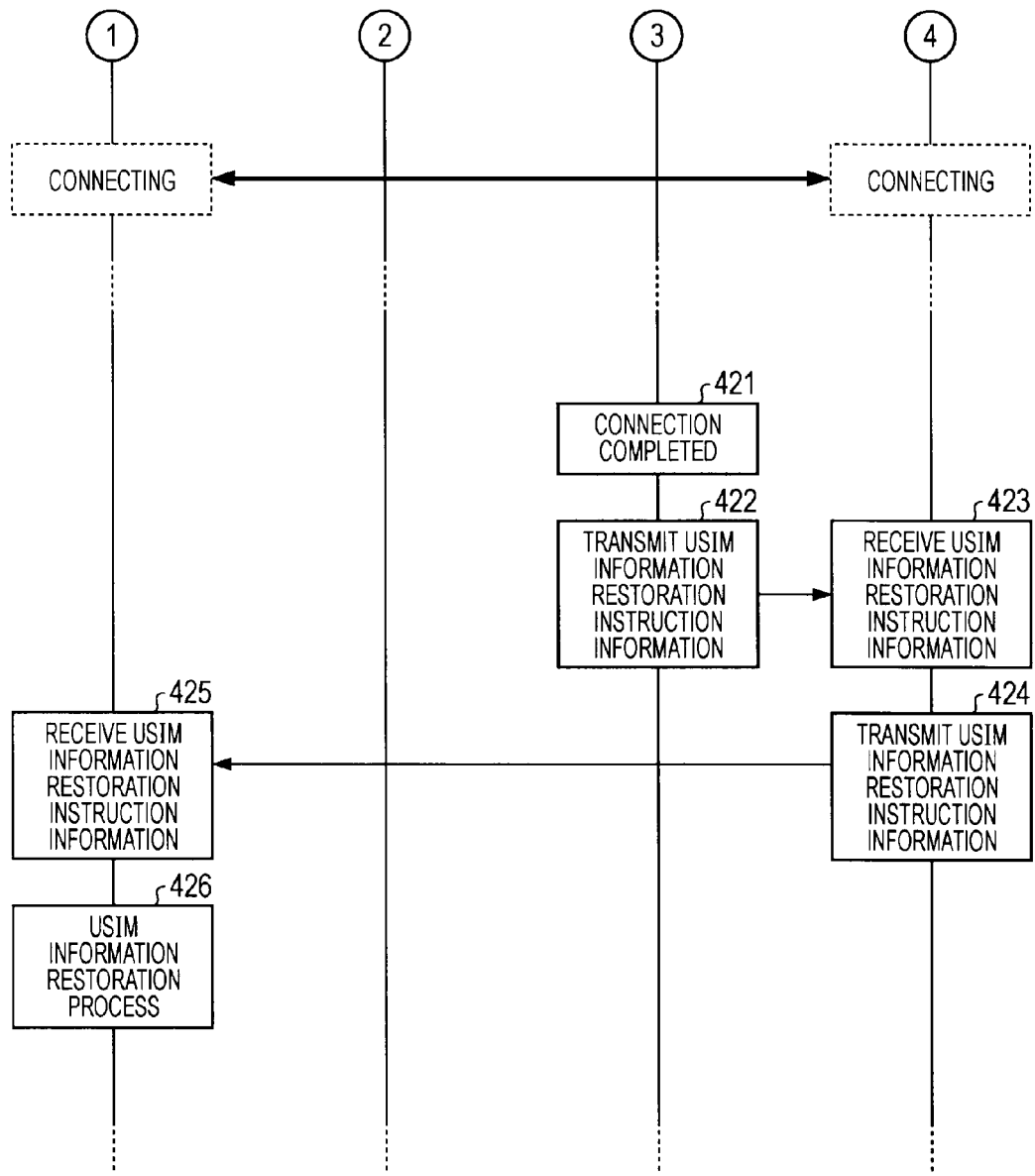
FIG. 9 is the sequence chart showing the communication processing example between each device constituting the communication system according to the first embodiment of the present disclosure.

FIGS. 8 and 9 are sequence charts showing a communication processing example between each device constituting the communication system 100 according to the first embodiment of the present disclosure. FIGS. 8 and 9 only show a communication processing example between the wireless communication device 300 and the information processing device 200, but the sequence can be applied in the same manner to a communication process between other wireless communication devices and the information processing device 200.

In addition, FIGS. 8 and 9 show an example of a rewriting process and a restoration process for USIM information when the wireless communication device 300 retains the USIM information pertaining to the first communication carrier. In addition, FIGS. 8 and 9 describe an example case where the user of the wireless communication device 300 wants to use a communication service with a high communication rate.

First, a communication service start operation for getting the communication service that the user wants is performed using the wireless communication device 300 (401). The communication service start operation is performed by a selection operation for selecting the communication service that the user wants when, for example, a communication service operation screen is displayed on the display unit 350.

When a communication service start process is performed, the control unit 330 acquires from the congestion degree information storage unit 380 the congestion degree information relating to a plurality of base stations connectable at the position where the wireless communication device 300 is present (402). Then, the control unit 330 selects a base station (communication carrier (wireless communication network)) with the lowest congestion degree from the plurality of base stations relating to the acquired congestion degree information (403). For example, the cell ID of the base station with the lowest congestion degree (for example, the ID corresponding to the cell ID 221 shown in FIG. 4) is selected. In this example, description will be provided assuming that the selected base station is a base station operated by the second communication carrier. Furthermore, when the selected base station is a base station operated by a communication carrier having a contract with the user of the wireless communication device 300, a connection process based on the USIM information retained in the wireless communication device 300 is performed without performing processes thereafter. Furthermore, instead of the congestion degree, a communication carrier may be selected based on the predicted communication rate.

Subsequently, the connection permission request for using the selected base station (communication carrier) is transmitted to the information processing device 200 from the wireless communication device 300 through the first network control device 120 (404 to 407). The connection permission request is a connection request for receiving the communication service that the user wants. In addition, the connection permission request includes information on the wireless communication device 300 (for example, retained USIM information and terminal identification information), information on the selected base station (communication carrier), and information on the selection reference (selection reference information (such as the congestion degree, communication cost, and the like)). As such, the connection permission request is transmitted through the communication carrier with which the user of the wireless communication device 300 has the contract in advance.

If the connection permission request is received from the wireless communication device 300 (407), the information processing device 200 performs a connection permission determination process (408). In other words, the connection number calculation unit 250 calculates the number of wireless communication devices (the number of connections) that are connected to the base station relating to the connection permission request based on the content of the wireless communication device information retaining unit 240. Subsequently, the connection permission determination unit 260 compares the calculated number of connections and the threshold value retained in the threshold value retaining unit 261 and determines whether or not to permit the connection of the wireless communication device 300 that has transmitted the connection permission request based on the comparison result. For example, when the calculated number of connections is less than the threshold value, it is determined to permit the connection of the wireless communication device 300 that has transmitted the connection permission request to the base station relating to the connection permission request. On the other hand, when the acquired number of connections is equal to or higher than the threshold value, it is determined not to permit the connection of the wireless communication device 300 that has transmitted the connection permission request to the base station relating to the connection permission request.

Figure 10A:
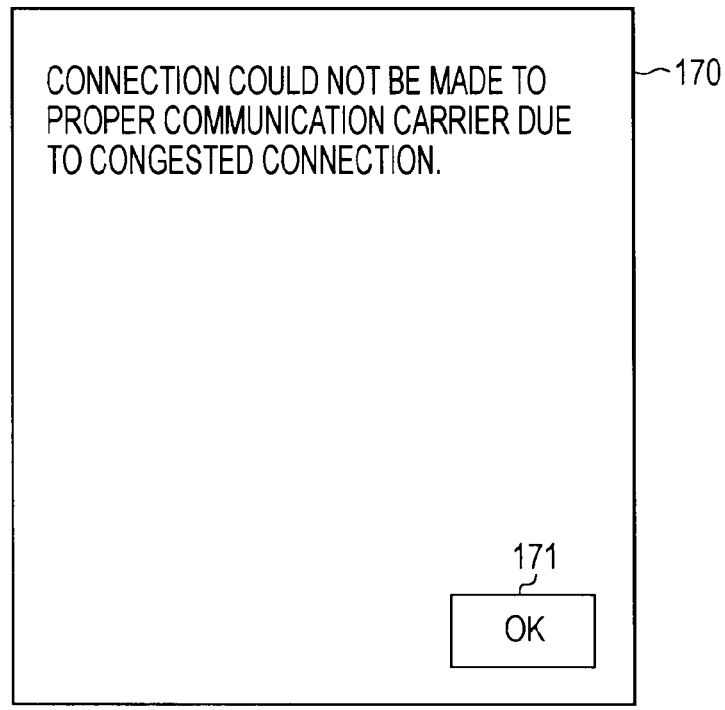
FIGS. 10A and 10B are diagrams showing a display screen example displayed in the wireless communication device according to the first embodiment of the present disclosure.
Figure 10B:
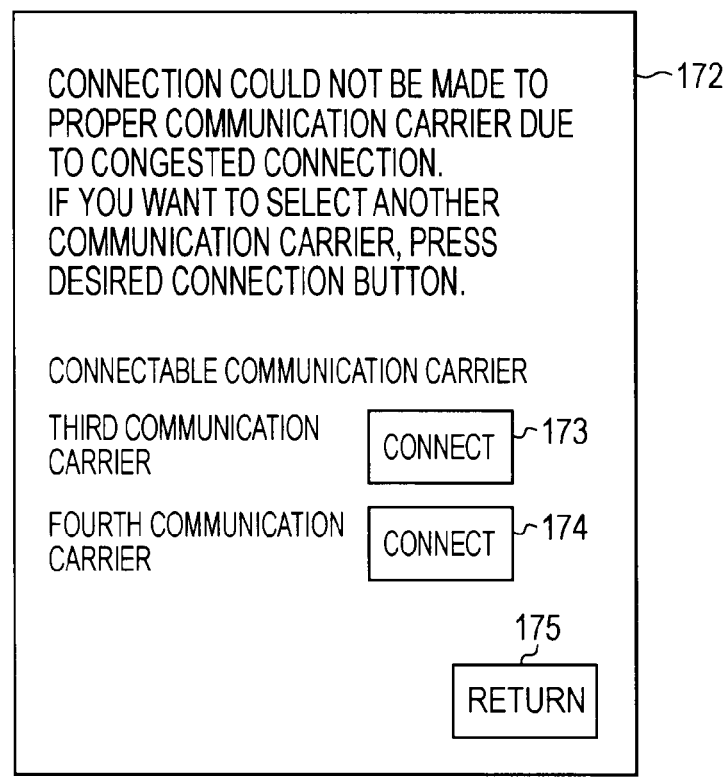

Furthermore, when it is determined not to permit the connection to the base station relating to the connection permission request, for example, the intent is transmitted to the wireless communication device 300 that has transmitted the connection permission request, and the intent is displayed on the display unit 350. The display example is shown in FIG. 10A. In addition, when it is determined not to permit the connection to the base station relating to the connection permission request, for example, the intent of promoting the selection of other communication carrier is transmitted to the wireless communication device 300 that has transmitted the connection permission request, and the intent is displayed on the display unit 350. The display example is shown in FIG. 10B. In this case, a new base station (communication carrier) is selected by a user operation.

Furthermore, as the threshold value used in the determination process by the connection permission determination unit 260 (threshold value retained in the threshold value retaining unit 261), a fixed value may be used, or a value changed based on the predicted communication rate or the congestion degree that is periodically or non-periodically updated may be used.

Subsequently, if the connection of the wireless communication device 300 is permitted by the connection permission determination process (408), connection permission indicating the intent of permitting the connection is transmitted from the information processing device 200 to the wireless communication device 300 through the first network control device 120 (409 to 412). The connection permission includes information for rewriting the USIM information stored in the USIM information storage unit 370 of the wireless communication device 300 (for the first communication carrier) to USIM information for being connected to the second network control device 140 (for the second communication carrier). In addition, the USIM information rewriting control unit 270 records terminal identification information on the wireless communication device 300 that has transmitted the connection permission and information on the base station that the device connects (including the cell ID, the communication carrier, or the like) to the wireless communication device information retaining unit 240.

As such, when the connection permission is transmitted from the information processing device 200 to the wireless communication device 300, information on the wireless communication device 300 to which the connection permission is transmitted is recorded in the wireless communication device information retaining unit 240. As the wireless communication device is close to the base station, a burden on resources of the base station is low even if the service is provided at the same communication rate. Thus, when the retained content of the wireless communication device information retaining unit 240 is updated, weighting is performed according to a predicted communication rate of the wireless communication device 300 that has given the connection permission, and the weight may be recorded. An example of recording the weight will be described in a second embodiment of the present disclosure.

In addition, if the wireless communication device 300 receives the connection permission (412), the USIM information rewriting unit 360 of the wireless communication device 300 rewrites the USIM information stored in the USIM information storage unit 370 based on the connection permission (413). In other words, the USIM information relating to the first communication carrier is rewritten to the USIM information relating to the second communication carrier. With the rewriting process, the wireless communication device 300 can be connected to the second communication carrier (the second network control device 140).

As such, when the rewriting process of the USIM information has been performed, the fact that the rewriting process of the USIM information has been performed may be displayed on the display unit 350. For example, the display can be realized by causing the display unit 350 to display the name of the communication carrier in connecting in an area. Accordingly, the user who owns the wireless communication device 300 can easily grasp that the rewriting process of the USIM information has been performed.

Subsequently, when the rewriting process of the USIM information is completed (413), the control unit 330 of the wireless communication device 300 transmits the connection request to the second network control device 140 (414 and 415). In other words, the connection request is transmitted to the second communication relating to the base station through the base station selected based on the congestion degree information (base station with the lowest congestion degree).

When the connection request is received (415), the second network control device 140 performs a connection process between the wireless communication device 300 (416 and 417). With the connection process, the wireless communication device 300 can communicate with the second network control device 140. For this reason, the wireless communication device 300 can receive the communication service that the user wants through the second network control device 140. In other words, the communication service that the user wants can be provided to the wireless communication device 300 using the wireless connection network of the second communication carrier.

In addition, when the process of providing the communication service from the information processing device 200 to the wireless communication device 300 is completed (421), USIM information restoration instruction information is transmitted (422 to 425). In other words, when the provision of the communication service that the user wants is completed (421), the USIM information restoration instruction information is transmitted from the information processing device 200 to the wireless communication device 300 through the second network control device 140 (422 to 425). The USIM information restoration instruction information includes information for rewriting USIM information stored in the USIM information storage unit 370 of the wireless communication device 300 (for the second communication carrier) to the USIM information relating to the first communication carrier (restoration information).

In addition, if the wireless communication device 300 receives the USIM information restoration instruction information (425), the USIM information rewriting unit 360 of the wireless communication device 300 rewrites the USIM information stored in the USIM information storage unit 370 based on the USIM information restoration instruction information (426). In other words, the USIM information relating to the second communication carrier is rewritten to the USIM information relating to the first communication carrier. With the restoration process, the wireless communication device 300 can be connected to the first communication carrier (the first network control device 120).

[Display Example of Connection Non-Permission]

FIGS. 10A and 10B are diagrams showing a display screen example displayed in the wireless communication device 300 according to the first embodiment of the present disclosure.

FIG. 10A shows a display example (display screen 170) displayed on the display unit 350 when it is determined not to permit the connection to the base station relating to the connection permission request, as a result of the connection permission determination process by the connection permission determination unit 260. For example, when the display screen 170 is displayed on the display unit 350, the user presses down an OK button 171 and then can perform the communication service start operation for receiving the communication service using the current USIM information.

FIG. 10B shows a display example (display screen 172) displayed on the display unit 350 when it is determined not to permit the connection to the base station relating to the connection permission request, as a result of the connection permission determination process by the connection permission determination unit 260.

The display screen 172 displays connection buttons 173 and 174, and a return button 175 for selecting other communication carriers. The connection buttons 173 and 174 are displayed, for example, in order of the base stations with low congestion degrees.

For example, when the connection button 173 or 174 of a communication carrier that the user wants is pressed down, a connection permission request for using the communication carrier of which the button is pressed down is transmitted from the wireless communication device 300 to the information processing device 200 through the first network control device 120. Accordingly, as shown in FIGS. 8 and 9, the connection process is performed. Furthermore, when the return button 175 is pressed down, other operation screen is displayed.

[Operation Example of Wireless Communication Device]

Next, the operation of the wireless communication device 300 according to the first embodiment of the present disclosure will be described with reference to the drawings.

FIG. 11 is a flowchart showing an example of a processing procedure of a communication service control process by the wireless communication device 300 according to the first embodiment of the present disclosure.

First, the communication service operation screen for performing the communication service start operation for receiving the communication service that the user wants is displayed on the display unit 350 (Step S901). In the communication service operation screen, it is determined whether or not the communication service start operation by the user has been performed (Step S902), and when the communication service start operation has not been performed, monitoring is continued.

When the communication service start operation has been performed (Step S902), the control unit 330 acquires congestion degree information relating to the plurality of base stations connectable at the position where the wireless communication device 300 is present from the congestion degree information storage unit 380 (Step S903). Subsequently, the control unit 330 selects a base station (communication carrier) with the lowest congestion degree out of the plurality of base stations relating to the acquired congestion degree information (Step S904). Furthermore, when the selected base station is the base station operated by the first communication carrier having a contract with the user of the wireless communication device 300, the connection process is performed based on the USIM information retained in the wireless communication device 300 without performing processes thereafter.

Subsequently, the control unit 330 transmits a connection permission request for using the selected base station (communication carrier) to the information processing device 200 through the first network control device 120 (Step S905).

Subsequently, it is determined whether or not connection permission indicating that the connection to the base station relating to the connection permission request is permitted has been received (Step S906). Then, when the connection permission has not been received (Step S906), it is determined whether or not the intent that the connection to the base station relating to the connection permission request is not permitted has been received (Step S911), and when the intent of not permitting the connection has not been received, the process returns to Step S906. On the other hand, when the intent of not permitting the connection to the base station relating to the connection permission request has been received (Step S911), the intent is displayed on the display unit 350 (Step S912), and the operation of the communication service control process ends. Furthermore, Step S912 is an example of a display procedure described in the claims.

When the connection permission has been received (Step S906), the USIM information rewriting unit 360 rewrites the USIM information stored in the USIM information storage unit 370 based on the connection permission (Step S907).

Subsequently, the control unit 330 transmits a connection request to the communication carrier (network control device) relating to the rewritten USIM information, and a connection process is performed between the network control device and the wireless communication device 300 (Step S908). After the connection process, the communication service that the user wants is performed between the network control device and the wireless communication device 300.

Subsequently, it is determined whether or not USIM information restoration instruction information indicating that the process of providing the communication service is completed has been received (Step S909), and when the USIM information restoration instruction information has not been received, monitoring is continued. When the USIM information restoration instruction information has been received (Step S909), the USIM information rewriting unit 360 rewrites the USIM information stored in the USIM information storage unit 370 based on the USIM information restoration instruction information (Step S910). In other words, the restoration process of the USIM information is performed.

[Operation Example of Information Processing Device]

Next, the operation of the information processing device 200 according to the first embodiment of the present disclosure will be described with reference to drawings.

[Operation Example when Connection not Permitted is to be Displayed]

FIG. 12 is a flowchart showing an example of a processing procedure of a USIM information rewriting control process by the information processing device 200 according to the first embodiment of the present disclosure. In this example, when the number of wireless communication devices (the number of connections) connected to the base station relating to the connection permission request is equal to or higher than a threshold value, an example is shown in which the intent of not permitting the connection to the base station relating to the connection permission request is displayed on the wireless communication device.

First, it is determined whether or not the connection permission request from the wireless communication device has been received (Step S915), and when the connection permission request has not been received, monitoring is continued. When the connection permission request has been received (Step S915), the connection permission determination unit 260 performs a connection permission determination process (Step S916). In other words, the connection permission determination unit 260 acquires the number of wireless communication devices (the number of connections) connected to the base station relating to the connection permission request from the connection number calculation unit 250, and compares the acquired number of connections to the threshold value (Step S916). Furthermore, Step S916 is an example of the determination procedure described in the claims.

When the number of connections is less than the threshold value (Step S916), the USIM information rewriting control unit 270 transmits the connection permission indicating the intent of permitting the connection to the base station relating to the connection permission request to the wireless communication device that transmitted the connection permission request (Step S917). In this case, the connection permission is transmitted through the network control device relating to the USIM information retained in the wireless communication device that transmitted the connection permission request. In addition, the USIM information rewriting control unit 270 records terminal identification information relating to the wireless communication device 300 to which the connection permission is transmitted and information on the base station to which the device is connected (the cell ID, the communication carrier, or the like) onto the wireless communication device information retaining unit 240. Furthermore, Step S917 is an example of a setting procedure described in the claims.

Subsequently, it is determined whether or not the connection of the wireless communication device after rewriting of the USIM information (the process of providing the communication service) has been completed (Step S918), and when the process of providing the communication service has not been completed, monitoring is continued. On the other hand, when the process of providing the communication service has been completed (Step S918), the USIM information rewriting control unit 270 transmits the USIM information restoration instruction information to the wireless communication device for which the process of providing the communication service has been completed (Step S919).

In addition, when the number of connections is equal to or higher than the threshold value (Step S916), the intent of not permitting the connection to the base station relating to the connection permission request is transmitted to the wireless communication device that transmitted the connection permission request (Step S920). Accordingly, the intent of not permitting the connection to the base station relating to the connection permission request is displayed on the wireless communication device. Furthermore, Step S920 is an example of a display procedure described in the claims.

As such, when the number of connections to the base station relating to the connection permission request reaches the threshold value, the intent of not permitting the connection is notified to the user, and therefore, the user can easily grasp the intent.

[Operation Example in Connection to Other Base Stations]

FIG. 13 is a flowchart showing an example of the processing procedure of the USIM information rewriting control process by the information processing device 200 according to the first embodiment of the present disclosure. This example shows that, when the number of wireless communication devices (the number of connections) connected to the base station relating to the connection permission request is equal to or higher than the threshold value, the wireless communication device is connected to other base station. In addition, since the processing procedure is of a modified example of FIG. 12, the same reference numerals are given to the portions common to those in FIG. 12, and description thereof is omitted.

When the number of wireless communication devices (the number of connections) connected to the base station relating to the connection permission request is equal to or higher than the threshold value (Step S916), the connection permission determination unit 260 selects a new candidate based on the content of the congestion degree information retaining unit 220 (Step S921). In other words, the connection permission determination unit 260 selects as a new candidate a base station (communication carrier) with the next lowest congestion degree from the plurality of base stations connectable at the position where the wireless communication device that transmitted the connection permission request is present (Step S921).

Subsequently, it is determined whether or not the selected base station as a new candidate is a base station operated by the communication carrier having a contract with the user of the wireless communication device that transmitted the connection permission request (Step S922). In other words, it is determined whether or not the base station selected as a new candidate is connectable to the wireless communication device that transmitted the connection permission request (Step S922). When the base station selected as a new candidate is connectable to the wireless communication device that transmitted the connection permission request (Step S922), the operation of the USIM information rewriting control process ends. In this case, for example, the intent is transmitted to the wireless communication device.

When the base station selected as a new candidate is not connectable to the wireless communication device that transmitted the connection permission request (Step S922), the connection permission determination unit 260 performs a connection permission determination process (Step S923). In other words, the connection permission determination unit 260 acquires the number of wireless communication devices (the number of connections) connected to the base station selected as a new candidate from the connection number calculation unit 250, and compares the acquired number of connections to a threshold value (Step S923).

When the number of connections is less than the threshold value (Step S923), the USIM information rewriting control unit 270 transmits connection permission indicating the intent of permitting the connection to the base station selected as a new candidate to the wireless communication device that transmitted the connection permission request (Step S924). In this case, the connection permission is transmitted through the network control device relating to the USIM information retained in the wireless communication device that transmitted the connection permission request.

On the other hand, when the number of connections is equal to or higher than the threshold value (Step S923), the process returns to Step S921, and another new candidate is selected.

As such, when the number of connections to the base station reaches the threshold value, it is possible to grant permission for connecting to a base station with the next lowest congestion degree (or a wireless communication network with the second highest predicted communication rate).

[Operation Example when Specific Communication Service is Preferentially Connected]

Figure 14:
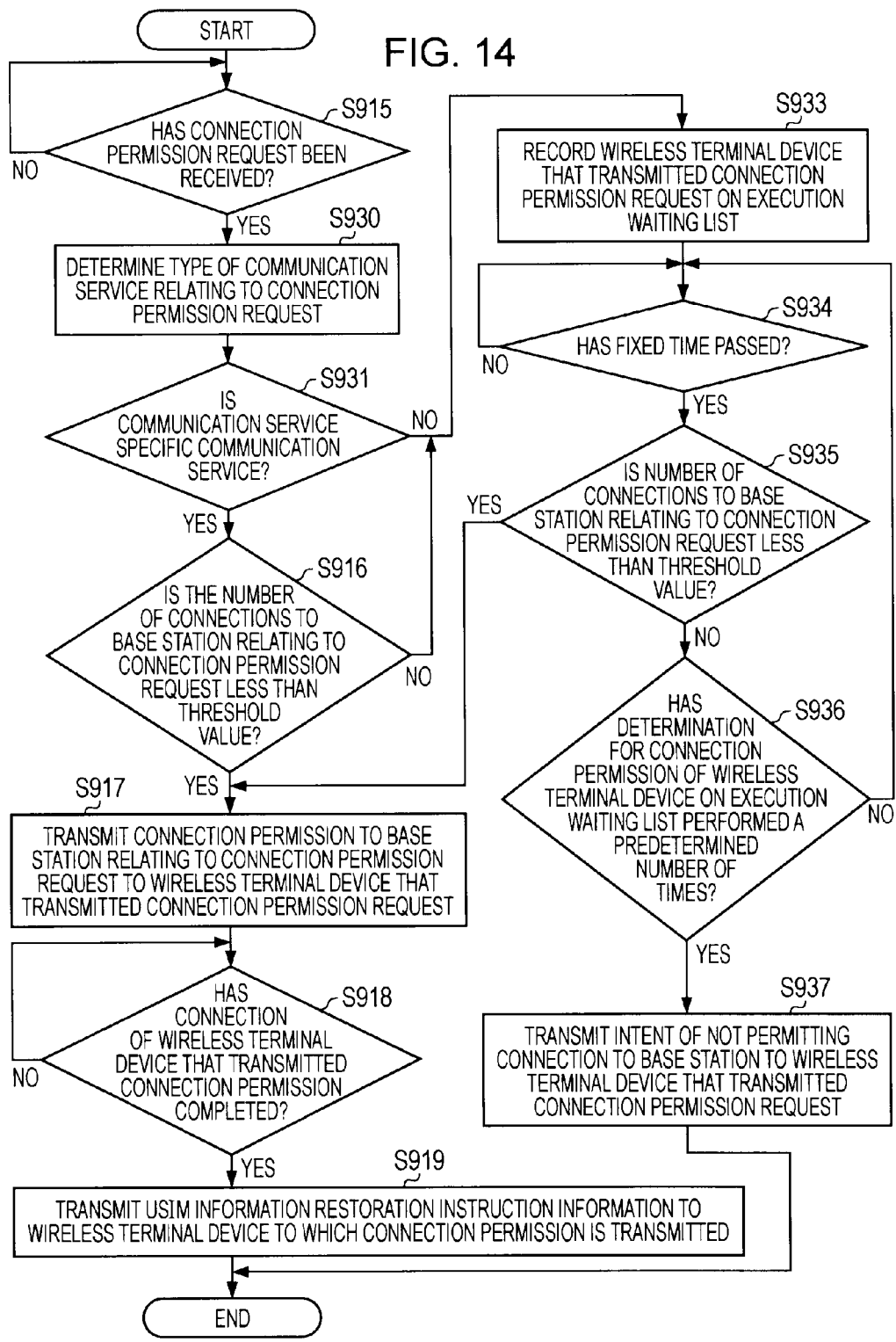
FIG. 14 is a flowchart showing an example of the processing procedure of the USIM information rewriting control process by the information processing device according to the first embodiment of the present disclosure.

FIG. 14 is a flowchart showing an example of the processing procedure of the USIM information rewriting control process by the information processing device 200 according to the first embodiment of the present disclosure. This example shows that, when a communication service relating to the connection permission request from the wireless communication device is a specific communication service, the connection relating to the connection permission request is preferentially performed. In addition, since the processing procedure is of a modified example of FIG. 12, the same reference numerals are given to the portions common to those in FIG. 12, and description thereof is omitted.

When the connection permission request is received from the wireless communication device (Step S915), the communication service type determination unit 212 determines the type of a communication service relating to the connection permission request (Step S930). Furthermore, Step S930 is an example of a service type determination procedure described in the claims. Subsequently, the connection permission determination unit 260 determines whether or not the type of the communication service relating to the connection permission request is a specific communication service (Step S931). Such a specific communication service is, for example, a continuously provided communication service (for example, 161 shown in FIG. 7B). When the type of the communication service relating to the connection permission request is the specific communication service (Step S931), the process advances to Step S916.

When the type of the communication service relating to the connection permission request is not the specific communication service (Step S931), the connection permission determination unit 260 records the wireless communication device that transmitted the connection permission request in the execution waiting list retaining unit 280 (Step S933). Subsequently, it is determined whether or not a fixed time has passed (Step S934), and when the fixed time has not passed, monitoring is continued. Until the fixed time passes, the wireless communication device that transmitted the connection permission request may perform a connection process using the already-retained USIM information so as to activate the desired communication service.

When the fixed time has passed (Step S934), the connection permission determination unit 260 performs the connection permission determination process (Step S935). In other words, the connection permission determination unit 260 acquires from the connection number calculation unit 250 the number of wireless communication devices (the number of connections) connected to the base station relating to the connection permission request from the wireless communication device recorded in the execution waiting list retaining unit 280. Then the acquired number of connections and the threshold value are compared (Step S935).

When the number of connections is less than the threshold value (Step S935), the process advances to Step S917. On the other hand, when the number of connections is equal to or higher than the threshold value (Step S935), it is determined whether or not the connection permission determination process relating to the wireless communication device recorded in the execution waiting list retaining unit 280 has been performed a predetermined number of times (Step S936). When the connection permission determination process has not been performed the predetermined number of times (Step S936), the process returns to Step S934. On the other hand, when the connection permission determination process has been performed the predetermined number of times (Step S936), the intent of not permitting the connection to the base station relating to the connection permission request is transmitted to the wireless communication device that transmitted the connection permission request (Step S937).

As such, it is possible to preferentially perform the process for the wireless communication device performing the specific communication service (for example, the continuously provided communication service). In other words, it is possible to preferentially permit the wireless communication device to set the connection right to be connected to the selected base station. In addition, it may be possible to preferentially permit a wireless communication device with a high predicted communication rate to set the connection right to be connected to the selected wireless communication network.

FIG. 15 is a flowchart showing an example of a processing procedure of the USIM information rewriting control process by the information processing device 200 according to the first embodiment of the present disclosure. This example shows that, when the communication service relating to the connection permission request from the wireless communication device is other communication service than the specific communication service, the wireless communication device is connected to the next appropriate base station. In addition, since the processing procedure is of a modified example of FIG. 14, the same reference numerals are given to the portions common to those in FIG. 14, and description thereof is omitted.

When the type of the communication service relating to the connection permission request is not the specific communication service (Step S931), the process advances to Step S941. Furthermore, Steps S941 to S944 are substantially the same as Steps S921 to S924 shown in FIG. 13. For this reason, detailed description thereof will be omitted.

As such, a wireless communication device providing the specific communication service (for example, the continuously provided communication service) can be preferentially allocated with resources of the selected wireless communication network. In addition, a wireless communication device that request a service other than the specific communication service can be permitted to set the connection right to be connected to a base station with the next lowest congestion degree in the selected wireless communication network (or a wireless communication network with the next highest predicted communication rate). Furthermore, a service other than the specific communication service is, for example, an intermittently provided communication service.

Figure 28:
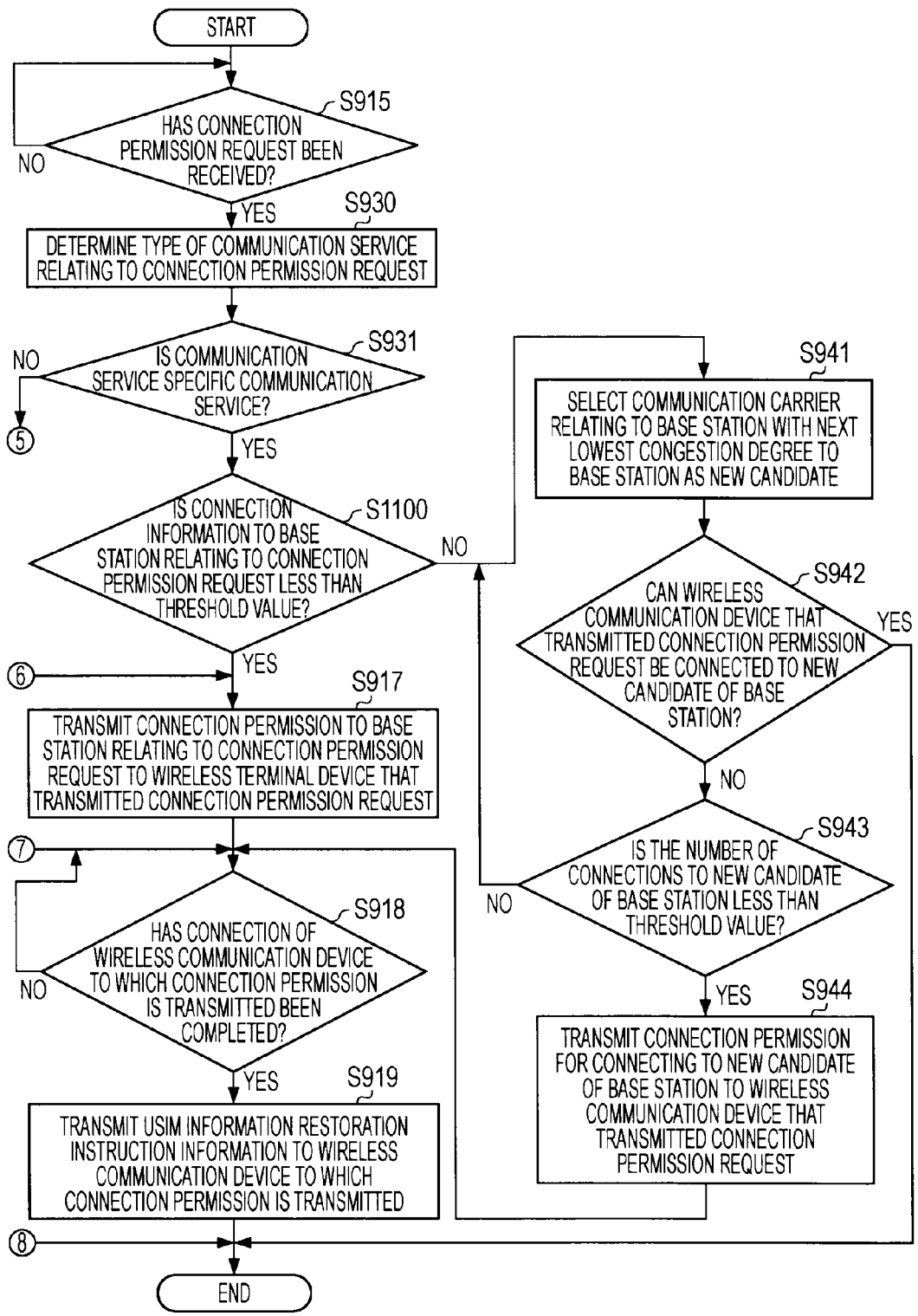
FIG. 28 is a flowchart showing another example of a processing procedure of a USIM information rewriting control process by the information processing device according to the first embodiment of the present disclosure.
Figure 29:
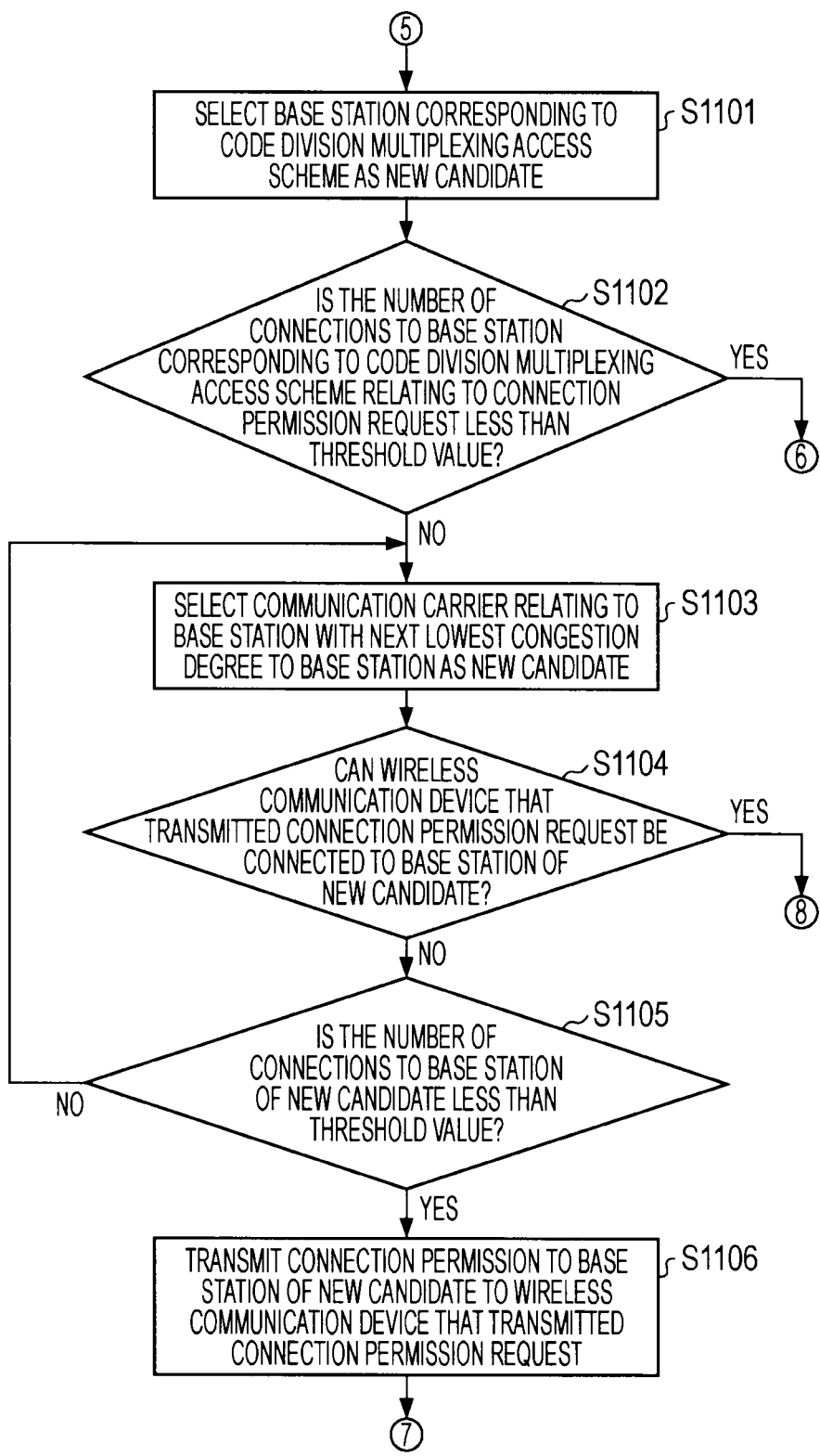
FIG. 29 is a flowchart showing the example of the processing procedure of the USIM information rewriting control process by the information processing device according to the first embodiment of the present disclosure.

FIGS. 28 and 29 are flowcharts showing another example of a processing procedure of a USIM information rewriting control process by the information processing device 200 according to the first embodiment of the present disclosure. This example shows a case in which a wireless communication device is made to be connected to a base station corresponding to the code division multiplexing access scheme when a communication service relating to a connection permission request from the wireless communication device to a base station corresponding to the orthogonal frequency division multiple access scheme is a communication service other than a specific communication service. In addition, since the processing procedure is a modified example of FIG. 15, the same reference numerals will be given to portions common to those in FIG. 15, and description thereof will be omitted.

When the type of the communication service relating to the connection permission request is a specific communication service (Step S931), it is determined whether or not the number of connections to a base station corresponding to the orthogonal frequency division multiple access scheme relating to the connection permission request is less than a threshold value (Step S1100). Then, when the number of connections is less than the threshold value (Step S1100), the process advances to Step S917, and when the number of connections is equal to or greater than the threshold value (Step S1100), the process advances to Step S941. In this case, the base station corresponding to the orthogonal frequency division multiple access scheme is selected as a new candidate (Step S941).

In addition, when the type of the communication service relating to the connection permission request is not a specific communication service (Step S931), a base station corresponding to the code division multiplexing access scheme is selected as a new candidate (Step S1101). Subsequently, it is determined whether or not the number of connections to the base station corresponding to the code division multiplexing access scheme relating to the connection permission request is less than the threshold value (Step S1102). Then, when the number of connections is less than the threshold value (Step S1102), the process advances to Step S917, and when the number of connections is equal to or greater than the threshold value (Step S1102), the process advances to Step S1103. Furthermore, Steps S1103 to S1106 are substantially the same as Steps S921 to S924 shown in FIG. 13. For this reason, detailed description thereof will be omitted herein. However, the base station corresponding to the code division multiplexing access scheme is selected as a new candidate (Step S941).

As such, it is possible to preferentially assign the resources of the selected wireless communication network of the orthogonal frequency division multiple access scheme to the wireless communication device using the specific communication service. Furthermore, the specific communication service is, for example, a continuously provided communication service, or a communication service provided with low-delay. In addition, it is possible to allow a wireless communication device that requests a service other than the specific communication service to set the communication right to be connected to the base station corresponding to the code division multiplexing access scheme. Furthermore, the service other than the specific communication service is, for example, an intermittently provided communication service, or a communication service provided without low-delay.

Figure 30:
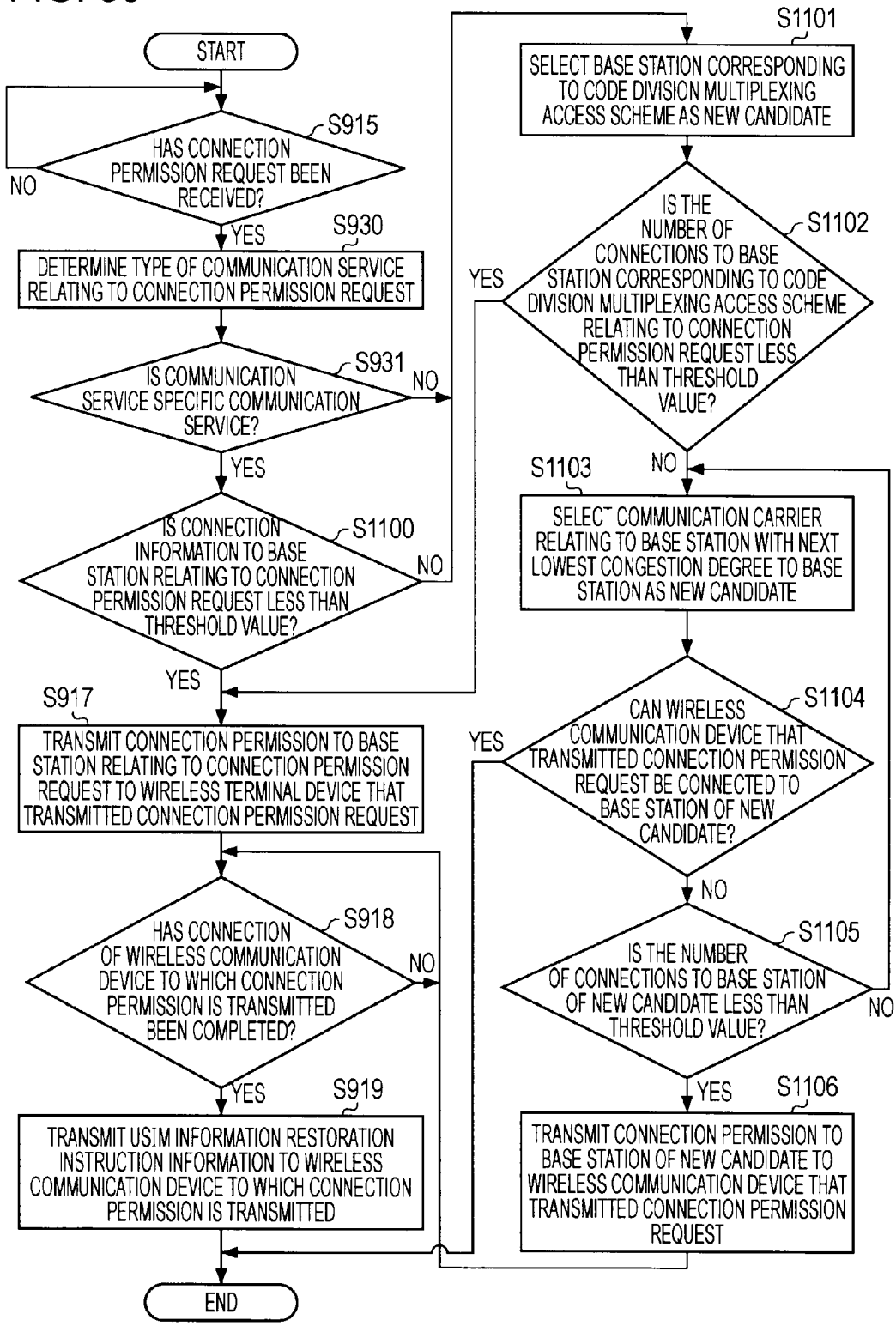
FIG. 30 is a flowchart showing another example of the processing procedure of the USIM information rewriting control process by the information processing device according to the first embodiment of the present disclosure.

FIG. 30 is a flowchart showing another example of the processing procedure of the USIM information rewriting control process by the information processing device 200 according to the first embodiment of the present disclosure. This example shows a case in which the wireless communication device is connected to the base station corresponding to code division multiplexing access scheme when a predetermined condition is satisfied even though the communication service relating to the connection permission request from the wireless communication device to the base station corresponding to the orthogonal frequency division multiple access scheme is a specific communication service. The predetermined condition is, for example, a case in which the wireless resources of the base station corresponding to the orthogonal frequency division multiple access scheme are not sufficient. In addition, since the processing procedure is a modified example of FIGS. 28 and 29, the same reference numerals are given to portions common to those in FIGS. 28 and 29, and description thereof will be omitted.

In other words, when the number of connections to the base station corresponding to the orthogonal frequency division multiple access scheme relating to the connection permission request is equal to or greater than the threshold value (Step S1100), the process advances to Step S1101.

Figure 31:
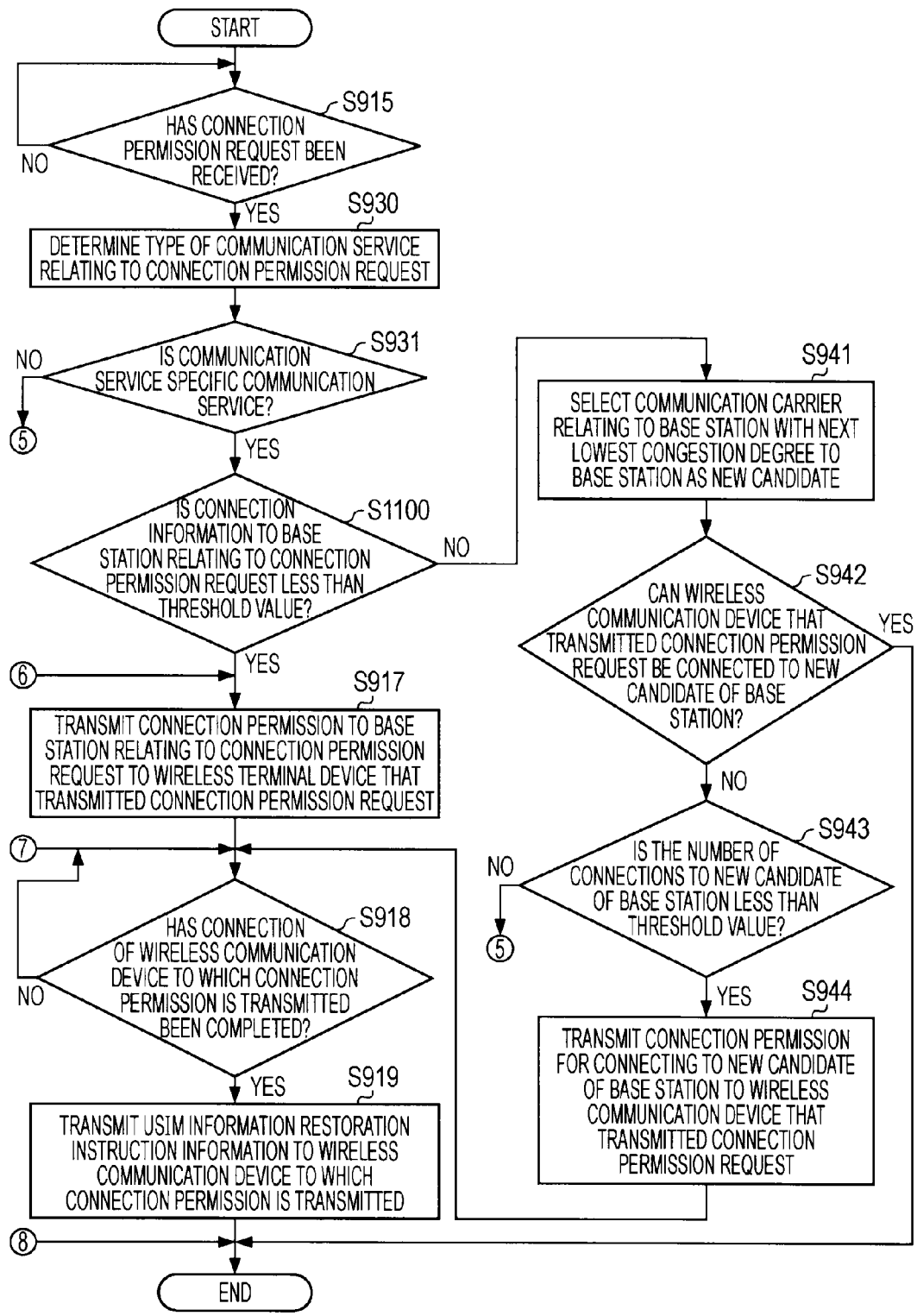
FIG. 31 is a flowchart showing still another example of the processing procedure of the USIM information rewriting control process by the information processing device according to the first embodiment of the present disclosure.

FIG. 31 is a flowchart showing still another example of the processing procedure of the USIM information rewriting control process by the information processing device 200 according to the first embodiment of the present disclosure. This example also shows a case in which the wireless communication device is connected to the base station corresponding to code division multiplexing access scheme if the predetermined condition is satisfied even though the communication service relating to the connection permission request to the base station corresponding to the orthogonal frequency division multiple access scheme is the specific communication service, as in the example shown in FIG. 30. In addition, since the processing procedure is another modified example of FIGS. 28 and 29, the same reference numerals are given to portions common to those in FIGS. 28 and 29, and description thereof will be omitted.

In other words, when the number of connections to the base station as a new candidate is equal to or greater than the threshold value (Step S943), the process advances to Step S1101.

As such, it is possible to preferentially assign the resources of the selected wireless communication network of the orthogonal frequency division multiple access scheme to the wireless communication device using the specific communication service. Furthermore, the specific communication service is, for example, the continuously provided communication service, or the communication service provided with low-delay, as described above. In addition, when the wireless resources of the base station corresponding to the orthogonal frequency division multiple access scheme are not sufficient, it is possible to allow the wireless communication device to set the connection right so as to be connected to a base station with a low congestion degree among base stations corresponding to the code division multiplexing access scheme. Furthermore, a service other than the specific communication service is, for example, the intermittently provided communication service or the communication service provided without low-delay.

Furthermore, it may be possible to set the preference of performing a processing procedure among those shown in FIGS. 12 to 15 and FIGS. 28 to 31 with a user operation. Such a setting operation can be performed, for example, with the operation reception unit 340 of the wireless communication device 300.

[Selection Example of Connection Point in Consideration of Communication Cost]

Hereinabove, an example of selecting the optimum communication carrier for the communication service that the user wants based on the congestion degree, or the like, is shown. Herein, it is also considered that importance is put more on communication cost than on a communication rate depending on users. Therefore, hereinafter, an example of selecting the optimum communication carrier for a communication service according to the preference of a user will be shown.

[Display Example in Initial Setting]

Figure 16A:
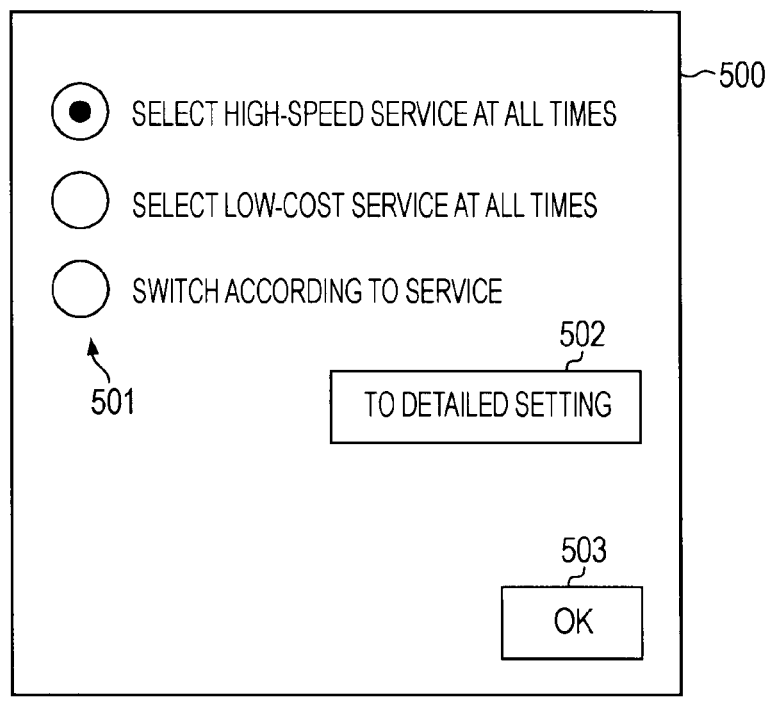
FIGS. 16A and 16B are diagrams showing display screen examples displayed in the wireless communication device according to the first embodiment of the present disclosure.
Figure 16B:
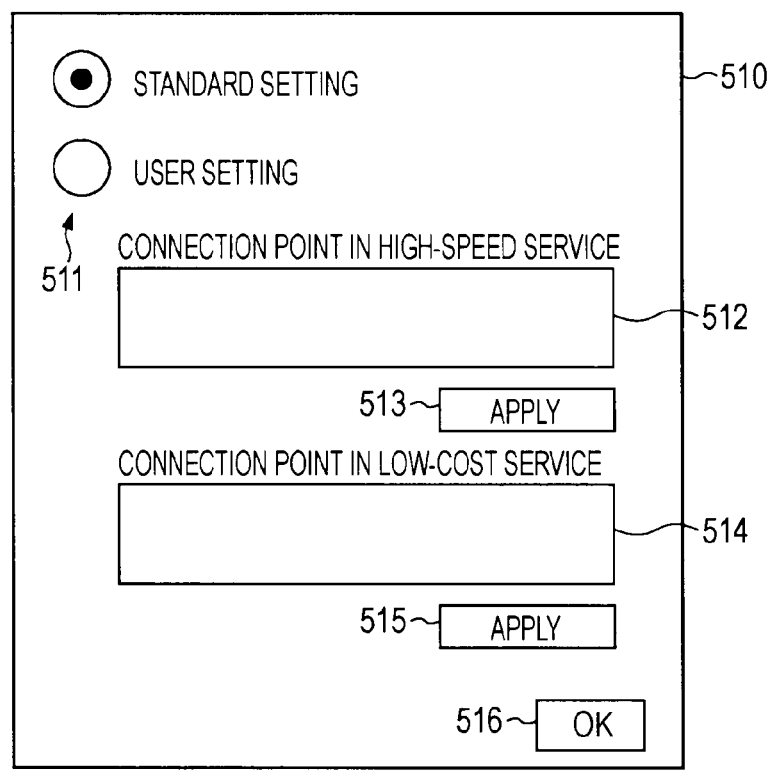

FIGS. 16A and 16B are diagrams showing display screen examples displayed in the wireless communication device 300 according to the first embodiment of the present disclosure.

FIG. 16A shows a setting screen example (setting screen 500) for setting conditions when a desired base station (communication carrier) is to be selected when the communication service that the user wants is to be received using the wireless communication device 300. The setting screen 500 displays radio buttons 501, a detailed setting button 502, and an OK button 503.

For example, the user can set conditions for when the desired base station (communication carrier) is to be selected by selecting a desired radio button 501 and then pressing down the OK button 503.

For example, when "select high-speed service at all times" is selected, a connection permission request for being connected to a communication carrier that is expected to provide at a high speed is performed based on the congestion degree information. In addition, for example, when "select low-cost service at all times" is selected, a connection permission request for being connected to a communication carrier that provides a service at the lowest cost is performed based on communication cost information.

In addition, when detailed setting thereof is to be performed, a detailed setting screen (not shown in the drawing) is displayed after pressing down the detailed setting button 502 to perform detailed setting on the detailed setting screen.

FIG. 16B shows the other setting screen example (setting screen 510). The setting screen 510 displays radio buttons 511, an input box for connection point in high-speed service 512, application buttons 513 and 515, an input box for connection point in low-cost service 514, and an OK button 516.

For example, the user can set conditions for when the desired base station (communication carrier) is to be selected by selecting a desired radio button 511 and pressing down the OK button 516.

For example, in a case where "standard setting" is selected, when the "continuously provided communication service" is to be received, a connection permission request for being connected to the communication carrier corresponding to the high-speed communication service is made. On the other hand, when the "intermittently provided communication service" is to be received, a connection permission request for being connected to the communication carrier corresponding to the low-cost communication service is made.

In addition, for example, when "user setting" is selected, each connection point (such as URL) for being connected to the communication carrier corresponding to the high-speed communication service or the low-cost communication service is set by a user operation. In other words, it is possible to set each connection point (such as URL) by inputting each connection point (such as URL) in the input box for connection point in high-speed service 512 or the input box for connection point in low-cost service 514 and pressing down the application buttons 513 and 515. Furthermore, as the detailed setting method in FIG. 16A, the setting method shown in FIG. 16B can also be used.

As such, by setting whether to select an appropriate wireless communication network based on the congestion degree or based on the communication cost, it is possible to automatically select as the user wanted according to the setting when the connection permission request is transmitted.

In addition, in the example to be shown below, the threshold value retaining unit 261 retains two threshold values (a first threshold value and a second threshold value), and a threshold value determination process is performed using either of the values. Herein, fixed values may be used as the first and second threshold values, and the values may be periodically or non-periodically changed based on the congestion degree or the predicted communication rate retained in the information processing device 200.

In addition, in regard to the first threshold value and the second threshold value, it is possible to set an equal value in order to fairly deal with a wireless communication device that selects a base station (communication carrier) based on the congestion degree and a wireless communication device that selects a base station (communication carrier) based on a communication cost. In addition, since it is presumed that the wireless communication device that selects a base station (communication carrier) based on a communication cost activates a communication service that does not relatively necessitate a communication rate, the second threshold value can be set to a higher value than the first threshold value. In other words, the second threshold value can be set to a value in which conditions are further alleviated than in the first threshold value. Herein, in parallel to setting the second threshold value to be higher than the first threshold value, it may be possible to put a communication speed limitation for the communication service for the wireless communication device that select a base station based on a communication cost. In addition, the first and the second threshold values may be dynamically changed according to the congestion degrees, and the magnitude relationship between the first and the second threshold values may be dynamically changed.

[Operation Example of Wireless Communication Device]

Next, an operation of the wireless communication device 300 according to the first embodiment of the present disclosure will be described with reference to drawings.

FIG. 17 is a flowchart showing an example of a processing procedure of a communication service control process by the wireless communication device 300 according to the first embodiment of the present disclosure. Since the processing procedure is of a modified example of FIG. 11, the same reference numerals are given to the portions common to those in FIG. 11, and description thereof is omitted.

When the communication service start operation has been performed (Step S902), the control unit 330 determines whether or not the communication service relating to the communication service start operation by the user is a high-speed communication service (Step S951). Then, when the service is determined to be a high-speed communication service (Step S951), the process advances to Step S903. On the other hand, when the communication service relating to the communication service start operation by the user is determined not to be a high-speed communication service (Step S951), communication cost information is obtained (Step S952). In other words, the control unit 330 acquires from the communication cost information storage unit 390 the communication cost information relating to the plurality of base stations connectable at the position where the wireless communication device 300 is present (Step S952). Subsequently, the control unit 330 selects the base station (communication carrier) with the lowest communication cost from the plurality of base stations relating to the acquired communication cost information (Step S953). Furthermore, when the selected base station is the base station operated by the first communication carrier having a contract with the user of the wireless communication device 300, the connection process is performed based on the USIM information retained in the wireless communication device 300 without performing processes thereafter.

Subsequently, the control unit 330 transmit a connection permission request for using the selected base station (communication carrier) to the information processing device 200 through the first network control device 120 (Step S954).

As such, the wireless communication device 300 can select a base station with a low congestion degree based on the congestion degree information relating to the plurality of base stations connectable at the position. In addition, the wireless communication device 300 can select a wireless communication network with a low communication cost based on the communication cost information relating to the plurality of base stations connectable at the position. In other words, it is possible to provide the desired service with a high probability to a wireless communication device that wants a connection expecting a high communication rate or a low communication cost, and thus, it is possible to provide a wireless communication service catering to the type of the communication service or the preference of the user.

[Operation Example of Information Processing Device]

Next, an operation of the information processing device 200 according to the first embodiment of the present disclosure will be described with reference to drawings.

[Operation Example when the Intent of not Permitting Connection is to be Displayed]

FIG. 18 is a flowchart showing an example of a processing procedure of the USIM information rewriting control process by the information processing device 200 according to the first embodiment of the present disclosure. The example shows that, when the number of wireless communication devices (the number of connections) connected to the base station relating to the connection permission request is equal to or higher than the threshold value (the first or the second threshold value), the intent of not permitting the connection to the base station relating to the connection permission request is displayed in the wireless communication device. In addition, since the processing procedure is of a modified example of FIG. 12, the same reference numerals are given to the portions common to those in FIG. 12, and description thereof is omitted.

When the connection permission request has been received (Step S915), the connection permission determination unit 260 determines whether or not the connection permission request is based on the congestion degree, based on selection criterion information included in the connection permission request (Step S955). When the connection permission request is based on the congestion degree (Step S955), the connection permission determination unit 260 performs a connection permission determination process using the first threshold value (Step S956). In other words, the connection permission determination unit 260 acquires from the connection number calculation unit 250 the number of wireless communication devices (the number of connections) connected to the base station relating to the connection permission request, and compares the acquired number of connections and the first threshold value (Step S956).

When the number of connections is less than the first threshold value (Step S956), the process advances to Step S917, and when the number of connections is equal to or higher than the first threshold value (Step S956), the process advances to Step S920.

When the connection permission request is not based on the congestion degree (Step S955), connection permission determination unit 260 performs the connection permission determination process using the second threshold value (Step S957). In other words, the connection permission determination unit 260 acquires from the connection number calculation unit 250 the number of wireless communication devices (the number of connections) connected to the base station relating to the connection permission request, and compares the acquired number of connections and the second threshold value (Step S957).

When the number of connections is less than the second threshold value (Step S957), USIM information rewriting control unit 270 transmits connection permission indicating the intent of permitting the connection to the base station relating to the connection permission request to the wireless communication device that transmitted the connection permission request (Step S958). In this case, the connection permission is transmitted through the network control device relating to the USIM information retained in the wireless communication device that transmitted the connection permission request. On the other hand, when the number of connections is equal to or higher than the second threshold value (Step S957), the process advances to Step S920.

In addition, in the same manner as in the example shown in FIG. 13, when the number of connections to the base station is less than the second threshold value (Step S957), a base station with the next lowest communication cost to the base station is selected as a new candidate, and a second threshold value determination process may be performed for the candidate.

As such, when the number of connections permitted for the connection to the base station relating to the connection permission request reaches the first threshold value, the intent of not permitting the connection to the base station relating to the connection permission request is notified to the wireless communication device that transmitted the connection permission request based on the congestion degree of the predicted communication rate. In addition, when the number of connections permitted for the connection to the base station relating to the connection permission request reaches the second threshold value, the intent of not permitting the connection to the base station relating to the connection permission request is notified to the wireless communication device that transmitted the connection permission request based on the communication cost.

[Operation Example when Specific Communication Service is Preferentially Connected]

FIG. 19 is a flowchart showing an example of a processing procedure of the USIM information rewriting control process by the information processing device 200 according to the first embodiment of the present disclosure. FIGS. 19 and 20 show that, when the communication service relating to the connection permission request from the wireless communication device is a specific communication service, connection relating to the connection permission request is preferentially performed. In addition, since the processing procedures thereof is of a modified example of FIG. 18, the same reference numerals are given to the portions common to those in FIG. 18, and description thereof is omitted.

When the connection permission request is based on the congestion degree (Step S955), the communication service type determination unit 212 determines the type of the communication service relating to the connection permission request (Step S960). Subsequently, the connection permission determination unit 260 determines whether or not the type of the communication service relating to the connection permission request is the specific communication service (Step S961). When the type of the communication service relating to the connection permission request is the specific communication service (Step S961), the process advances to Step S956, and when it is not the specific communication service, the process advances to Step S957.

FIG. 20 is a flowchart showing the example of the processing procedure of the USIM information rewriting control process by the information processing device 200 according to the first embodiment of the present disclosure.

When the connection permission request is not based on the congestion degree (Step S955), the communication service type determination unit 212 determines the type of the communication service relating to the connection permission request (Step S962). Subsequently, the connection permission determination unit 260 determines whether or not the type of the communication service relating to the connection permission request is the specific communication service (Step S963). When the type of the communication service relating to the connection permission request is the specific communication service (Step S963), the process advances to Step S956, and when it is not the specific communication service, the process advances to Step S957.

As such, it is possible to allocate the resources of the wireless communication network selected by the wireless communication device to a wireless communication device that desires a further continuous communication service.

Furthermore, it may be possible to set the preference of performing a processing procedure among those shown in FIGS. 12 to 15, FIGS. 17 to 20 and FIGS. 28 to 31 with a user operation. Such a setting operation can be performed, for example, with the operation reception unit 340 of the wireless communication device 300.

[Connection Permission Example Based on Relationship Between Type of Communication Service and Congestion Degree]

Hereinabove, an example of determining whether or not to give connection permission having the number of connections to the base station as the determination reference is shown. Herein, it is also considered to give connection permission based on the relationship between the type of the communication service and the congestion degree of the base station. Therefore, hereinafter, an example of giving connection permission based on the relationship between the type of the communication service and the congestion degree of the base station will be shown.

FIGS. 21A and 21B are diagrams showing an example of criteria of determination used in a connection determination process by the connection permission determination unit 260 according to the first embodiment of the present disclosure.

FIG. 21A shows the relationship between a communication service and limited protocol/port. An application level 551 indicates levels corresponding to a type of communication service 552 and a limited protocol/port 553. For example, L1 corresponds to an intermittently provided communication service, L3 corresponds to a continuously provided communication service, and L2 corresponds to an intermediate communication service therebetween.

FIG. 21B shows the relationship between congestion degrees and permission target communication services. For example, when a congestion degree 561 is relatively high, only the communication service of which the application level 551 is L1 is permitted (a permitted application level 562 is "L1"). In addition, when the congestion degree 561 is relatively low, for example, the communication service of which the application level 551 is any one of L1 to L3 is also permitted (the permitted application level 562 is "L1, L2, and L3").

For example, the connection permission determination unit 260 retains the tables shown in FIGS. 21A and 21B. Then, when the connection permission request has been received, it is determined whether or not the communication service relating to the connection permission request is to be permitted based on the relationship between the type of the communication service relating to the connection permission request and the congestion degree, and only when it is determined to permit the service, a threshold value determination process can be performed. In other words, the connection permission determination unit 260 can specify a connection permission request to be permitted among connection permission requests based on the congestion degree relating to the plurality of base stations to which the wireless communication device can be connected and the type of the communication service relating to the connection permission request.

2. Second Embodiment

In the first embodiment of the present disclosure, an example has been shown in which the optimum communication carrier for the communication service that the user wants is selected based on the congestion degree or the communication cost. Herein, it is assumed that, even if the connection permission request from the wireless communication device is based on the congestion degree, a high-speed communication service is not executed in communication corresponding to the connection permission request. In such a case, it is considered that wireless resources can be efficiently used such that other users who want the high-speed communication service are permitted for connection to the base station. Thus, a second embodiment of the present disclosure shows an example in which, in communication corresponding to the connection permission request from the wireless communication device, other users are preferentially permitted for the connection to the base station when the communication service corresponding to the connection permission request is not being executed. Furthermore, the configuration of a communication system according to the second embodiment of the present disclosure is substantially the same as that in the first embodiment of the present disclosure. For this reason, the same reference numerals are given to portions common to those in the first embodiment of the present disclosure, and part of the description thereof is omitted.

[Configuration Example of Information Processing Device]

Figure 22:
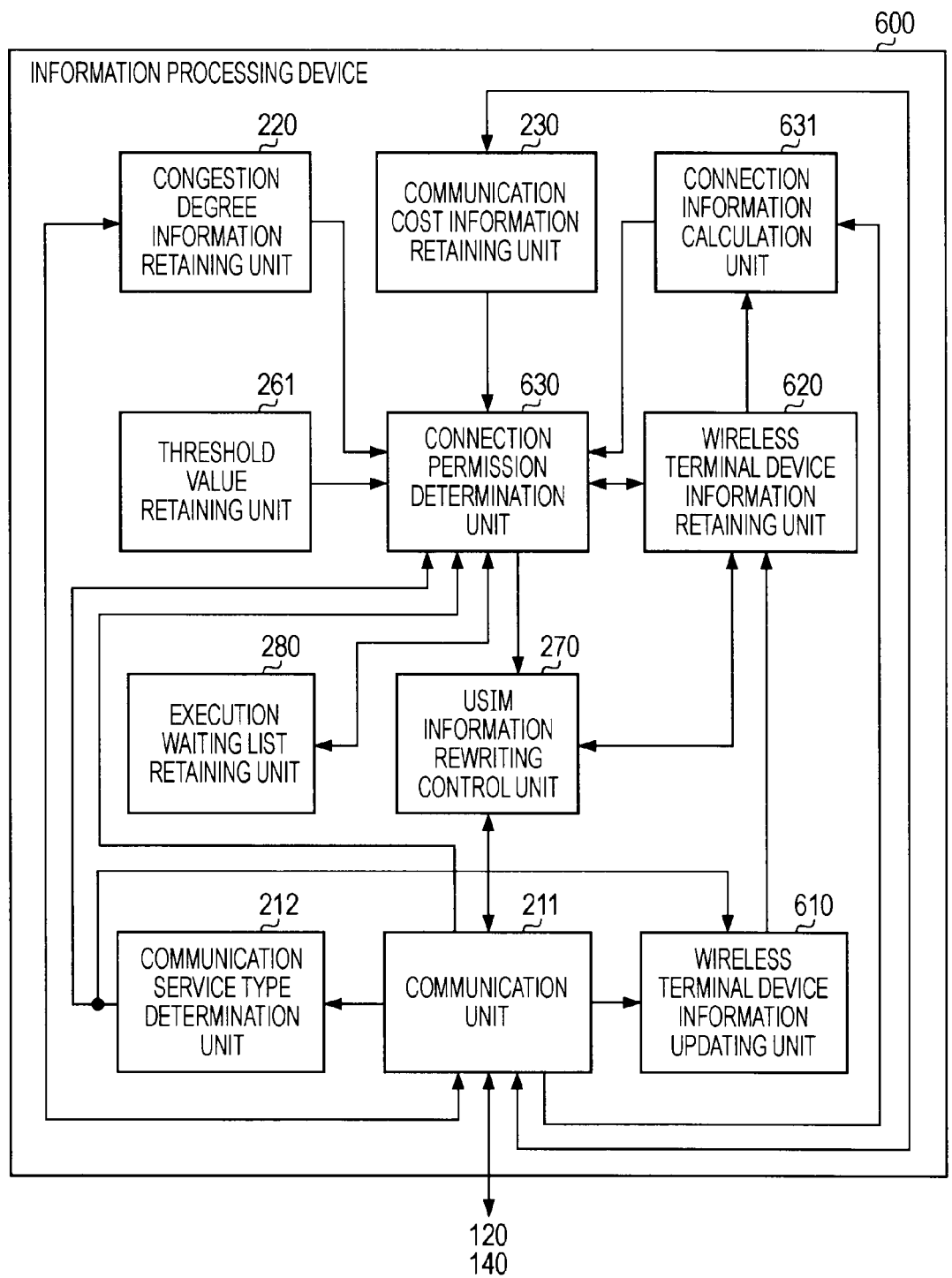
FIG. 22 is a block diagram showing a functional configuration example of an information processing device according to a second embodiment of the present disclosure.

FIG. 22 is a block diagram showing a functional configuration example of an information processing device 600 according to the second embodiment of the present disclosure. Furthermore, the information processing device 600 is a modified example of the information processing device 200 shown in FIG. 3. For this reason, the same reference numerals are given to portions common to those in the information processing device 200, and part of the description thereof is omitted.

The information processing device 600 includes a wireless communication device information updating unit 610, a wireless communication device information retaining unit 620, a connection permission determination unit 630, and a connection information calculation unit 631.

The wireless communication device information updating unit 610 updates retained content of the wireless communication device information retaining unit 620 based on each piece of information (such as a connection permission request, SIR, or the like) output from the communication unit 211 and the determination result output from the communication service type determination unit 212. The updating method will be described in detail with reference to FIG. 24.

The wireless communication device information retaining unit 620 is a retaining unit that retains information on each wireless communication device (wireless communication device information). In addition, the wireless communication device information retaining unit 620 has the retained information (wireless communication device information) to be sequentially updated by the wireless communication device information updating unit 610. Furthermore, the retained content of the wireless communication device information retaining unit 620 will be described in detail with reference to FIG. 23.

The connection information calculation unit 631 calculates connection information on the number of wireless communication devices connected to the base station relating to the connection permission request transmitted therefrom based on the retained content of the wireless communication device information retaining unit 620. In addition, the connection information calculation unit 631 outputs the calculated connection information to the connection permission determination unit 630. The calculation method of the connection information will be described in detail with reference to FIG. 23.

The connection permission determination unit 630 extracts, as a connection point change candidate, a wireless communication device of which the type of the communication service relating to the connection permission request and the type of the service operated between the base station after connection according to the connection permission request do not coincide. Then, the connection permission determination unit 630 determines permission or non-permission on the connection permission request based on a comparison result of the connection information calculated by the connection information calculation unit 631 and the threshold value retained in the threshold value retaining unit 261. In this case, the connection permission determination unit 630 determines permission on the connection permission request when the connection point change candidate is extracted even though the determination based on the comparison result is non-permission on the connection permission request. The extraction process and the determination process will be described in detail with reference to FIGS. 25 to 27.

[Example of Content of Wireless Communication Device Information Retaining Unit]

Figure 23:
FIG. 23 is a diagram schematically showing an example of retained content of a wireless communication device information retaining unit according to the second embodiment of the present disclosure.

FIG. 23 is a diagram schematically showing an example of the retained content of the wireless communication device information retaining unit 620 according to the second embodiment of the present disclosure.

The wireless communication device information retaining unit 620 is a retaining unit that retains information on each wireless communication device (wireless communication device information). Specifically, the wireless communication device information retaining unit 620 retains terminal identification information 621, a cell ID 622, and connection-permitting communication carrier 623 each of which is linked to a wireless communication device. In addition, the wireless communication device information retaining unit 620 retains a service type 624, a congestion degree flag 625, a communication cost flag 626, a weighted coefficient 627, and a connection point change candidate 628 each of which is linked to a wireless communication device. Furthermore, since the terminal identification information 621, the cell ID 622, and the connection-permitting communication carrier 623 correspond to the terminal identification information 241, the cell ID 242, and the connection-permitting communication carrier 243 shown in FIG. 6A, description thereof is omitted.

The service type 624 is for the type of communication service. For example, "C1" indicates the type of continuously provided communication service such as a streaming service, or the like, and "I1" indicates the type of communication service intermittently operated such as browsing, or the like. In this example, only "C1" and "I1" are shown as the service type 624, but the type can be retained after being more finely divided. For example, the continuously provided communication service may be more finely divided (into, for example, C1, C2, C3, and C4), and the intermittently provided communication service may be more finely divided (into, for example, I1, I2, I3, and I4). In addition, as the type of a communication service, a communication service provided with low-delay may be added thereto. Furthermore, the communication service provided with low-delay is, for example, the service for executing applications such as on-line games, and the like. In addition, based on the relationship between the application level 551 and the type of communication service 552 shown in FIG. 21A, L1 and L2 can correspond to I1, and L3 can correspond to C1. In addition, L1 may correspond to I1, and L2 and L3 may correspond to C1.

The congestion degree flag 625 is a flag indicating whether or not the connection permission request from the wireless communication device is transmitted for the selection of the communication service with a low congestion degree. If the connection permission request from the wireless communication device is transmitted for the selection of the communication service with a low congestion degree, "1" is stored. On the other hand, if the connection permission request from the wireless communication device is transmitted not for the selection of the communication service with a low congestion degree, "0" is stored.

The communication cost flag 626 is a flag indicating whether or not the connection permission request from the wireless communication device is transmitted for the selection of the communication service with a low communication cost. If the connection permission request from the wireless communication device is transmitted for the selection of the communication service with a low communication cost, "1" is stored. On the other hand, if the connection permission request from the wireless communication device is transmitted not for the selection of the communication service with a low communication cost, "0" is stored.

The weighted coefficient 627 is a weighted coefficient assigned to the wireless communication device of which connection is permitted according to the connection permission request. For example, a weighted value based on the distance between the base station relating to the connection permission request and the wireless communication device, or a weighted value based on a signal-power-to-interference-power ratio of a pilot signal received from the base station can be set as the weighted coefficient. Using the weighted coefficient, the connection information calculation unit 631 calculates the connection information on the number of wireless communication devices connected to the base station relating to the connection permission request transmitted from the wireless communication device. For example, the connection information calculation unit 631 calculates the connection information by sequentially adding the weighted coefficients 627 assigned to the wireless communication device connected to the base station relating to the connection permission request. Then, using the connection information calculated by the connection information calculation unit 631, the connection permission determination unit 630 performs threshold value determination. For example, when the wireless communication device moves, the SIR of a pilot channel being received deteriorates according to the distance apart from the connected base station. For this reason, even wireless communication devices connected to the same base station have changing weighted coefficients according to the distance to the base station. For example, such a weighted coefficient is periodically or non-periodically updated.

For example, in a system of HSDPA and thereafter, a base station dynamically changes a modulation scheme and a coding rate based on a CQI (Channel Quality Indicator) sent from a wireless communication device to the base station. For example, assume a case where a base station provides a service at the same communication rate to a wireless communication device present at a relatively close position and a wireless communication device present at a relatively distant position. In this case, more resources have to be allocated to the wireless communication device present at a relatively distant position. On the contrary, a few resources are enough to be provided to the wireless communication device present at a relatively close position to the base station. For this reason, it is possible to give connection permission to a lot of wireless communication devices by giving priority to the wireless communication device present at a relatively close position to the base station. In other words, the load on the base station changes according to the distance to the base station or the pilot signal reception quality. Thus, it is possible to perform further appropriate threshold determination by weighting the number of wireless communication devices connected to the base station using each piece of the information.

In addition, the connection permission determination unit 630 can set, for example, a priority degree to the wireless communication device that transmits the connection permission request using each piece of the information. In other words, the connection permission determination unit 630 sets the priority degree based on the distance between the base station relating to the connection permission request and each wireless communication device connected thereto, or a signal-power-to-interference-power ratio of a pilot signal received from the base station. In this case, it is possible to perform the threshold value determination for the wireless communication device according to the priority degree. For example, it is possible that the priority degrees are set to wireless communication devices that make a connection request within a certain period and threshold determination is performed for the wireless communication devices in descending order of the priority degrees.

The connection point change candidate 628 is information indicating a wireless communication device extracted as a connection point change candidate by the connection permission determination unit 630. "1" is stored for the wireless communication device extracted as a connection point change candidate. On the other hand, "0" is stored for the wireless communication device extracted not as a connection point change candidate.

[Operation Example of Information Processing Device]

Next, an operation of the information processing device 600 according to the second embodiment of the present disclosure will be described with reference to drawings.

[Operation Example when Wireless Communication Device Information is Updated]

Figure 24:
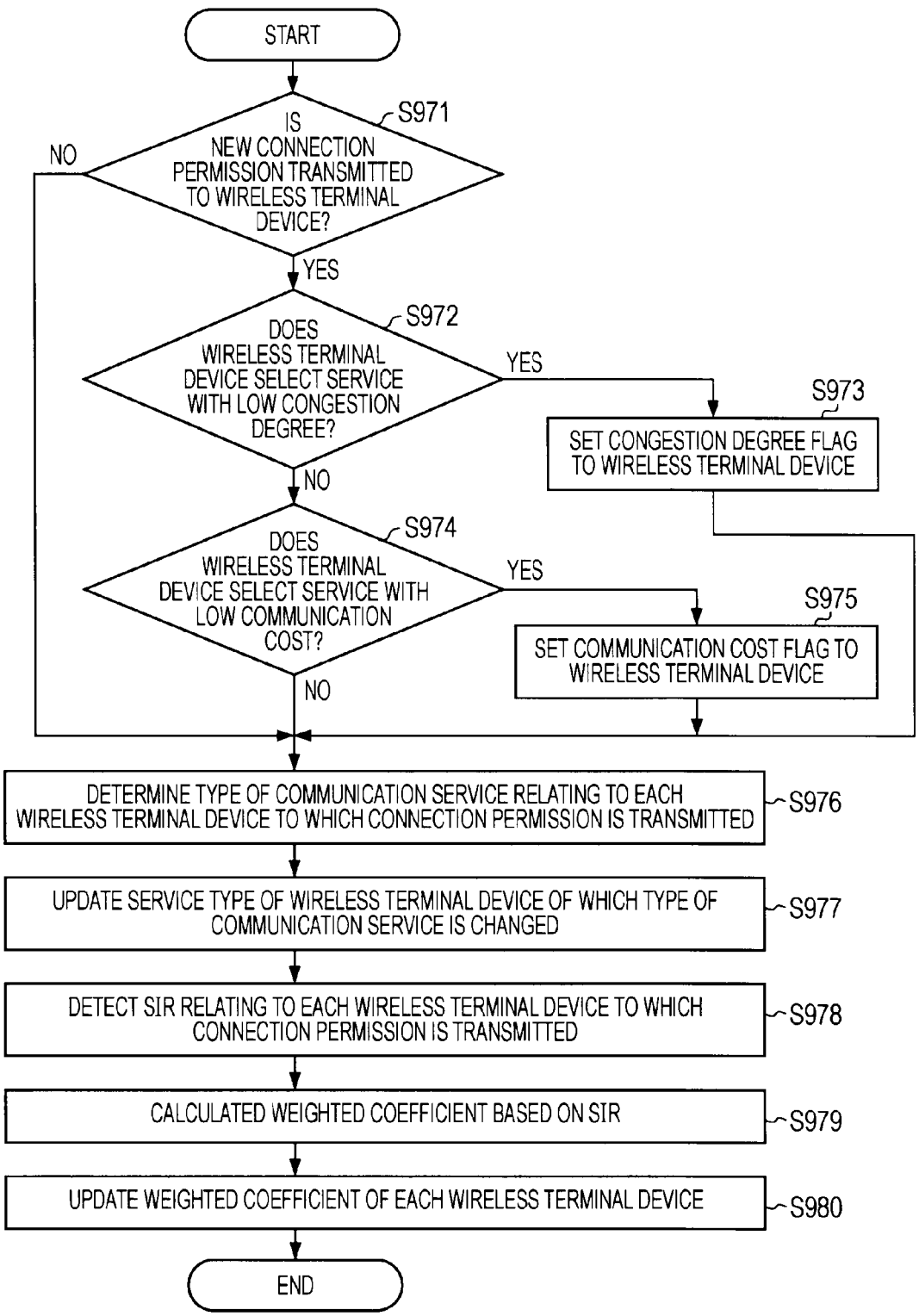
FIG. 24 is a flowchart showing an example of a processing procedure of a wireless communication device information updating control process by the information processing device according to the second embodiment of the present disclosure.

FIG. 24 is a flowchart showing an example of a processing procedure of a wireless communication device information updating control process by the information processing device 600 according to the second embodiment of the present disclosure.

First, the wireless communication device information updating unit 610 determines whether or not new connection permission has been transmitted to the wireless communication device based on the information from the communication unit 211 (Step S971). When the new connection permission has not been transmitted to the wireless communication device, the process advances to Step S976. On the other hand, when the new connection permission has been transmitted to the wireless communication device (Step S971), the wireless communication device information updating unit 610 determines whether or not the wireless communication device to which the new connection permission was transmitted has selected a communication service with a low congestion degree (Step S972). When the wireless communication device to which the new connection permission was transmitted has selected the communication service with the low congestion degree (Step S972), the wireless communication device information updating unit 610 sets the congestion degree flag for the wireless communication device (Step S973). In other words, "1" is recorded for the wireless communication device in the congestion degree flag 625 of the wireless communication device information retaining unit 620.

When the wireless communication device has not selected the communication service with the low congestion degree (Step S972), the wireless communication device information updating unit 610 determines whether or not the wireless communication device has selected a communication service with a low communication cost (Step S974). When the wireless communication device has selected the communication service with a low communication cost (Step S974), the wireless communication device information updating unit 610 sets a communication cost flag for the wireless communication device (Step S975). In other words, "1" is recorded for the wireless communication device in the communication cost flag 626 of the wireless communication device information retaining unit 620.

When the wireless communication device has not selected the communication service with a low communication cost (Step S974), the communication service type determination unit 212 determines the type of the communication service relating to each wireless communication device to which the connection permission is transmitted (Step S976). Subsequently, the wireless communication device information updating unit 610 updates the retained content of the wireless communication device information retaining unit 620 for the wireless communication device of which the type of the communication service has been changed (Step S977) based on the determination result. In other words, the content of the service type 624 of the wireless communication device information retaining unit 620 on the wireless communication device of which the type of the communication service has been changed is updated.

Subsequently, the wireless communication device information updating unit 610 detects an SIR relating to each wireless communication device to which the connection permission is transmitted (Step S978). Then, the wireless communication device information updating unit 610 calculates the weighted coefficient of each wireless communication device to which the connection permission is transmitted based on the detection result (Step S979). Next, the wireless communication device information updating unit 610 updates the retained content of the wireless communication device information retaining unit 620 based on the calculated weighted coefficient of each wireless communication device (Step S980). In other words, the content of the weighted coefficient 627 of the wireless communication device information retaining unit 620 on each wireless communication device to which the connection permission is transmitted is updated.

This example shows that the SIR relating to each wireless communication device to which the connection permission is transmitted is detected and the weighted coefficient is calculated based on the detection result, but another calculation method may be used. For example, it may be possible that path-loss relating to each wireless communication device to which the connection permission is transmitted is detected, and a weighted coefficient is calculated based on the detection result. In addition, it may be possible that, for example, the distance to the base station is calculated from position information relating to each wireless communication device to which the connection permission is transmitted and a weighted coefficient is calculated based on the distance.

[Operation Example when Connection Point Change Candidate is to be Registered]

Figure 25:
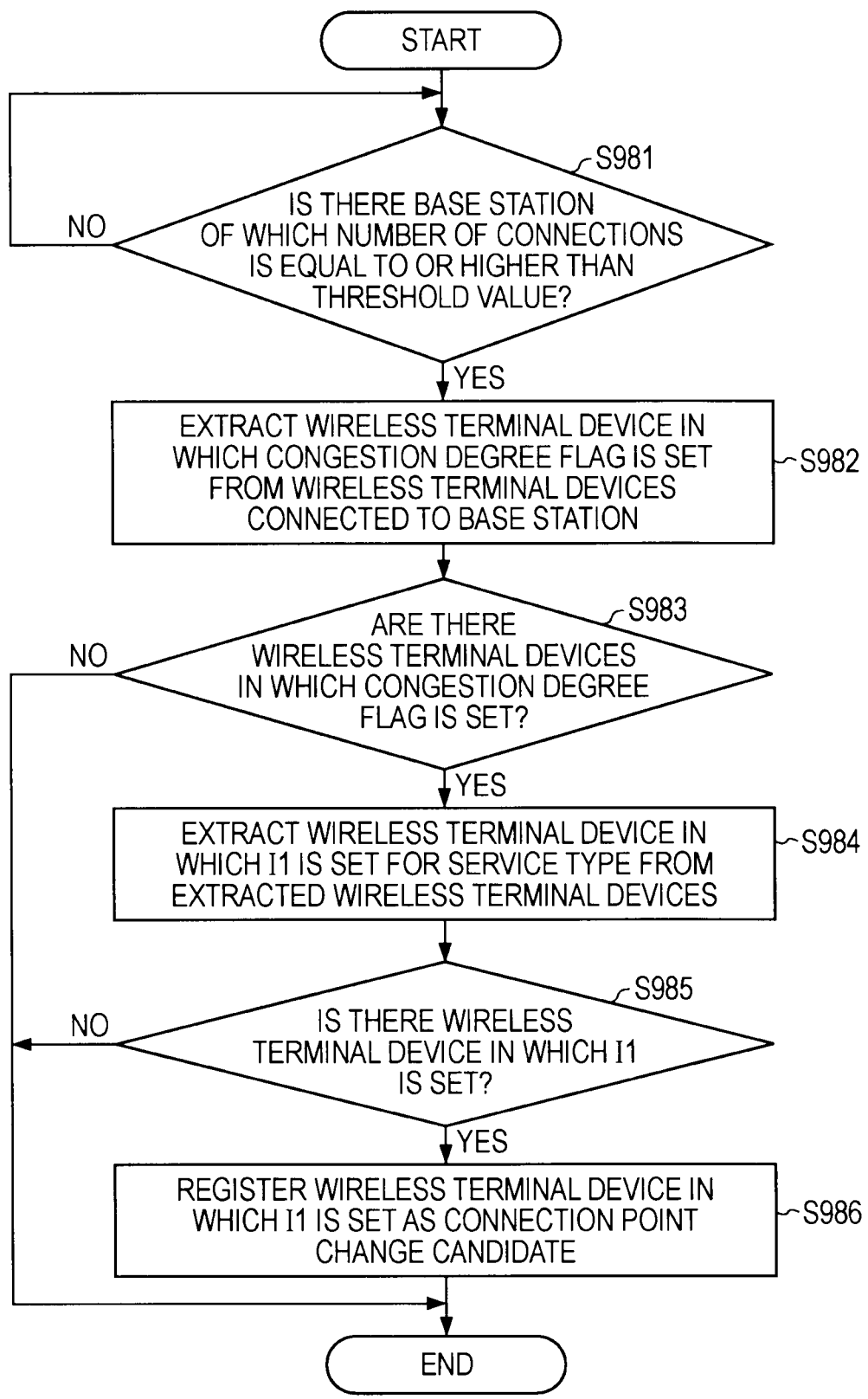
FIG. 25 is a flowchart showing an example of a processing procedure of a connection point change candidate registration control process by the information processing device according to the second embodiment of the present disclosure.

FIG. 25 is a flowchart showing an example of a processing procedure of a connection point change candidate registration control process by the information processing device 600 according to the second embodiment of the present disclosure. This example shows that a connection point change candidate is extracted and registered based on the congestion degree flag and the service type.

First, the connection permission determination unit 630 determines whether or not there is a base station to which the number of connections of wireless communication devices is equal to or higher than a threshold value based on the retained content of the wireless communication device information retaining unit 620 (Step S981), and when there is no base station to which the number of connections is equal to or higher than the threshold value, monitoring is continued. When there is a base station to which the number of connections is equal to or higher than the threshold value (Step S981), the connection permission determination unit 630 extracts a wireless communication device for which the congestion degree flag is set out of the wireless communication devices connected to the base station to which the number of connections is equal to or higher than the threshold value (Step S982). In other words, a wireless communication device is extracted for which "1" is recorded in the congestion degree flag 625 of the wireless communication device information retaining unit 620 out of the wireless communication devices connected to the base station to which the number of connections is equal to or higher than the threshold value. Herein, as the threshold value used in Step S981, for example, the same value as the first threshold value shown in FIG. 18, or the like can be used. In addition, a value less than the first threshold value (for example, a value obtained by multiplying 0.75) may be used. In addition, this example shows that a wireless communication device is extracted based on the comparison result between the number of connections of the wireless communication devices and the threshold value, but a wireless communication device may be extracted based on a comparison result between a value obtained by considering a weight assigned to each wireless communication device and the threshold value. The value obtained by considering a weight, for example, is a value obtained by adding the weighted coefficients 627 shown in FIG. 23 in a unit of base station.

Subsequently, the connection permission determination unit 630 determines whether or not the wireless communication device for which the congestion degree flag is set is extracted (Step S983), and when the wireless communication device for which the congestion degree flag is set is not extracted, the operation of the connection point change candidate registration control process ends. On the other hand, when the wireless communication device for which the congestion degree flag is set is extracted (Step S983), the connection permission determination unit 630 extracts a wireless communication device for which I1 is set in the service type out of extracted wireless communication devices (Step S984). In other words, a wireless communication device for which "I1" is recorded in the service type 624 of the wireless communication device information retaining unit 620 is extracted.

Subsequently, the connection permission determination unit 630 determines whether or not the wireless communication device for which I1 is set in the service type is extracted (Step S985). Then, when the wireless communication device for which I1 is set in the service type is not extracted, the operation of the connection point change candidate registration control process ends. On the other hand, when the wireless communication device for which I1 is set in the service type is extracted (Step S985), the connection permission determination unit 630 registers the wireless communication device for which I1 is set in the service type as a connection point change candidate (Step S986). In other words, "1" is recorded in the connection point change candidate 628 of the wireless communication device information retaining unit 620.

Figure 26:
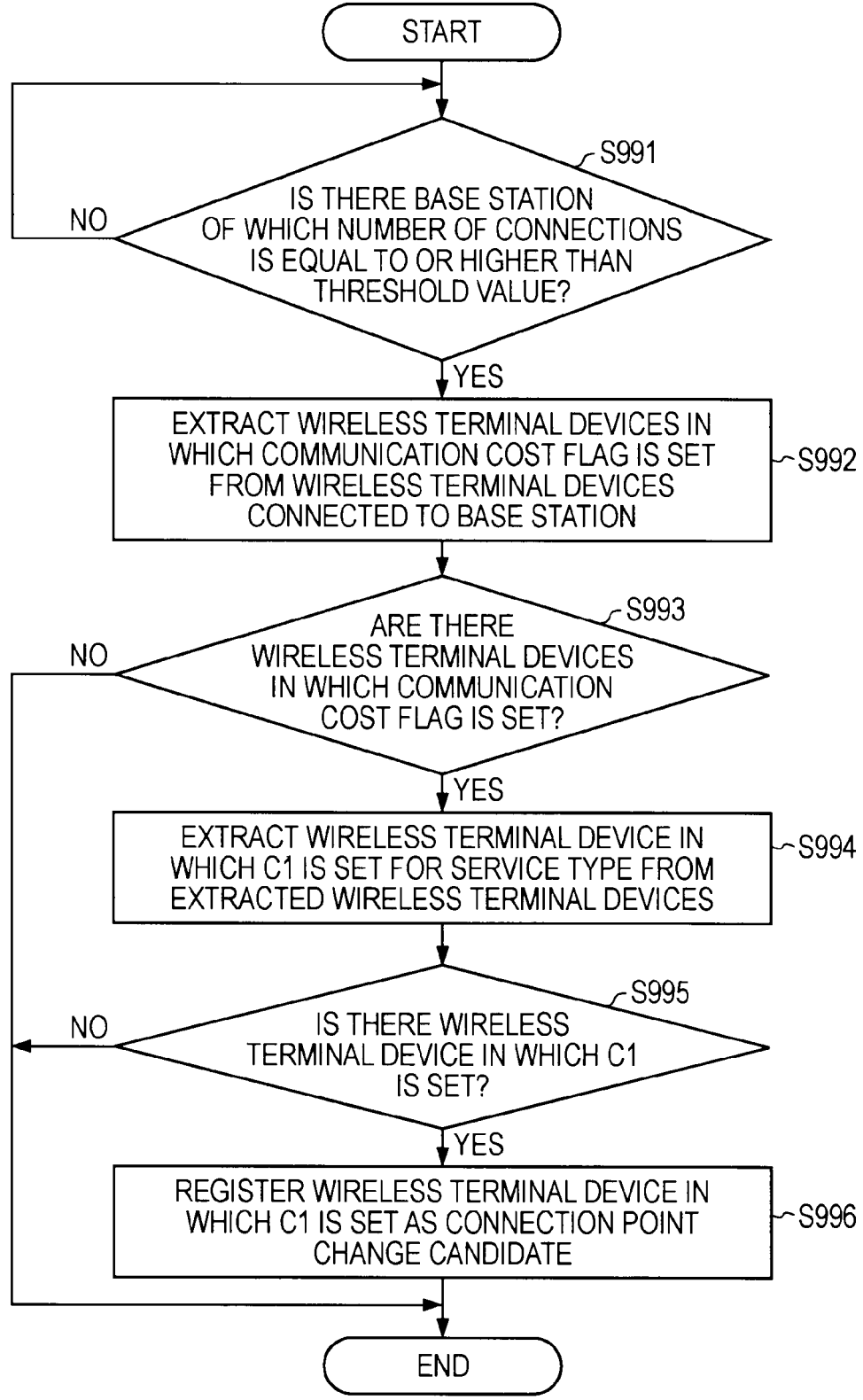
FIG. 26 is a flowchart showing an example of a processing procedure of a connection point change candidate registration control process by the information processing device according to the second embodiment of the present disclosure.

FIG. 26 is a flowchart showing an example of a processing procedure of a connection point change candidate registration control process by the information processing device 600 according to the second embodiment of the present disclosure. This example shows that a connection point change candidate is extracted and registered based on a communication cost flag and a service type.

First, the connection permission determination unit 630 determines whether or not there is a base station to which the number of connections of wireless communication devices is equal to or higher than a threshold value based on the retained content of the wireless communication device information retaining unit 620 (Step S991), and when there is no base station to which the number of connections is equal to or higher than the threshold value, monitoring is continued. When there is a base station to which the number of connections is equal to or higher than the threshold value (Step S991), the connection permission determination unit 630 extracts a wireless communication device for which a communication cost flag is set out of the wireless communication devices connected to the base station to which the number of connections is equal to or higher than the threshold value (Step S992). In other words, a wireless communication device is extracted for which "1" is recorded in the communication cost flag 626 of the wireless communication device information retaining unit 620 out of the wireless communication devices connected to the base station to which the number of connections is equal to or higher than the threshold value. Herein, as the threshold value used in Step S991, for example, the same value as the second threshold value shown in FIG. 18, or the like can be used. In addition, a value less than the second threshold value (for example, a value obtained by multiplying 0.75) may be used. In addition, this example shows that a wireless communication device is extracted based on the comparison result between the number of connections of the wireless communication devices and the threshold value, but a wireless communication device may be extracted based on a comparison result between a value obtained by considering a weight assigned to each wireless communication device and the threshold value. The value obtained by considering a weight, for example, is a value obtained by adding the weighted coefficients 627 shown in FIG. 23 in a unit of base station.

Subsequently, the connection permission determination unit 630 determines whether or not the wireless communication device for which the communication cost flag is set is extracted (Step S993), and when the wireless communication device for which the communication cost flag is set is not extracted, the operation of the connection point change candidate registration control process ends. On the other hand, when the wireless communication device for which the communication cost flag is set is extracted (Step S993), the connection permission determination unit 630 extracts a wireless communication device for which C1 is set in the service type out of extracted wireless communication devices (Step S994). In other words, a wireless communication device for which "C1" is recorded in the service type 624 of the wireless communication device information retaining unit 620 is extracted.

Subsequently, the connection permission determination unit 630 determines whether or not the wireless communication device for which C1 is set in the service type is extracted (Step S995). Then, when the wireless communication device for which C1 is set in the service type is not extracted, the operation of the connection point change candidate registration control process ends. On the other hand, when the wireless communication device for which C1 is set in the service type is extracted (Step S995), the connection permission determination unit 630 registers the wireless communication device for which C1 is set in the service type as a connection point change candidate (Step S996). In other words, "1" is recorded in the connection point change candidate 628 of the wireless communication device information retaining unit 620. Furthermore, Steps S981 to S986 and S991 to S996 are an example of the extraction procedure described in the claims.

As such, the connection permission determination unit 630 extracts, as a connection point change candidate, a wireless communication device of which the type of the communication service relating to the connection permission request and the type of the service operated between the base station after connection according to the connection permission request do not coincide.

[Operation Example where Connection Point Change Candidate is Used]

Figure 27:
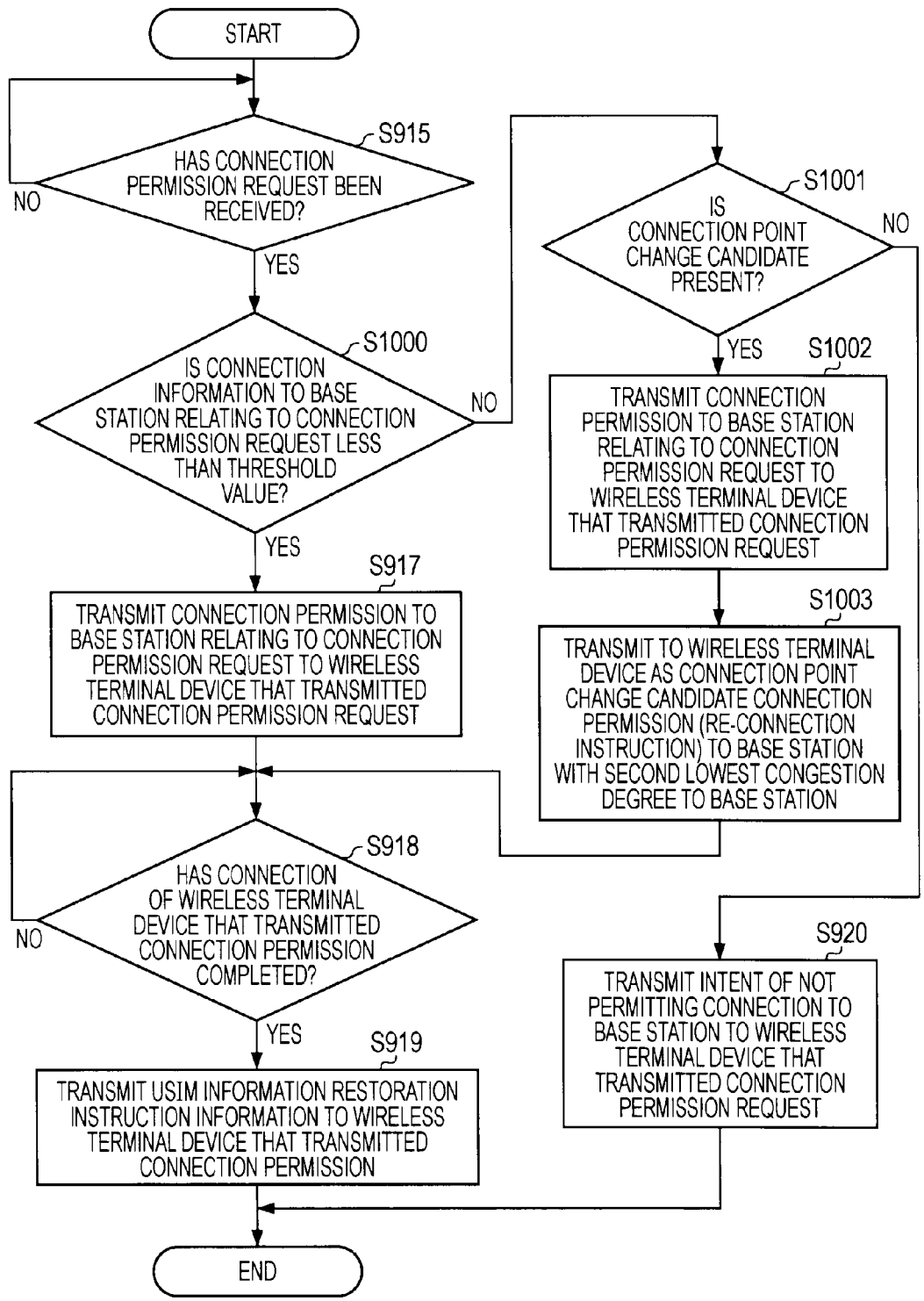
FIG. 27 is a flowchart showing an example of a processing procedure of a USIM information rewriting control process by the information processing device according to the second embodiment of the present disclosure.

FIG. 27 is a flowchart showing an example of a processing procedure of a USIM information rewriting control process by the information processing device 600 according to the second embodiment of the present disclosure. This example shows that, when a new connection permission request is transmitted, a wireless communication device that transmitted the connection permission request is connected taking priority over the connection point change candidate. In addition, since the processing procedure is of a modified example of FIG. 12, the same reference numerals are given to the portions common to those in FIG. 12, and description thereof is omitted.

When the connection permission request is received (Step S915), the connection permission determination unit 630 performs a connection permission determination process (Step S1000). In other words, the connection permission determination unit 630 acquires, from the connection information calculation unit 631, information on the number of wireless communication devices connected to the base station relating to the connection permission request (connection information), and compares the acquired connection information and a threshold value (Step S1000). Then, when the connection information is equal to or higher than the threshold value (Step S1000), the connection permission determination unit 630 determines whether or not there is a connection point change candidate for the base station (Step S1001). In other words, it is determined whether or not "1" is recorded in the connection point change candidate 628 of the wireless communication device information retaining unit 620 in relation to the base station.

When there is no connection point change candidate for the base station (Step S1001), the process advances to Step S920. On the other hand, when there is a connection point change candidate for the base station (Step S1001), the USIM information rewriting control unit 270 transmits connection permission to the wireless communication device that transmitted the connection permission request (Step S1002). Furthermore, the connection permission indicates the intent of permitting connection to the base station relating to the connection permission request.

Subsequently, the USIM information rewriting control unit 270 transmits connection permission (re-connection instruction) indicating the intent of permitting connection to a base station with the next low congestion degree to the base station to a wireless communication device as the connection point change candidate (Step S1003). In this case, in Steps S918 and S919, a USIM information restoration process is performed for each wireless communication device to which the connection permission is transmitted in Steps S1002 and S1003. For example, when the connection of either of the wireless communication devices is completed, the USIM information restoration process is performed for the wireless communication device, and for the other wireless communication device, a restoration process of the USIM information at the time of transmitting the re-connection instruction may be performed.

Figure 32:
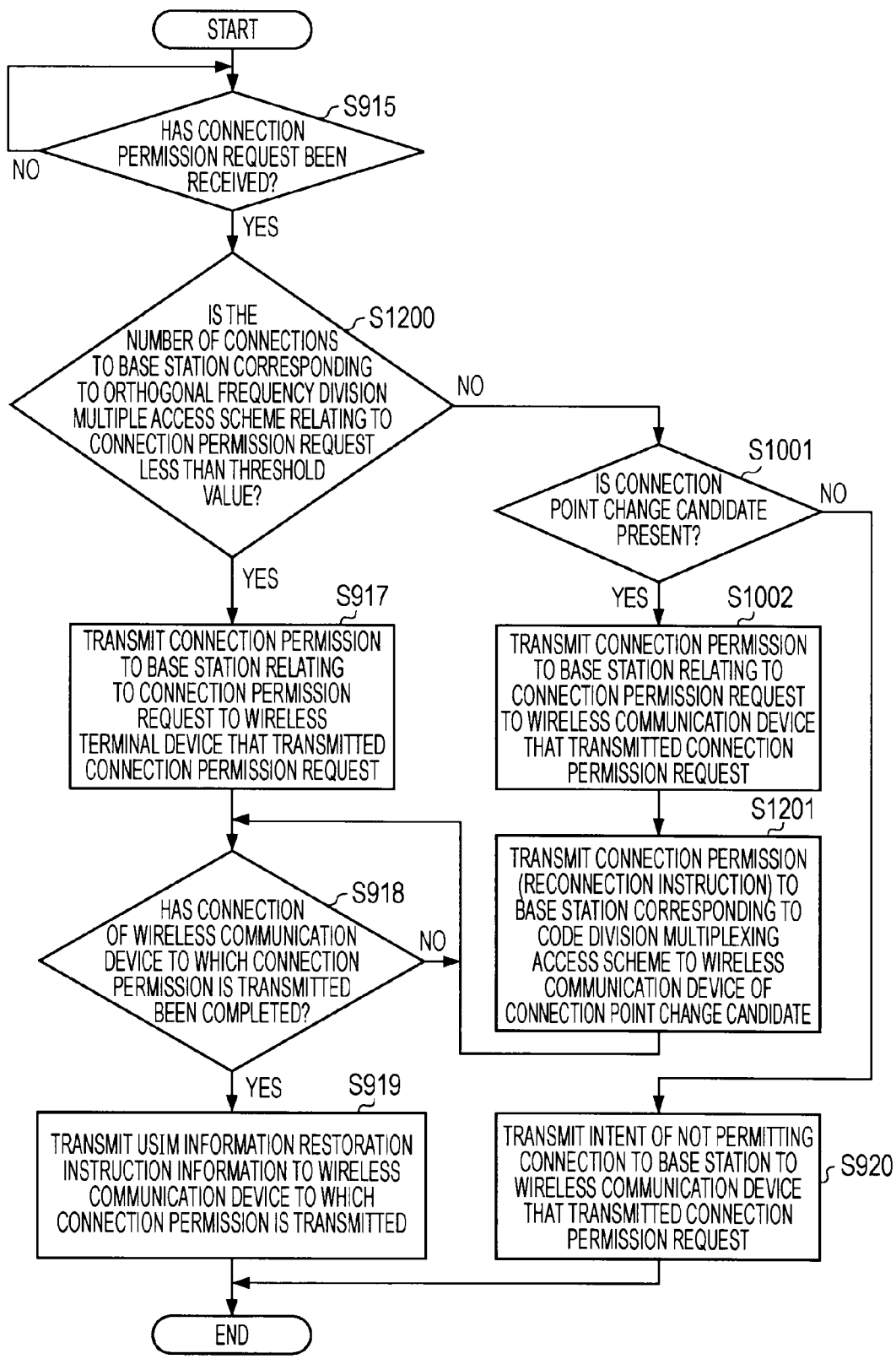
FIG. 32 is a flowchart showing another example of the processing procedure of the USIM information rewriting control process by the information processing device according to the second embodiment of the present disclosure.

FIG. 32 is a flowchart showing another example of the processing procedure of the USIM information rewriting control process by the information processing device 600 according to the second embodiment of the present disclosure. The example shows a case in which, when a new connection permission request is transmitted to a base station corresponding to the orthogonal frequency division multiple access scheme, the wireless communication device that transmitted the connection permission request is preferentially connected to the base station to a connection point change candidate. In addition, the processing procedure is a modified example of FIG. 27, the same reference numerals are given to portions common to those in FIG. 27, and description thereof will be omitted.

When the connection permission request is received (Step S915), the connection permission determination unit 630 determines whether or not the number of connections to the base station corresponding to the orthogonal frequency division multiple access scheme relating to the connection permission request is less than the threshold value (Step S1200). Then, when the number of connections is less than the threshold value (Step S1200), the process advances to Step S917. In addition, when the number of connections is equal to or greater than the threshold value (Step S1200), the connection permission determination unit 630 determines whether or not there is a connection point change candidate for the base station corresponding to the orthogonal frequency division multiple access scheme relating to the connection permission request (Step S1001). Then, when there is a connection point change candidate (Step S1001), the USIM information rewriting control unit 270 transmits connection permission indicating the intent of permitting connection to the base station relating to the connection permission request to the wireless communication device that was transmitted to the connection permission request (Step S1002).

Subsequently, the USIM information rewriting control unit 270 transmits connection permission (re-connection instruction) indicating the intent of permitting connection to a base station with the lower congestion degree among base stations corresponding to the code division multiplexing access scheme to the wireless communication device as the connection point change candidate (Step S1201). In this case, in Steps S918 and S919, a USIM information restoration process is performed for each wireless communication device to which the connection permission is transmitted in Steps S1002 and S1201. For example, when connection of any one of the wireless communication devices is completed, the USIM information restoration process may be performed for the wireless communication device, and a process of restoring USIM information during transmission of the re-connection instruction may be performed for other wireless communication devices.

Furthermore, it may be possible to set with a user operation which procedure among the processing procedures shown in FIGS. 12 to 15, FIGS. 17 to 20, and FIGS. 27 to 32 is to be performed. For example, such a setting operation can be performed with the operation reception unit 340 of the wireless communication device 300.

As such, it is possible to select a wireless communication network based on the congestion degree, and to provide a communication service preferentially to a wireless communication device desiring a continuously provided communication service. In other words, the wireless communication network is selected based on the congestion degree and a wireless communication device operating a communication service not using a high communication rate is made to use another wireless communication network. In addition, a wireless communication device that has desired connection later expecting a high communication rate is provided with the desired communication service. In other words, it is possible to continuously provide the service at the desired communication rate to the wireless communication device using a specific communication service. In addition, after reaching the maximum number of connections that can maintain the desired communication rate, it is possible to provide a service at a relatively high communication rate for the wireless communication device using the specific communication service. Accordingly, it is possible to select a wireless communication network based on the congestion degree, to provide a service preferentially to a wireless communication device that desires a continuously provided communication service, and to reflect the principle of the market based on supply and demand.

Furthermore, the example shows that a base station is selected based on the congestion degree, but can be applied to a case where a base station is selected based on a predicted communication rate or a communication rate. For example, it is possible to select a base station based on the communication cost, and to provide a communication service preferentially to a wireless communication device that desires an intermittently provided communication service. In other words, for wireless communication devices being connected, a base station is selected based on the communication cost, and wireless communication devices executing a communication service using a high communication rate are instructed to be re-connected to a wireless communication network selected from the tradeoff between the communication cost and the congestion degree. Accordingly, it is possible to select the wireless communication network based on the communication cost, to provide the communication service preferentially to the wireless communication device that desires the intermittently provided communication service, and to reflect the principle of the market based on supply and demand on the communication cost.

Herein, in domestic mobile telephone services at present, users conclude their contracts with each communication carrier, and basically are permitted to use the mobile telephone networks of the contracted communication carrier. On the other hand, in foreign countries, for example, respective contracts are concluded with a plurality of communication carriers as pre-paid SIMs, or the like, a plurality of pieces of USIM information are inserted in one wireless communication device, and users switch USIM information depending on regions. In the future, it is expected to dynamically select and use a plurality of connectable wireless communication networks in the same region, regardless of communication carriers, and the type of communication schemes.

Herein, as criteria for selecting a wireless communication network, two criteria are broadly considered, which are the communication rate and the communication cost. For example, when a plurality of wireless communication devices simultaneously try to be connected to a base station that is not congested, expecting a communication service at a high communication rate, there is concern that traffic is concentrated thereto to the contrary, and thus, it is difficult to use the service at a high communication rate as originally expected. In addition, when a plurality of wireless communication devices simultaneously try to be connected to a base station that is not congested, expecting a low communication cost, there is also concern that traffic is concentrated thereto to the contrary resulting in raising the communication cost, and thus it is difficult to enjoy a low-cost communication service as originally expected. On this point, it is important to provide the communication service that users want without a hitch.

For example, it is also assumed that, when a wireless communication network that users want is selected based on the congestion degree from wireless communication networks operated by a plurality of communication carriers, traffic of the users having the same preference is concentrated. In this case, it is possible to disperse concentrating traffic and to reduce a load on the base station in the embodiments of the present disclosure. When, for example, a plurality of wireless communication devices request use of the same wireless communication network expecting a high communication rate, it is possible to limit the number of wireless communication devices that serve as connection targets so as to be able to secure a desired communication rate. Accordingly, it is possible to provide a desired service with a high probability, for example, to the wireless communication devices that desire the connection expecting a high communication rate.

Furthermore, the embodiments of the present disclosure exemplify that, when the connection permission request is transmitted, the base station (communication carrier) that serves as a connection target is selected for the wireless communication device 300, but, such a selection process may be performed for the information processing device 200. For example, the connection permission request transmitted from the wireless communication device 300 is set to include selection information indicating whether the connection permission request is based on the congestion degree or a communication cost. Then, when the information processing device 200 receives the connection permission request, it is possible to select a base station (communication carrier) that serves as a connection target of the wireless communication device 300 based on the selection information included in the received connection permission request.

In addition, the embodiments of the present disclosure exemplify that the connection permission request is transmitted to the information processing device based on a user operation, but the connection permission request may be transmitted to the information processing device according to a handover process. In this case, a process of selecting a new base station is performed in a wireless communication device every time handover is detected, and the connection permission request is transmitted to the information processing device according to the selection process.

In addition, the embodiments of the present disclosure describe the examples of the information processing devices 200 and 600 formed as one unit. However, the embodiments of the present disclosure can also be applied to an information processing system constituted by a plurality of devices having each unit included in the information processing devices. In addition, the embodiments of the present disclosure can be applied to a portable type wireless communication device (for example, a data communication dedicated terminal device) other than a mobile telephone device or a fixed type wireless communication device (for example, a wireless communication device for collecting data of vending machines).

[Control Example of Transmission Frequency of Positional Information]

In recent years, there has been a growing number of cases in which predetermined information such as life-log (for example, record of a person's activities) for using applications, concierge services, or the like is uploaded to each server from wireless communication devices. In addition, it is anticipated that, if such applications, concierge services, or the like are further spread in years to come, the frequency of uploading such predetermined information from wireless communication devices to each server will further increase.

For example, in order to proper services in such applications, concierge services, or the like, it is important to transmit the predetermined information at an appropriate frequency (for example, with a fixed interval). However, since portable wireless communication devices perform each operation mostly using batteries, it is important to lower power consumption by efficiently using the batteries.

The present disclosure is created taking the above circumstance into consideration, and it is desirable for the present disclosure to lower power consumption.

In addition, the present disclosure can take the following configurations (Configuration Examples 1 to 13) for the purpose of solving the above problem.

Configuration Example 1

A wireless communication device including a control unit that controls, based on the distance between a base station and the wireless communication device performing wireless communication with an information processing device via the base station, the transmission frequency of predetermined information acquired by the wireless communication device to the information processing device.

Configuration Example 2

The wireless communication device described in Configuration Example 1, in which the control unit performs control so as to heighten the transmission frequency as the distance between the wireless communication device and the base station is shortened, and to lower the transmission frequency as the distance between the wireless communication device and the base station is lengthened.

Configuration Example 3

The wireless communication device described in Configuration Example 1 or 2, further including a positional information acquisition unit that acquires positional information for specifying the position where the wireless communication device is present, in which the control unit transmits the positional information acquired by the positional information acquisition unit to the information processing device so as to be included in the predetermined information.

Configuration Example 4

The wireless communication device described in any one of Configuration Examples 1 to 3, in which the control unit computes the distance between the wireless communication device and the base station based on path-loss, a reception level of a pilot signal, an SIR of a synchronization signal, or the positional information acquired by the positional information acquisition unit.

Configuration Example 5

The wireless communication device described in any one of Configuration Examples 1 to 4, in which the control unit changes the transmission frequency based on the remaining amount of battery power that drives the wireless communication device.

Configuration Example 6

The wireless communication device described in any one of Configuration Examples 1 to 5, in which the predetermined information includes at least one piece of information among information on a position in the zone where the wireless communication device is present, time-series information on the position where the wireless communication device is present, information on the area code in the zone where the wireless communication device is present, information on a base station in the zone where the wireless communication device is present, identification information assigned to individual access points in the zone where the wireless communication device is present, time-series information on the reception signal intensity and the reception intensity of a pilot signal or a reference signal at the position in the zone where the wireless communication device is present, information on the peripheral base stations detected by the wireless communication device, information on the congestion degree of the base stations detected by the wireless communication device, information on the battery of the wireless communication device, and character information input by a user through the input device of the wireless communication device.

Configuration Example 7

The wireless communication device described in Configuration Example 6, in which the control unit changes the content included in the predetermined information based on the remaining amount of battery power that drives the wireless communication device.

Configuration Example 8

The wireless communication device described in Configuration Example 6 or 7, in which the control unit changes the content included in the predetermined information based on the type of a communication system that the wireless communication device uses.

Configuration Example 9

The wireless communication device described in Configuration Example 8, in which the type of the communication system is the code division multiplexing access scheme or the orthogonal frequency division multiple access scheme.

Configuration Example 10

The wireless communication device described in any one of Configuration Examples 6 to 9, in which the information processing device stores the reception signal intensity, the reception intensity of the pilot signal or the reference signal, and an index relating to interference computed based on the information on the peripheral base stations included in the predetermined information transmitted from the wireless communication device, in relation to a position specified based on the predetermined information.

Configuration Example 11

The wireless communication device described in Configuration Example 10, in which, when an acquisition request of information on reception quality is received from the wireless communication device, the information processing device outputs to the wireless communication device the reception signal intensity, the reception intensity of the pilot signal or the reference signal, and the index relating to interference relating to the position in the zone where the wireless communication device is present.

Configuration Example 12

A information processing device including a storage unit that stores predetermined information that is information including positional information transmitted from a wireless communication device and includes a reception signal intensity at a position in the zone where the wireless communication device, a reception intensity of a pilot signal or a reference signal at the position in the zone where the wireless communication device, and an index relating to interference computed based on information on the peripheral base stations detected by the wireless communication device, in relation to a position specified based on the positional information, and an output unit that outputs to the wireless communication device the reception signal intensity, the reception intensity of the pilot signal or the reference signal, and the index relating to interference relating to the position in the zone where the wireless communication device is present, when an acquisition request of information on reception quality is received from the wireless communication device.

Configuration Example 13

A control method of a wireless communication device including controlling the transmission frequency of predetermined information acquired by the wireless communication device to an information processing device based on the distance between a base station and the wireless communication device that performs wireless communication with the information processing device via the base station.

Furthermore, the embodiments of the present disclosure show examples for realizing the disclosure, and as clarified in the embodiments of the present disclosure, matters in the embodiments of the present disclosure are in a corresponding relationship with disclosure specific matters in the claims. In the same manner, the disclosure specific matters in the claims are in a corresponding relationship with the matters in the embodiments of the present disclosure given the same name. However, the embodiments of the present disclosure are not limited thereto, and can be realized by implementing various modifications within the scope not departing from the gist of the present disclosure.

In addition, the processing procedures described in the embodiments of the present disclosure may be understood as methods having the series of procedures, or may be understood as a program for causing a computer to execute the series of procedures or a recording medium recording the program. As such a recording medium, for example, hard disk, a CD (Compact Disc), an MD (MiniDisc), a DVD (Digital Versatile Disc), or the like can be used. In addition, a memory card, a Blu-ray Disc (registered trademark), or the like can be used.

Furthermore, the present disclosure can take the following configurations as well.

(1) An information processing method including determining, when a connection request for connecting, via a base station relating to a first communication carrier, a first wireless communication device to a base station relating to a second communication carrier is received from the first wireless communication device, permission or non-permission for the connection request based on connection information on the number of wireless communication devices connected to the base station relating to the connection request, and setting a connection right to be connected to the base station relating to the connection request to the first wireless communication device when permission is determined in the determining.

(2) The information processing method described in (1) above, in which, in the determining, the connection information is compared to a threshold value, and permission or non-permission for the connection request is determined based on the comparison result.

(3) The information processing method described in (2) above, in which the connection request is a connection request for being connected to the base station with the lowest congestion degree among a plurality of base stations to which the first wireless communication device can be connected, in which, in the determining, when the number of wireless communication devices connected to the base station relating to the connection request is great based on the threshold value as a standard, a base station with the next lowest congestion degree to the base station relating to the connection request among the plurality of base stations to which the first wireless communication device can be connected is set to a target base station, and when the number of wireless communication devices connected to the target base station is less based on the threshold value as a standard, permission for connection to the target base station is determined, and when the number is great based on the threshold value as a standard, the determination is performed for the target base station by setting a base station with the further next lowest congestion degree to the target base station among the plurality of base stations to which the first wireless communication device can be connected as a new target base station, and in which, in the setting, a connection right to be connected to the target base station for which permission is determined in the determining is set to the first wireless communication device.

(4) The information processing method described in (2) above, in which, in the determining, when the number of wireless communication devices connected to the base station relating to the connection request is less based on the threshold value as a standard, permission for the connection request is determined, and when the number is great based on the threshold value as a standard, non-permission for the connection request is determined.

(5) The information processing method described in (4) above, further including displaying, when non-permission for the connection request is determined in the determining, the intent of non-permission in the first wireless communication device.

(6) The information processing method described in any one of (1) to (5) above, in which, when a communication service relating to the connection request is not a specific communication service, the determination is performed after a fixed time passes after the reception of the connection request in the determining, and in which, when permission for the connection request is determined after the fixed time passes, the connection right is set to the first wireless communication device in the setting.

(7) The information processing method described in (1) or (2) above, in which, in the determining, when the communication service relating to the connection request is not a specific communication service, a base station with the next lowest congestion degree to the base station relating to the connection request among a plurality of base stations to which the first wireless communication device can be connected is set as a target base station, when the number of wireless communication devices connected to the target base station is less based on a threshold value as a standard, permission for connection to the target base station is determined, and when the number is great based on the threshold value as a standard, non-permission for connection to the target base station is determined, and in which, in the setting, the connection right to be connected to the target base station for which permission is determined in the determining is set for the first wireless communication device.

(8) The information processing method described in any one of (2) to (5) above, in which, the connection request is a first connection request for being connected to a base station that is selected based on the congestion degrees relating to a plurality of base stations to which the first wireless communication device can be connected, or a second connection request for being connected to a base station that is selected based on a communication cost relating to the plurality of base stations to which the first wireless communication device can be connected, and in which, in the determining, the determination is performed using threshold values that are different depending on whether the connection request is the first connection request or the second connection request.

(9) The information processing method described in (8) above, in which, in the determining, when the connection request is the first connection request, the determination is performed using a first threshold value as the threshold value, and when the connection request is the second connection request, the determination is performed using a second threshold value as the threshold value, in which conditions are further alleviated than in the first threshold value.

(10) The information processing method described in (9) above, in which, in the determining, when the type of the communication service relating to the connection request is a specific communication service regardless of whether the connection request is the first connection request or the second connection request, the determination is performed using the first threshold value.

(11) The information processing method described in any one of (1) to (10) above, in which, in the determining, a connection request to be permitted is specified among the connection requests based on the congestion degree relating to a plurality of base stations to which the first wireless communication device can be connected and the type of a communication service relating to the connection request.

(12) The information processing method described in any one of (1) to (11) above, in which the congestion degree of each base station is transmitted to an information processing device that executes the determination after each wireless communication device detects the congestion degree, and in which frequency of transmitting congestion degrees detected by the wireless communication device to the information processing device is increased as the distance between the wireless communication device and the base station is shortened, and frequency of transmitting congestion degrees detected by the wireless communication device to the information processing device is reduced as the distance between the wireless communication device and the base station is lengthened.

(13) The information processing method described in any one of (2) to (5) above, further including extracting a wireless communication device of which the type of a communication service relating to the connection request does not coincide with the type of a communication service communicated between the base station relating to the connection request after connection based on the set connection right, in which, in the determining, when a wireless communication device, of which the types of the communication services do not coincide with each other, is extracted even if non-permission for the connection request is determined based on the comparison result, permission for the connection request is determined, and in which, in the setting, a connection right to be connected to a base station with the next lowest congestion degree to another base station relating to the connection right set in the extracted wireless communication device is set in the wireless communication device.

(14) The information processing method described in any one of (1) to (13) above, in which, in the determining, the determination is performed using a value, as the connection information, obtained by weighting the number of wireless communication devices connected to the base station relating to the connection request based on the distance between the base station and each of the wireless communication devices, or a value obtained by weighting the number of wireless communication devices based on a signal-power-to-interference-power ratio of a pilot signal received from the base station.

(15) The information processing method described in any one of (1) to (14) above, in which the base station relating to the connection request is selected based on the congestion degrees or a predicted communication rate of a plurality of base stations.

(16) The information processing method described in any one of (1) to (15) above, further including determining a service type by determining whether a service is a continuously provided communication service or an intermittently provided communication service based on at least one of a connection point, a protocol, and a port number included in the connection request.

(17) The information processing method described in (1) or (2) above, in which, in the determining, when the communication service relating to the connection request is a specific communication service, a base station corresponding to the orthogonal frequency division multiple access scheme among a plurality of base stations to which the first wireless communication device can be connected is set as a target base station, when the communication service relating to the connection request is not a specific communication service, a base station corresponding to the code division multiplexing access scheme among the plurality of base stations to which the first wireless communication device can be connected is set as a target base station, and when the number of wireless communication devices connected to the target base station is small based on a threshold value, permission for connection to the target base station is determined, and when the number is great based on the threshold value, non-permission for connection to the target base station is determined, and in which, in the setting, the connection right to be connected to the target base station to which connection is determined to be permitted in the determining is set in the first wireless communication device.

(18) The information processing method described in (1) or (2) above, in which, in the determining, when the communication service relating to the connection request is a specific communication service, a base station corresponding to the orthogonal frequency division multiple access scheme among the plurality of base stations to which the first wireless communication device can be connected is set as a target base station, when the number of wireless communication devices connected to the target base station is small based on a threshold value, permission for connection to the target base station is determined, and when the number is great based on the threshold value, a base station corresponding to the code division multiplexing access scheme among the plurality of base stations to which the first wireless communication device can be connected is set as a new target base station, when the number of wireless communication devices connected to the target base station is small based on a threshold value, permission for connection to the base station is determined, and when the number is great based on the threshold value, non-permission for connection to the target base station is determined, and in which, in the setting, the connection right to be connected to the target base station to which connection is determined to be permitted in the determining is set in the first wireless communication device.

(19) The information processing method described in any one of (2) to (5) above, further including extracting a wireless communication device of which the type of a communication service relating to the connection request does not coincide with the type of a communication service communicated between the base station relating to the connection request after connection based on the set connection right, in which, in the determining, when a wireless communication device, of which the types of the communication services do not coincide with each other, is extracted even if non-permission for the connection request is determined based on the comparison result, permission for the connection request is determined, and in which, in the setting, the extracted wireless communication device is set with the connection right to be connected to a base station corresponding to the code division multiplexing access scheme from a base station corresponding to the orthogonal frequency division multiple access scheme relating to a connection right set in the wireless communication device.

(20) An information processing device including a determination unit that determines, when a connection request for connecting, via a base station relating to a first communication carrier, a first wireless communication device to a base station relating to a second communication carrier is received from the first wireless communication device, permission or non-permission for the connection request based on connection information on the number of wireless communication devices connected to a base station relating to the connection request, and a control unit that controls to set a connection right to be connected to the base station relating to the connection request to the first wireless communication device when permission is determined by the determination unit.

The present disclosure contains subject matter related to that disclosed in Japanese Priority Patent Application JP 2011-028564 filed in the Japan Patent Office on Feb. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing method comprising:
   determining, in case a connection request for connecting, via a base station relating to a first communication operator, a first wireless communication device to a base station relating to a second communication operator is received from the first wireless communication device,
   wherein the connection request comprises identification information of the base station relating to the second communication operator;
   determining permission or non-permission for the connection request based on connection information on a number of wireless communication devices connected to the base station relating to the second communication operator,
   wherein the connection request is a connection request for being connected to the base station with the lowest congestion degree among a plurality of base stations to which the first wireless communication device is capable of being connected, and
   wherein, in the determining of the permission or non-permission, in case the number of wireless communication devices connected to the base station relating to the second communication operator is equal to or greater than a threshold value, a base station with the next lowest congestion degree to the base station relating to the second communication operator among the plurality of base stations is set to a target base station, wherein in case the number of wireless communication devices connected to the target base station is lesser than the threshold value, permission for connection to the target base station is determined; and setting contract authentication information related to the second communication operator to connect the target base station to the first wireless communication device based on the determined permission.

2. The information processing method according to claim 1, wherein, in the determining of the permission or non-permission, the connection information is compared to the threshold value, and the permission or non-permission for the connection request is determined based on the comparison result.

3. The information processing a method of cording to claim 2, further comprising:

extracting and identification of a wireless communication device of which a type of a communication service relating to the connection request does not coincide with another type of the communication service communication between the base station relating to the second communication operator after connection based on the set contract authentication information related to the second communication operator, wherein, in case the identification of the wireless communication device, of which the types of the communication services do not coincide with each other, is extracted even if non-permission for the connection request is determined based on the comparison result, permission for the connection request is determined, and wherein, in this setting, the wireless communication device corresponding to the extracted identification is set with the contract authentication information related to the second communication operator to connect to a base station corresponding to a code division multiplexing access came from a base station corresponding to an orthogonal frequency division multiple access scheme relating to a connection right set in the wireless communication device.

4. The information processing method according to claim 1, wherein, in the determining of the permission or non-permission, in case the number of wireless communication devices connected to the target base station is equal to or greater than the threshold value, the determination is performed for the target base station by setting a base station with the further text lowest congestion degree to the target base station among the plurality of base stations as a new target base station wherein, in the setting, the contract authentication information related to the second communication operator to connect the largest base station, for which the permission is determined, to the first wireless communication device is set.

5. The information processing method according to claim 1, wherein, in the determining of the permission or non-permission, in case the number of wireless communication devices connected to the base station relating to the second communication operator is lesser than the threshold value, permission for the connection request is determined, and in case the number is equal to or greater than the threshold value, non-permission for the connection request is determined.

6. The information processing method according to claim 5, further comprising:

displaying, in case non-permission for the connection request is determined in the determining of the permission or non-permission, and intent of non-permission in the first wireless communication device.

7. The information processing method according to claim 1, wherein, in case a communication service relating to the connection request is not a specific communication service, the determination is performed after effects time passes at the reception of the connection request, and wherein, in case permission for the connection request is determined after fix time passes, the connection authentication information related to the second communication operator to connect is set to the first wireless communication device.

8. The information processing method according to claim 1, wherein, in the determining of the permission or non-permission, in case a communication service relating to the connection request is not a specific communication service, a base station with the lowest congestion degree to the base station relating to the second communication operator among the plurality of base stations is set as the target base station, in case the number of wireless communication devices connected to the target base station is lesser than the threshold value, permission for connection to the target base station is determined, and in case the number is equal to or greater than the threshold value, non-permission for connection to the target base station is determined, and wherein, in the setting, the contract authentication information related to the second communication operator to connect the target base station for which permission is determined, is set for the first wireless communication device.

9. The information processing method according to claim 1, wherein the connection request is a first connection request for being connected to a base station that is selected based on the congestion degrees relating to the plurality of base stations, or second connection request for being connected to a base station that is selected based on the communication costs relating to the plurality of base stations, and wherein, in the determining of the permission or non-permission, the determination is performed using threshold values that are different depending on whether the connection request is the first connection request on a second connection request.

10. The information processing method according to claim 9, wherein, in the determining of the permission or non-permission, in case the connection request is the first connection request, the determination is performed using a first threshold value of the threshold values as the threshold value, and in case the connection request in the second connection request, the determination is performed using a second threshold value of the threshold values as a threshold value, in which conditions are further alleviated than in the first threshold value.

11. The information processing method according to claim 10, wherein, the determining of the permission or non-permission, in case a type of a communication service relating to the connection request is a specific communication service regardless of whether the connection request is the first connection request or the second connection request, that determination is performed using the first threshold value.

12. The information processing method according to claim 1, wherein, in the determining of the permission or non-permission, a connection request to be permitted is specified among connection request based on the congestion degree relating to the plurality of base stations and the type of a communication service relating to the connection request.

13. Information processing method according to claim 1,
wherein the congestion degree of each of the plurality of base stations is transmitted to an information processing device configured to execute the determination of the commission or non-permission after each of a plurality of wireless communication devices detects the congestion degree, and
wherein frequency of transmitting congestion degrees detected by each of the plurality of wireless communication devices to the information processing device is increased as a distance between each of the plurality of wireless communication devices and the base station is shortened, and frequency of transmitting the congestion degrees detected by each of the plurality of wireless communication devices to the information processing device is reduced as the distance between each of the plurality of wireless communication devices and the base station is lengthened.

14. The information processing method according to claim 1,
wherein, in the determining of the permission or non-permission, the determination is performed using a value, as the connection information, obtained by weighing the number of wireless communication devices connected to the base station relating to the second communication operator based on a distance between the base station and each of the wireless communication devices, or a value obtained by weighing the number of wireless communication devices based on a signal-power-to-interference-power ratio of a pilot signal received from the base station.

15. The information processing method according to claim 1,
wherein the base station relating to the second communication operator is selected based on the congestion degrees or predicting communication rate of the plurality of the base stations.

16. Information processing method according to claim 1, further comprising:
determining a service type by determining whether a service is a continuously provided communication service or intermittently provided communication service device on at least one of the connected point, a protocol, and a port number included in the connection request.

17. The information processing method according to claim 1,
wherein, and the determining of the permission or non-permission, in case a communication service relating to the connection request is a specific communication service, a base station corresponding to an orthogonal frequency division multiple access scheme among the plurality of base stations is set as the target base station, in case the communication service relating to the connection request is not a specific communication service, a base station corresponding to a code division multiplexing access scheme among the plurality of base stations is set as the target base station, and in case the number of wireless communication devices connected to the target base station is lesser than the threshold value, permission for connection to the target base station is determined, and in case the number is equal to or greater than the threshold value, non-permission for connection the target base station is determined, and wherein, in the setting, the contract authentication information related to the second communication operator to connect the target base station to which connection is determined to be permitted is set in the first wireless communication device.

18. The information processing message according to claim 1,
wherein, in the determining of the permission or non-permission, in case a communication service relating to the connection request is a specific communication service, a base station corresponding to an orthogonal frequency division multiple access scheme among the plurality of base stations is set as the target base station, in case the number of wireless communication devices connected to the target base station is lesser than the threshold value, permission for connection to the target base station is determined, and in case the number is equal to or greater than the threshold value, a base station corresponding to the code division multiplexing access scheme among the plurality of base stations is set as a new target base station, in case the number of wireless communication devices connected to the target base station is lesser in the threshold value, permission for the connection to the base station is determined, and in case the number is equal to or greater than the threshold value, non-permission for connection to the target base station is determined, and
wherein, in the setting, the contract authentication information related to the second communication operator to connect the target base station to which connection is determined to be permitted is set in the first wireless communication device.

19. An information processing method comprising:
determining, in case a connection request for connecting, via a base station relating to a first communication carrier, a first wireless communication device to a base station relating to a second communication carrier is received from the first wireless communication devices;
comparing connection information on a number of wireless communication devices connected to the base station, relating to the second communication carrier, to a threshold value;
determining permission or non-permission for the connection request based on the comparison result; and
setting authentication information to connect the base station relating to the second communication carrier to the first wireless communication device based on the determined permission;
extracting an identification of a wireless communication device of which a type of communication service relating to the connection request does not coincide with another type of communication service communicated between the base station relating to the second communication carrier after connection based on the set authentication information,
wherein, in the determination of the permission or non-permission, in case an identification of a wireless communication device, of which the types of the communication services do not coincide with each other, is extracted even if non-permission for the connection request is determined based on the comparison result, permission for the connection request is determined, and
wherein, in the setting, the authentication information to connect a base station with the lowest congestion degree to another base station relating to the authentication information set in the wireless communication device corresponding to the extracted identification is set in the wireless communication device.

20. An information processing device comprising:
a determination unit configured to:
- determine, in case a connection request for connecting, via a base station relating to a first communication operator, a first wireless communication device to a base station relating to a second communication operator is received from the first wireless communication device,
- wherein the connection request comprising identification information of the base station relating to the second communication operator, and
- determines, permission or non-permission for the connection request based on connection information on a number of wireless communication devices connected to the base station relating to the second communication operator,
- wherein the connection request is a connection request for being connected to the base station with the lowest congestion degree among a plurality of base station to which the first wireless communication device is capable of being connected, and
- wherein, in the determining of the permission or non-permission, in case the number of wireless communication devices connected to the base station relating to the second communication operator is equal to or greater is in a threshold value, a base station with the next lowest congestion degree to the base station relating to the second communication operator among the plurality of base station is set to a target base station, wherein in case the number of wireless communication devices connected to the target base station is lesser than the threshold, value, permission for connection to the target base station is determined; and a control unit configured to control to set contract authentication information related to the second communication operator to connect the target base station to the first wireless communication device based on the determined permission.

* * * * *